US012632217B2

(12) United States Patent
Liao

(10) Patent No.: US 12,632,217 B2
(45) Date of Patent: May 19, 2026

(54) OPTIMIZED IN-PLACE SORTING USING ADDITIONAL MEMORY

(71) Applicant: SAS Institute Inc., Cary, NC (US)

(72) Inventor: Xuejun Liao, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 19/002,992

(22) Filed: Dec. 27, 2024

(65) Prior Publication Data

US 2025/0390276 A1 Dec. 25, 2025

Related U.S. Application Data

(60) Provisional application No. 63/661,695, filed on Jun. 19, 2024.

(51) Int. Cl.
| | |
|---|---|
| *G06F 7/24* | (2006.01) |
| *G06F 12/02* | (2006.01) |
| *G06F 16/22* | (2019.01) |

(52) U.S. Cl.
CPC ........... *G06F 7/24* (2013.01); *G06F 12/0284* (2013.01); *G06F 16/2246* (2019.01); *G06F 2207/222* (2013.01)

(58) Field of Classification Search
CPC .... G06F 7/24; G06F 12/0284; G06F 16/2246; G06F 2207/222; G06F 2212/1044; G06F 12/023; G06F 2212/1056
See application file for complete search history.

(56) References Cited

U.S. PATENT DOCUMENTS

| | | | |
|---|---|---|---|
| 10,402,164 B1* | 9/2019 | Wanjari | G06F 16/2237 |
| 2011/0055492 A1* | 3/2011 | Wu | G06F 9/5066 711/149 |
| 2015/0046475 A1* | 2/2015 | Asaad | G06F 16/2246 707/752 |
| 2015/0169248 A1* | 6/2015 | Yue | G06F 7/00 711/114 |

(Continued)

OTHER PUBLICATIONS

"Algorithms," Communications of the ACM, Jun. 1964, pp. 347-349, vol. 7, No. 6.

(Continued)

*Primary Examiner* — Charles Rones
*Assistant Examiner* — Mohammad S Bhuyan
(74) *Attorney, Agent, or Firm* — Padowithz Alce; Alce PLLC

(57) ABSTRACT

A system and method include receiving a plurality of elements in a data array to be sorted, assigning the elements a sequential index value, computing an amount of additional memory needed to sort the elements, creating a Linked-Array Tournament Tree (LATT), storing the LATT in the allocated amount of additional memory, initializing the LATT, initializing a number of iterations, initializing a next sorted index position in the data array, determining from the LATT, the index value of a champion element from all the winners of the pairwise comparisons, swapping the champion element with an element at the next sorted index position in the data array, updating the LATT responsive to the swapping, updating the next sorted index position, repeating a plurality of times, and outputting the data array having the elements in a sorted order.

36 Claims, 34 Drawing Sheets

(56)  References Cited

U.S. PATENT DOCUMENTS

| | | | |
|---|---|---|---|
| 2015/0213114 A1* | 7/2015 | Bordawekar ....... | G06F 16/2237 |
| | | | 707/740 |
| 2015/0347592 A1* | 12/2015 | Buyuktosunoglu ......................... | |
| | | | G06F 12/0897 |
| | | | 711/122 |
| 2016/0188294 A1* | 6/2016 | Sukhwani ......... | G06F 16/24558 |
| | | | 707/753 |
| 2019/0212978 A1* | 7/2019 | Sukhwani ................. | G06F 7/24 |

OTHER PUBLICATIONS

"Algorithms," Communications of the ACM, Dec. 1964, pp. 701-702, vol. 7, No. 12.
Heapsort, Wikipedia, retrieved Dec. 17, 2024, 15 pages, https://en.wikipedia.org/wiki/Heapsort.
Tournament sort, Wikipedia, retrieved Dec. 17, 2024, 6 pages, https://en.wikipedia.org/wiki/Tournament_sort.

\* cited by examiner

300

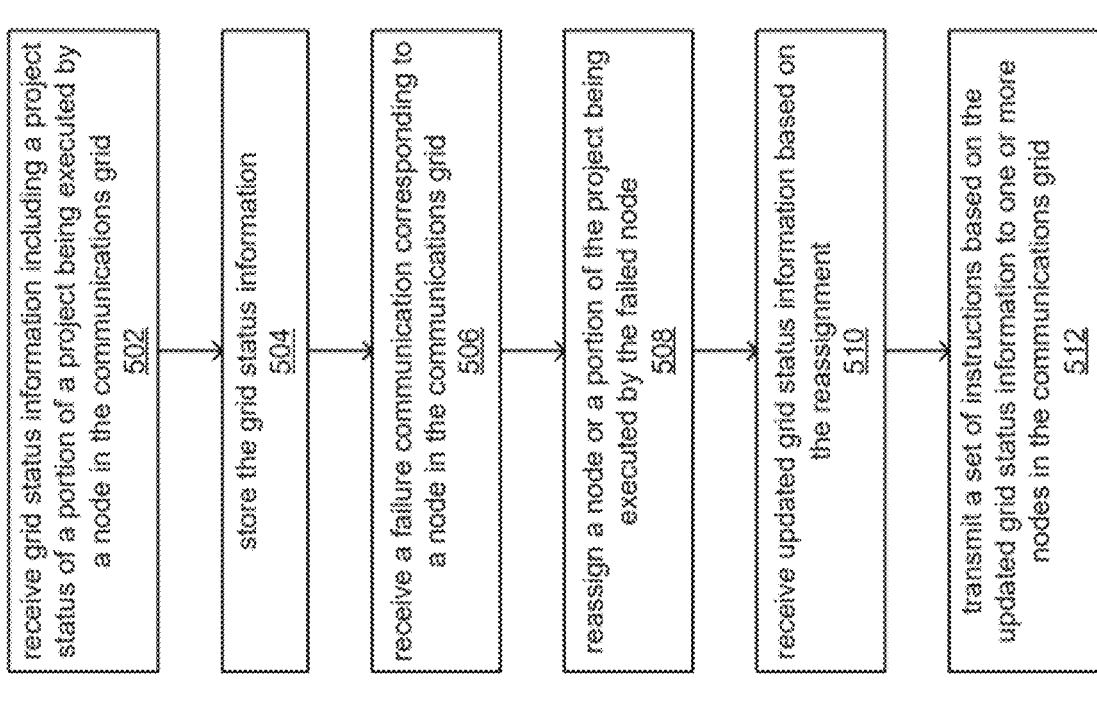

receive grid status information including a project status of a portion of a project being executed by a node in the communications grid
502 store the grid status information
504 receive a failure communication corresponding to a node in the communications grid
506 reassign a node or a portion of the project being executed by the failed node
508 receive updated grid status information based on the reassignment
510 transmit a set of instructions based on the updated grid status information to one or more nodes in the communications grid
512

OPTIMIZED IN-PLACE SORTING USING ADDITIONAL MEMORY

CROSS-REFERENCE TO RELATED APPLICATIONS

This application is a non-provisional of U.S. Provisional Application No. 63/661,695, filed on Jun. 19, 2024, the entirety of which is incorporated by reference herein.

BACKGROUND

Sorting is a technique used to arrange data in a specific order, for example, in an ascending or descending order. Sorting may be used in a variety of applications. For example, sorting may be used for creating more efficient searching algorithms such as binary search. Sorting may also be used in data analysis for easily identifying outliers, trends, and patterns. Sorting may be used in database management for optimizing query performance and managing data in a meaningful way. Other applications may rely on or use sorted data for increasing efficiency of operations, increasing user-friendliness of information, etc.

SUMMARY

In accordance with at least some aspects of the present disclosure, a non-transitory computer-readable medium having computer-readable instructions stored thereon is disclosed. The computer-readable instructions when executed by a processor cause the processor to (A) receive a plurality of elements $\{D_0, D_1, \ldots, D_{N-1}\}$ arranged in a data array to be sorted, the plurality of elements comprising N elements, (B) assign each of the plurality of elements in the data array a sequential index value, (C) store the data array in a memory array, and associate each of the plurality of elements in the data array with the corresponding index value, (D) compute an amount of additional memory needed to sort the plurality of elements, wherein the amount of additional memory is less than N, (E) allocate the amount of additional memory in the memory array based on the computation, (F) create a Linked-Array Tournament Tree (LATT) and store the LATT in the allocated amount of additional memory, wherein the LATT comprises a plurality of layers, wherein each of the plurality of layers comprises one or more nodes, and wherein each of the one or more nodes comprises a node value, (G) initialize the LATT by populating the node value for each of the one or more nodes of each of the plurality of layers, wherein the node value for each of the one or more nodes is the index value of a winner of a pairwise comparison between the plurality of elements, (H) initialize a number of iterations, j=0, (I) initialize a next sorted index position in the data array, (J) determine, from the LATT, the index value of a champion element of the plurality of elements from all the winners of the pairwise comparisons, (K) swap the champion element with an element of the plurality of elements currently at the next sorted index position in the data array, wherein after swapping, the champion element is in a sorted position in the data array, (L) update the node value of at least one of the one or more nodes responsive to the swapping to obtain an updated LATT, wherein updating the LATT comprises one or more additional pairwise comparisons between the plurality of elements, (M) increment j by one, (N) update the next sorted index position, (O) repeat (J)-(N) a plurality of times, and (P) output the data array comprising the plurality of elements in a sorted order from (K).

In accordance with at least some other aspects of the present disclosure, a system is disclosed. The system includes a memory having computer-readable instructions stored thereon and a processor that executes the computer-readable instructions to (A) receive a plurality of elements $\{D_0, D_1, \ldots, D_{N-1}\}$ arranged in a data array to be sorted, the plurality of elements comprising N elements, (B) assign each of the plurality of elements in the data array a sequential index value, (C) store the data array in a memory array, and associate each of the plurality of elements in the data array with the corresponding index value, (D) compute an amount of additional memory needed to sort the plurality of elements, wherein the amount of additional memory is less than N, (E) allocate the amount of additional memory in the memory array based on the computation, (F) create a Linked-Array Tournament Tree (LATT) and store the LATT in the allocated amount of additional memory, wherein the LATT comprises a plurality of layers, wherein each of the plurality of layers comprises one or more nodes, and wherein each of the one or more nodes comprises a node value, (G) initialize the LATT by populating the node value for each of the one or more nodes of each of the plurality of layers, wherein the node value for each of the one or more nodes is the index value of a winner of a pairwise comparison between the plurality of elements, (H) initialize a number of iterations, j=0, (I) initialize a next sorted index position in the data array, (J) determine, from the LATT, the index value of a champion element of the plurality of elements from all the winners of the pairwise comparisons, (K) swap the champion element with an element of the plurality of elements currently at the next sorted index position in the data array, wherein after swapping, the champion element is in a sorted position in the data array, (L) update the node value of at least one of the one or more nodes responsive to the swapping to obtain an updated LATT, wherein updating the LATT comprises one or more additional pairwise comparisons between the plurality of elements, (M) increment j by one, (N) update the next sorted index position, (O) repeat (J)-(N) a plurality of times, and (P) output the data array comprising the plurality of elements in a sorted order from (K).

In accordance with at least some other aspects of the present disclosure, a method is disclosed. The method includes (A) receiving, by a processor executing computer-readable instructions stored on a memory a plurality of elements $\{D_0, D_1, \ldots, D_{N-1}\}$ arranged in a data array to be sorted, the plurality of elements comprising N elements, (B) assigning, by the processor, each of the plurality of elements in the data array a sequential index value, (C) storing, by the processor, the data array in a memory array, and associating each of the plurality of elements in the data array with the corresponding index value, (D) computing, by the processor, an amount of additional memory needed to sort the plurality of elements, wherein the amount of additional memory is less than N, (E) allocating, by the processor, the amount of additional memory in the memory array based on the computation, (F) creating, by the processor, a Linked-Array Tournament Tree (LATT) and storing the LATT in the allocated amount of additional memory, wherein the LATT comprises a plurality of layers, wherein each of the plurality of layers comprises one or more nodes, and wherein each of the one or more nodes comprises a node value, (G) initializing, by the processor, the LATT by populating the node value for each of the one or more nodes of each of the plurality of layers, wherein the node value for each of the one or more nodes is the index value of a winner of a pairwise comparison between the plurality of elements, (H)

initializing, by the processor, a number of iterations, j=0, (I) initializing, by the processor, a next sorted index position in the data array, (J) determining, by the processor, from the LATT, the index value of a champion element of the plurality of elements from all the winners of the pairwise comparisons, (K) swapping, by the processor, the champion element with an element of the plurality of elements currently at the next sorted index position in the data array, wherein after swapping, the champion element is in a sorted position in the data array, (L) updating, by the processor, the node value of at least one of the one or more nodes responsive to the swapping to obtain an updated LATT, wherein updating the LATT comprises one or more additional pairwise comparisons between the plurality of elements, (M) incrementing, by the processor, j by one, (N) updating, by the processor, the next sorted index position, (O) repeating, by the processor, (J)-(N) a plurality of times, and (P) outputting, by the processor, the data array comprising the plurality of elements in a sorted order from (K).

The foregoing summary is illustrative only and is not intended to be limiting in any way. In addition to the illustrative aspects, embodiments, and features described above, further aspects, embodiments, and features will become apparent by reference to the following drawings and the detailed description.

BRIEF DESCRIPTION OF THE DRAWINGS

FIG. 5 illustrates a flow chart showing an example process for adjusting a communications grid or a work project in a communications grid after a failure of a node, according to some embodiments of the present technology.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skills in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
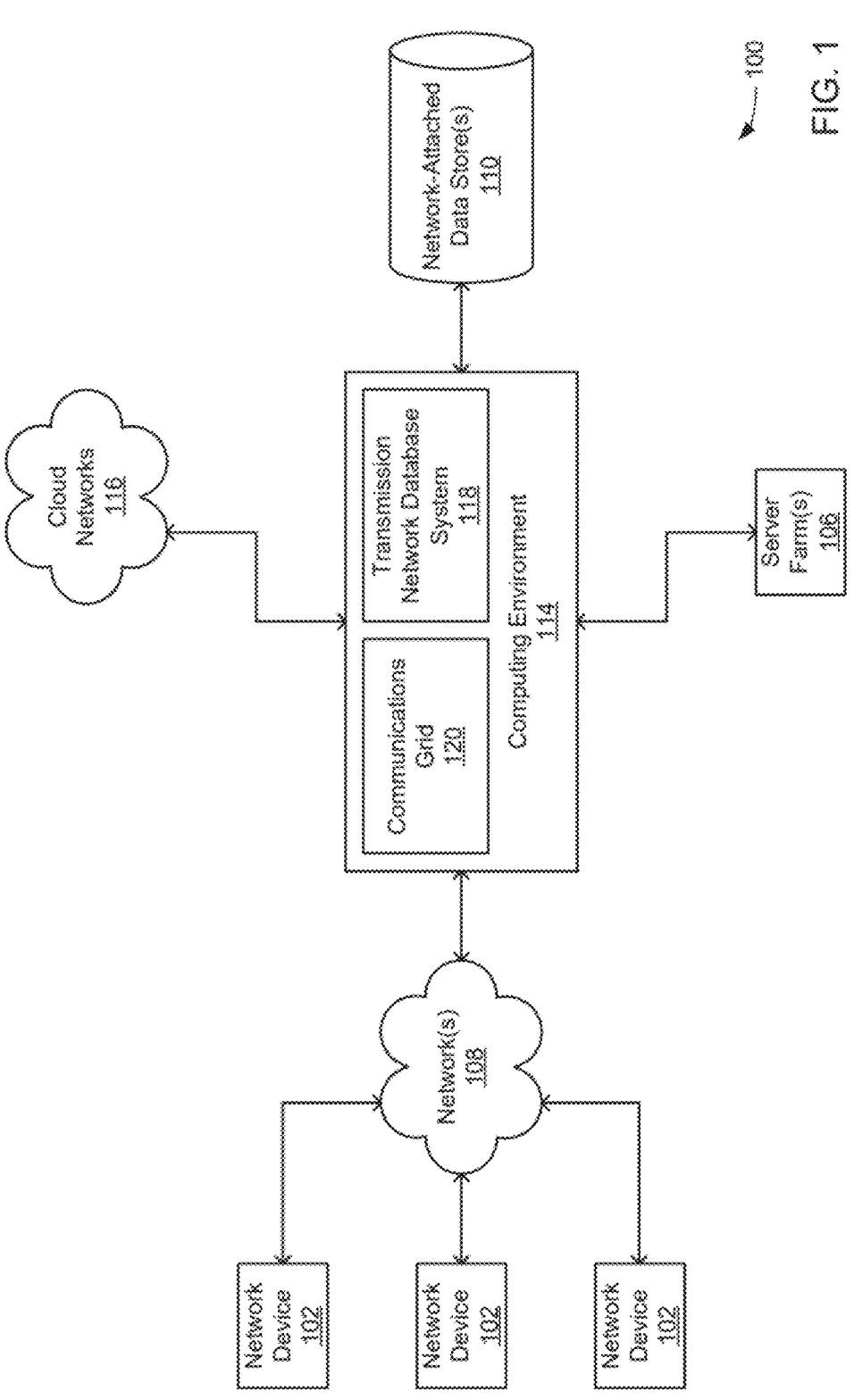
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
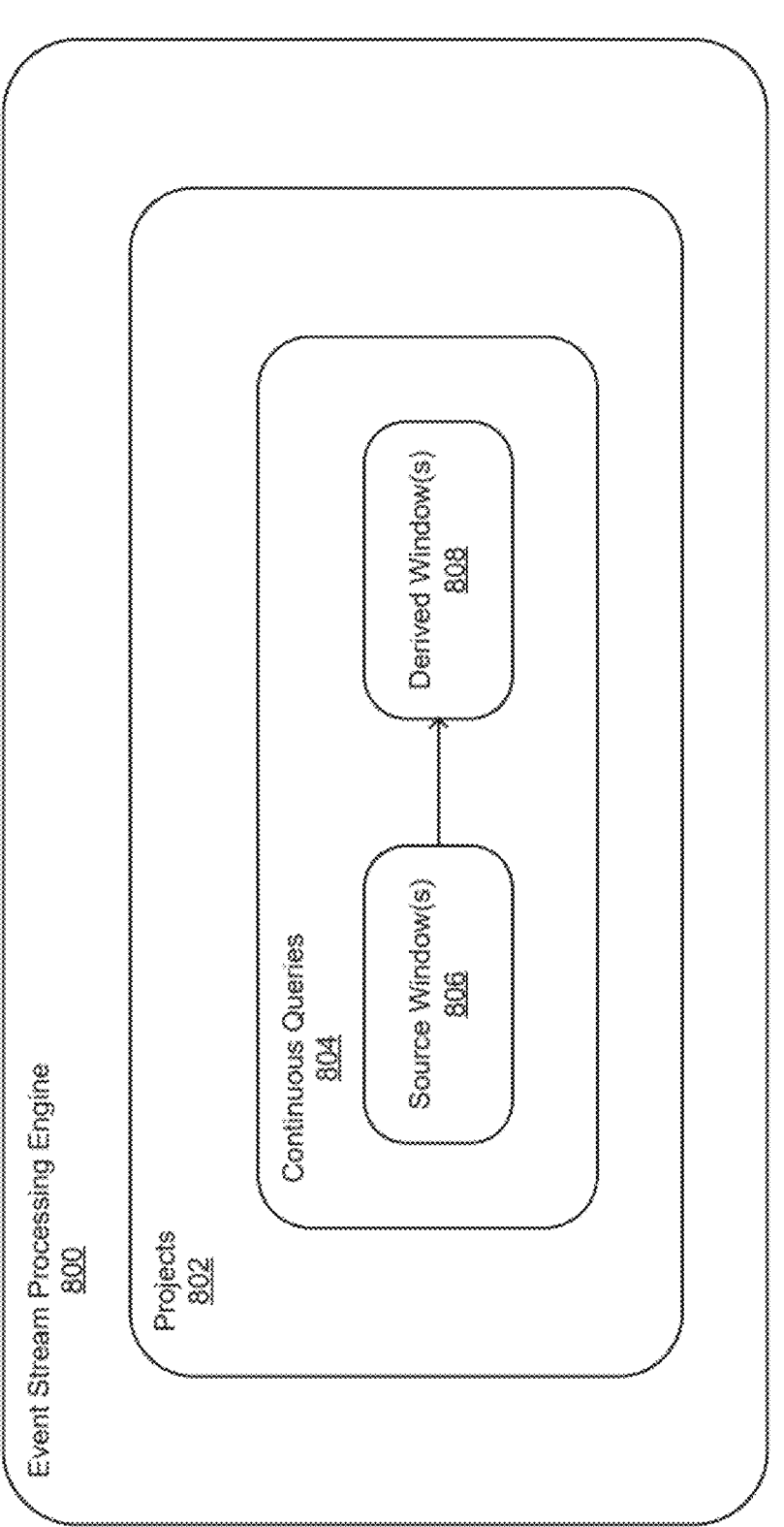
FIG. 8 illustrates a block diagram including components of an Event Stream Processing Engine (ESPE), according to embodiments of the present technology.
Figure 9:
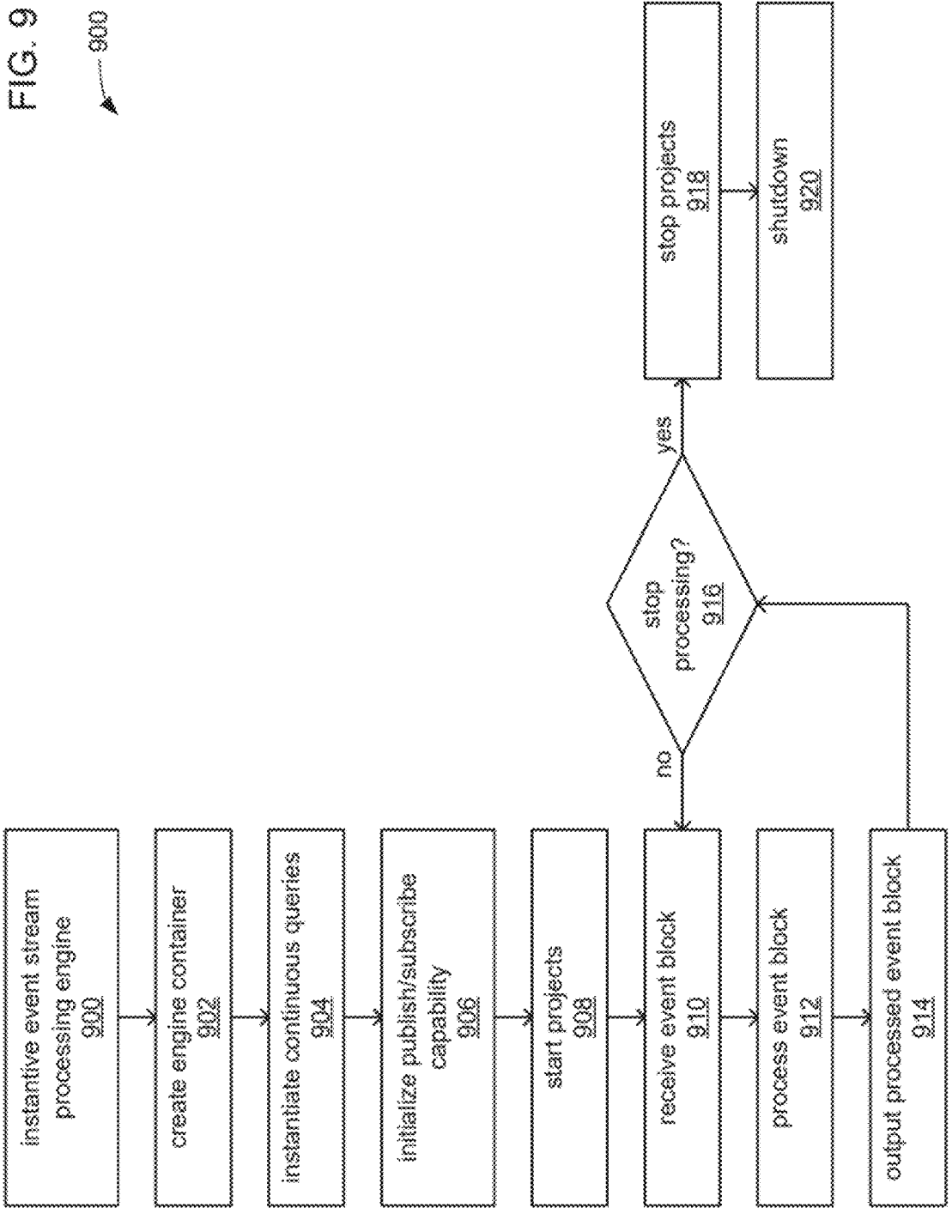
FIG. 9 illustrates a flow chart showing an example process including operations performed by an event stream processing engine, according to some embodiments of the present technology.
Figure 10:
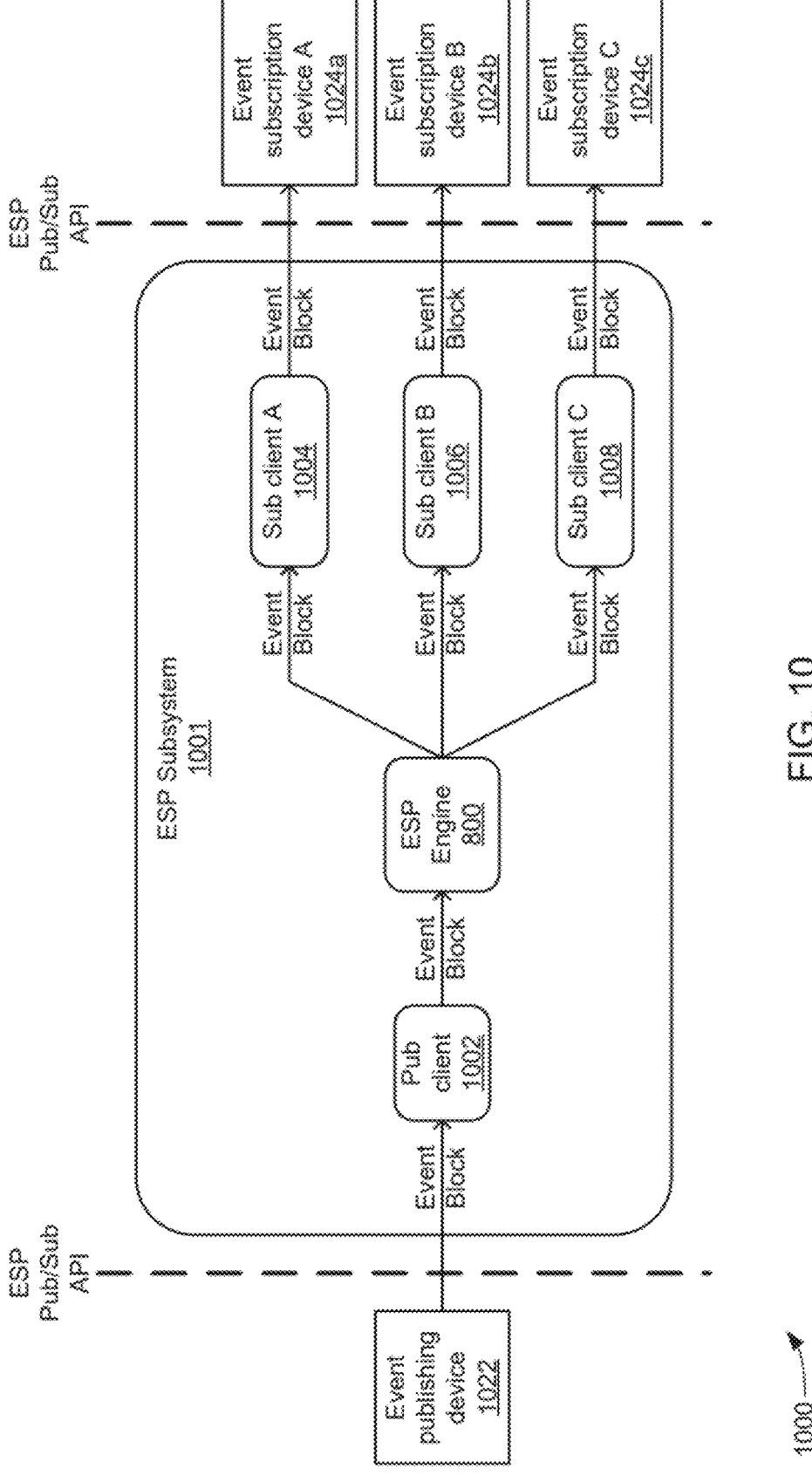
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
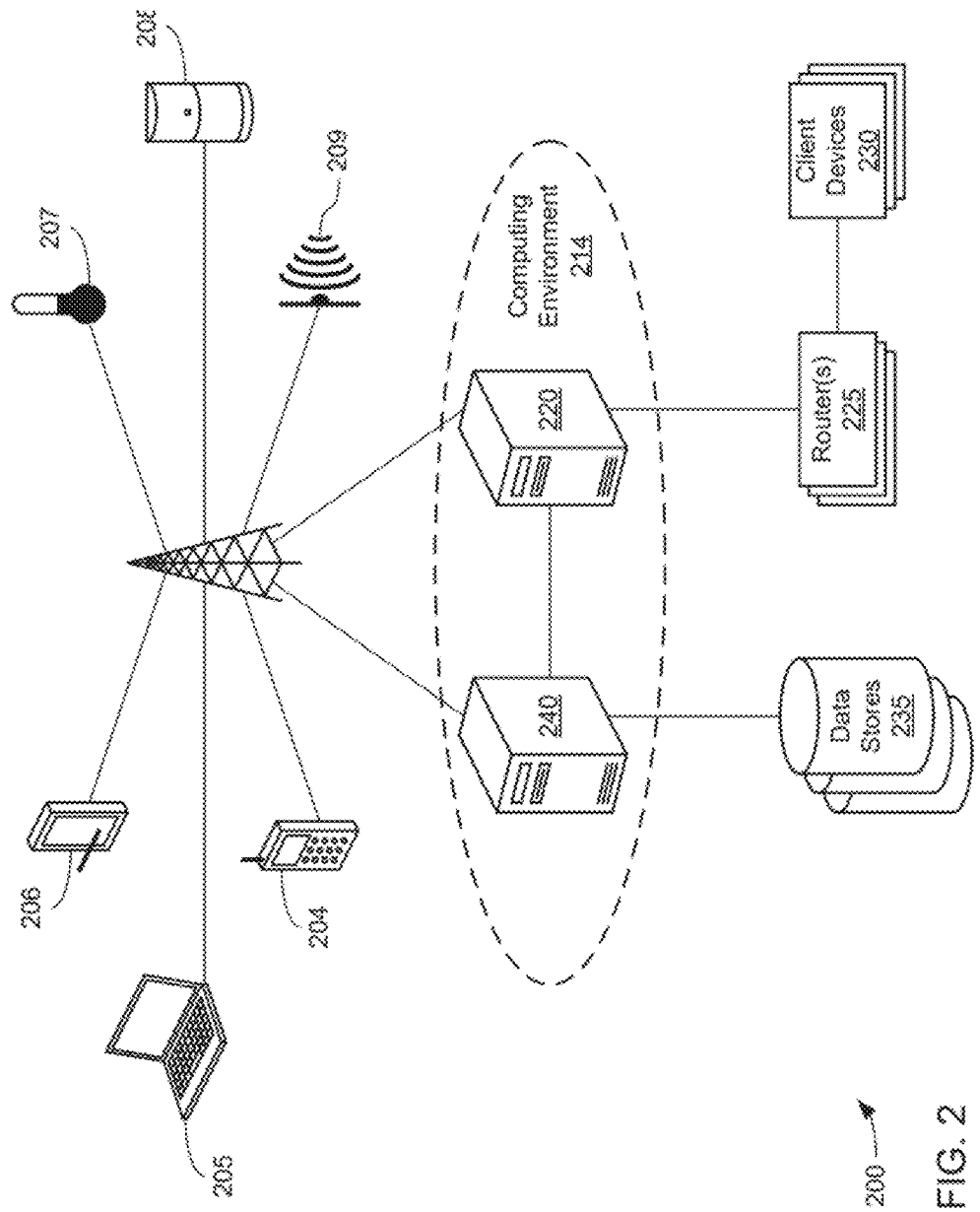
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
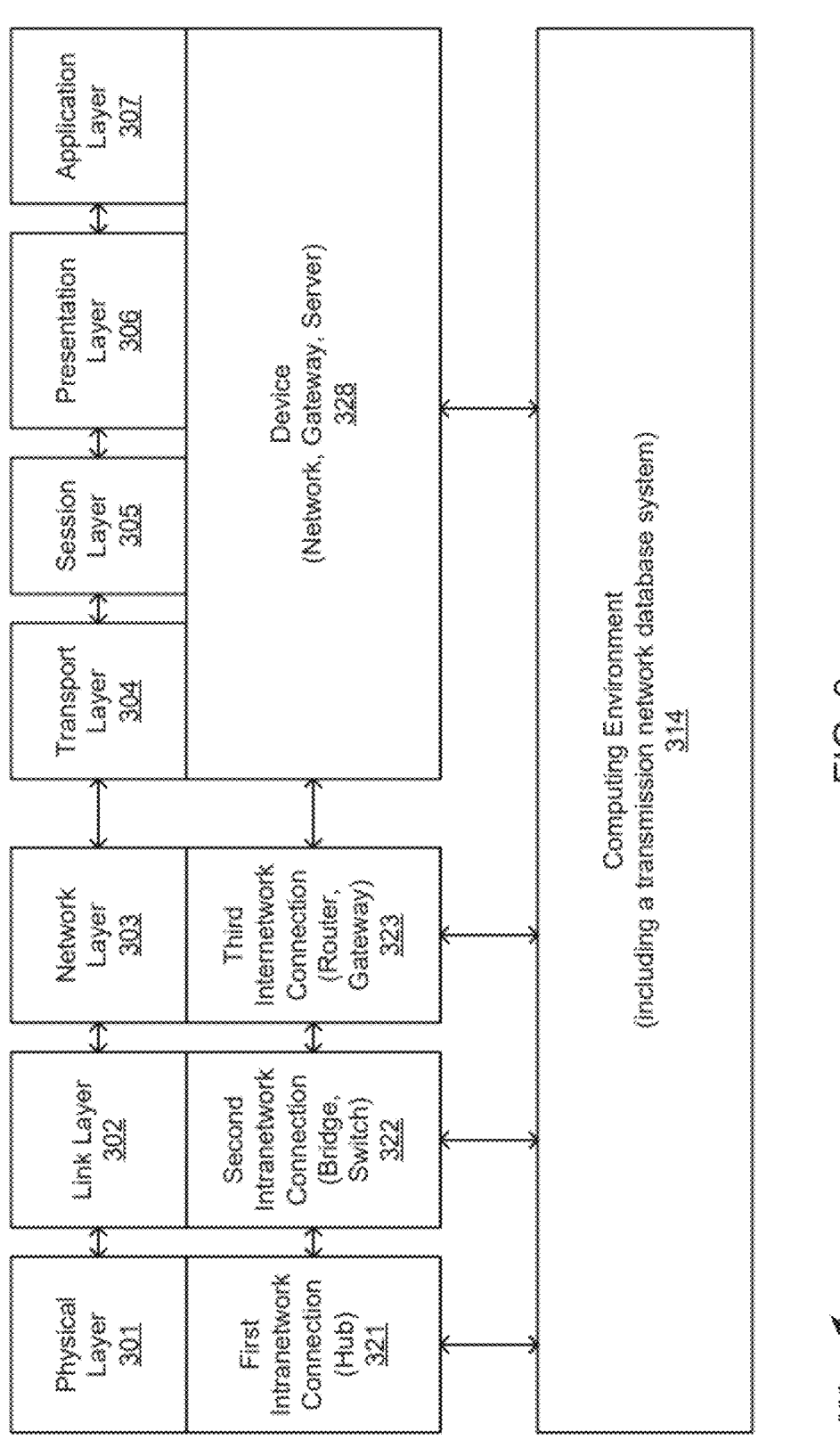
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network.

In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Internetwork connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory.

Each node may be assigned a particular task such as a portion of a processing project, or to organize or control other nodes within the grid.

Figure 4:
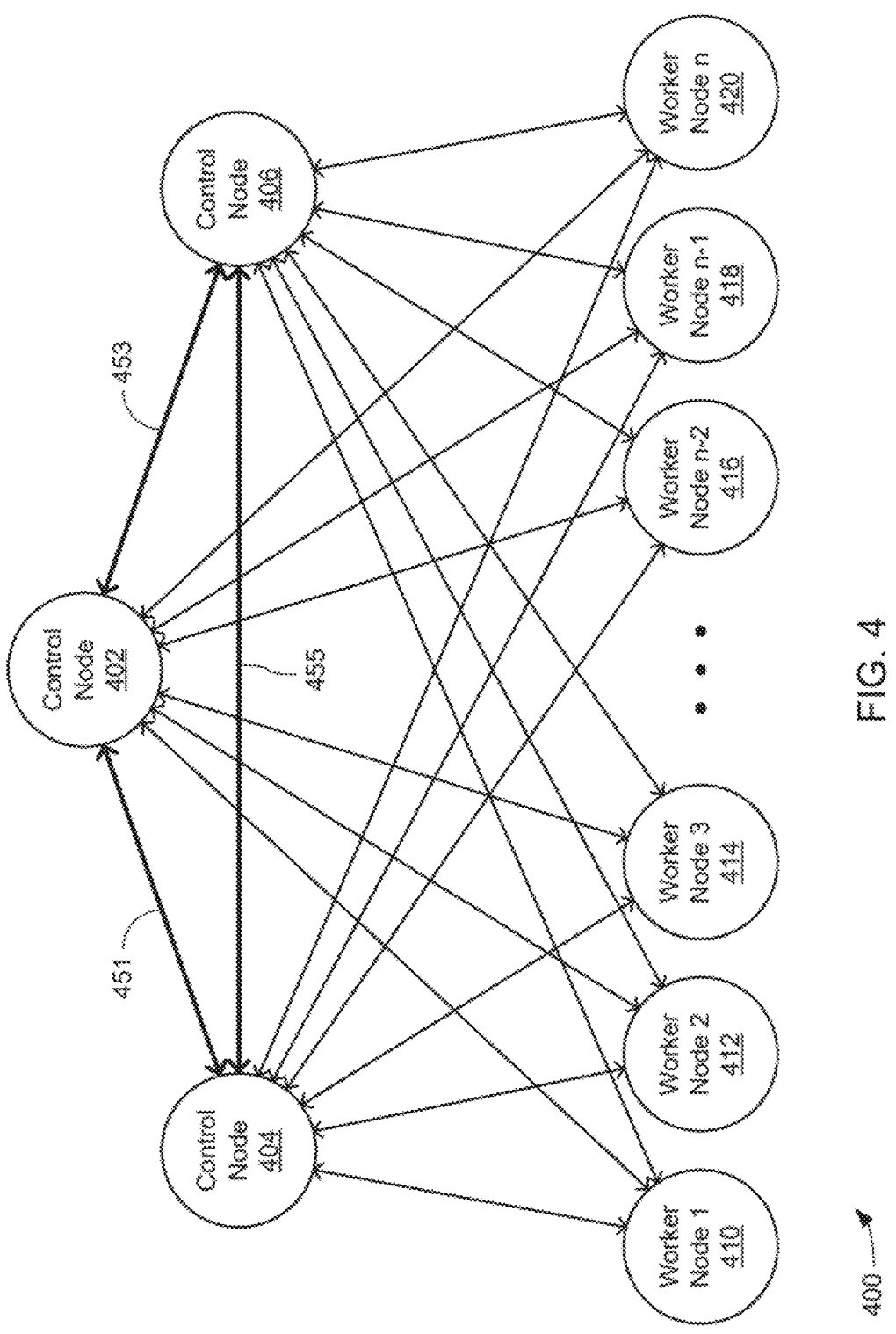
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
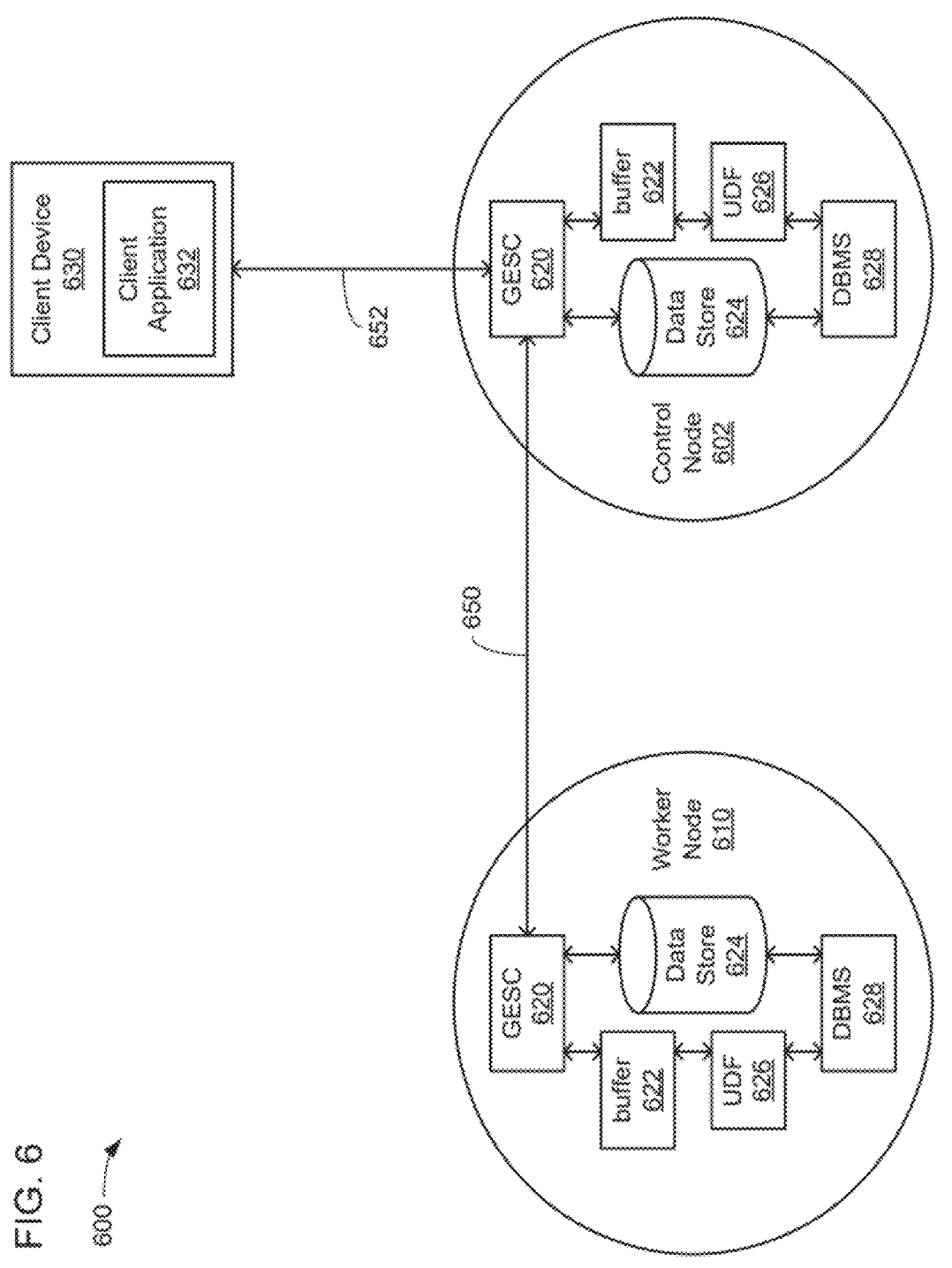
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a node 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
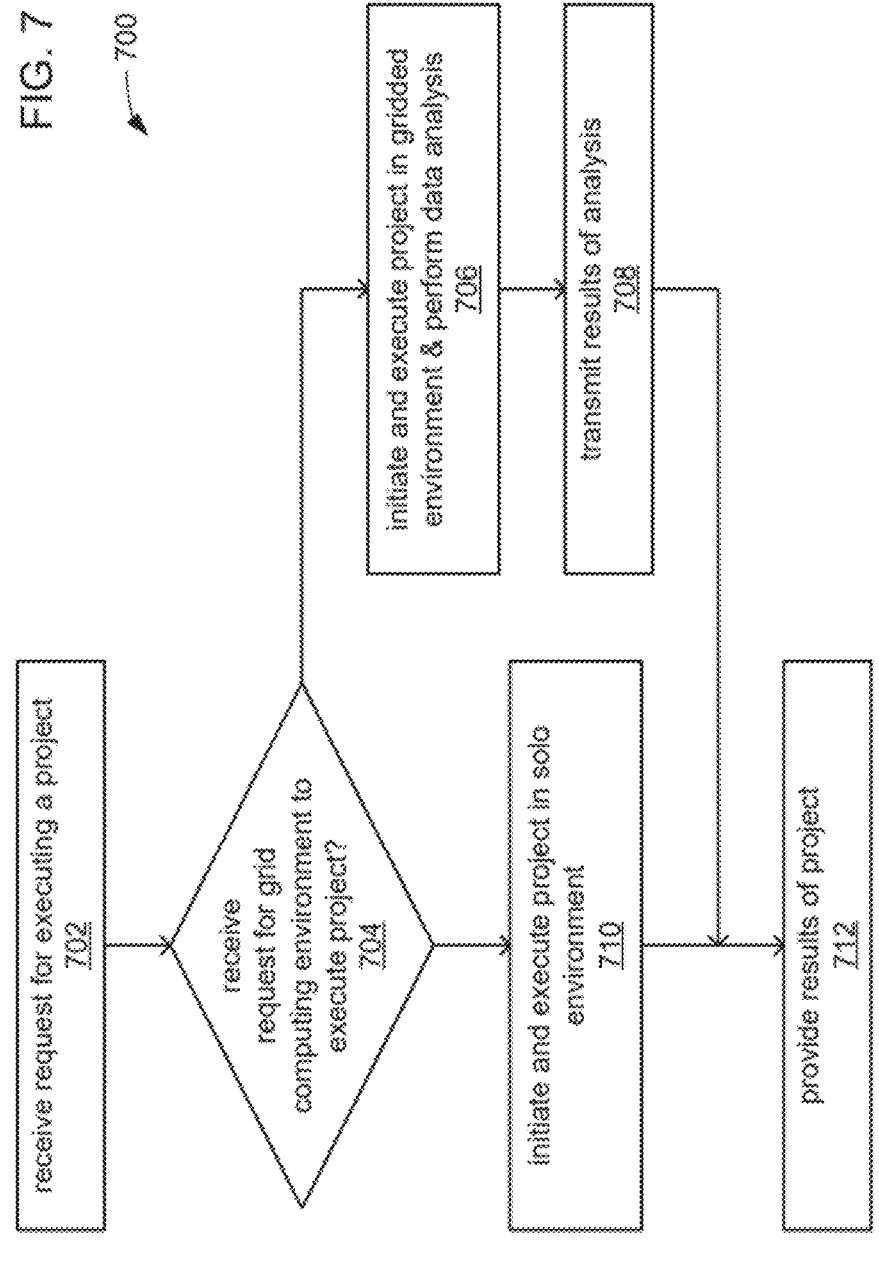
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
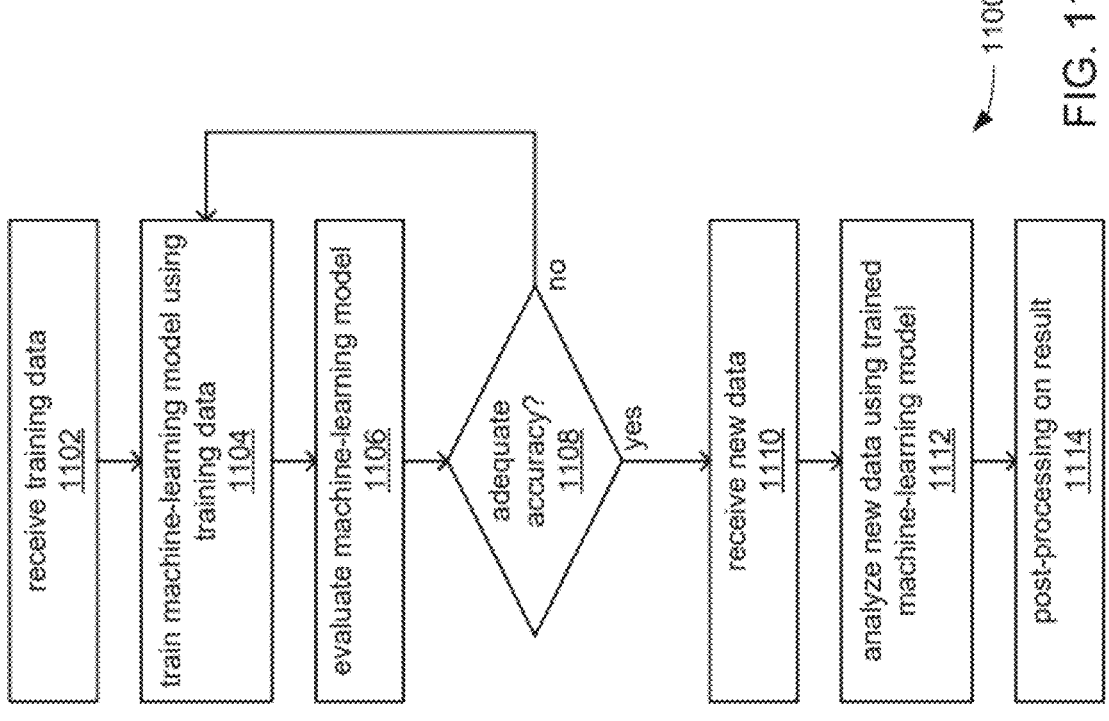
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these. Other networks may include transformers, large language models (LLMs), and agents for LLMs.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
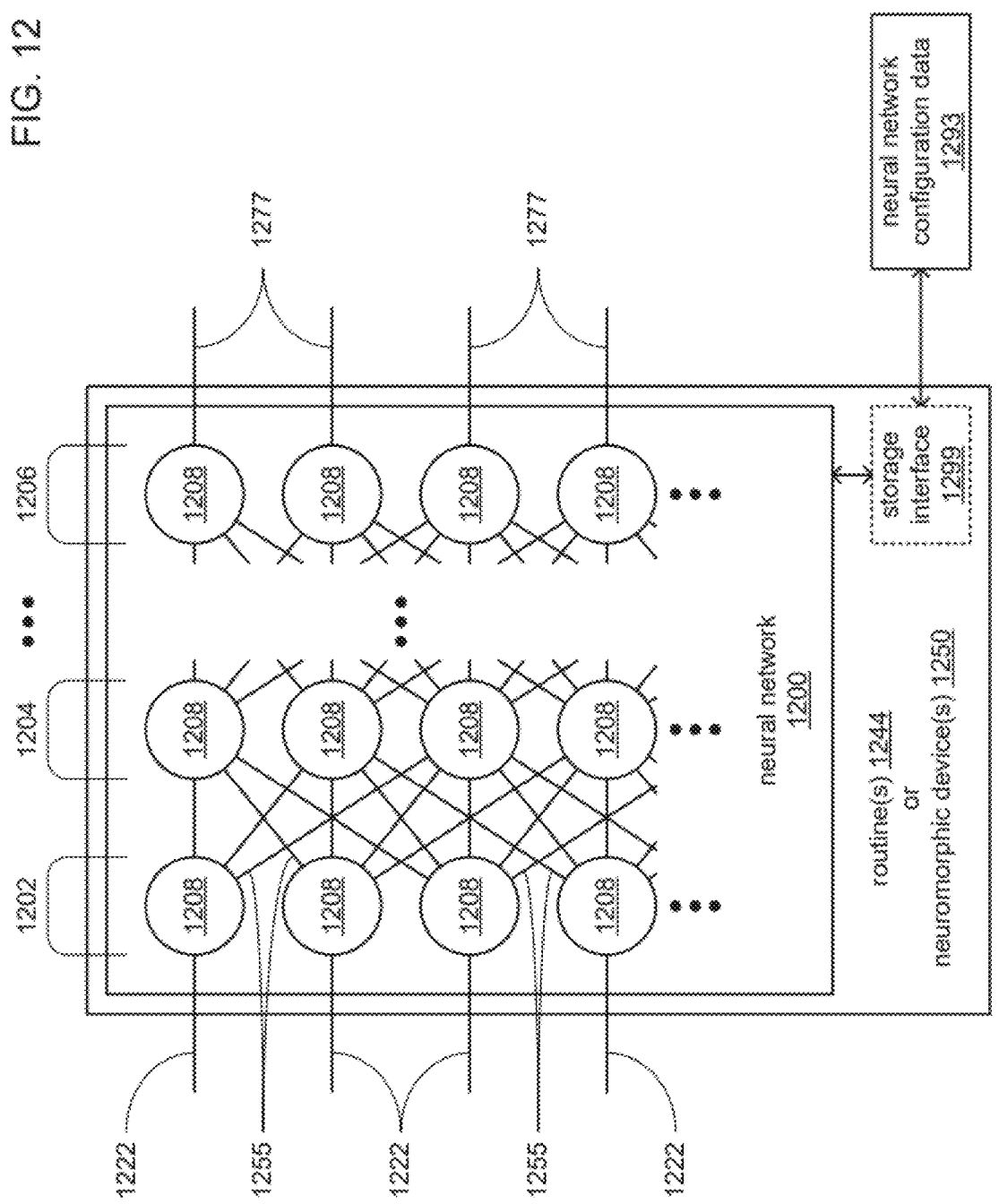
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y = \max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network and/or a transformer model to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
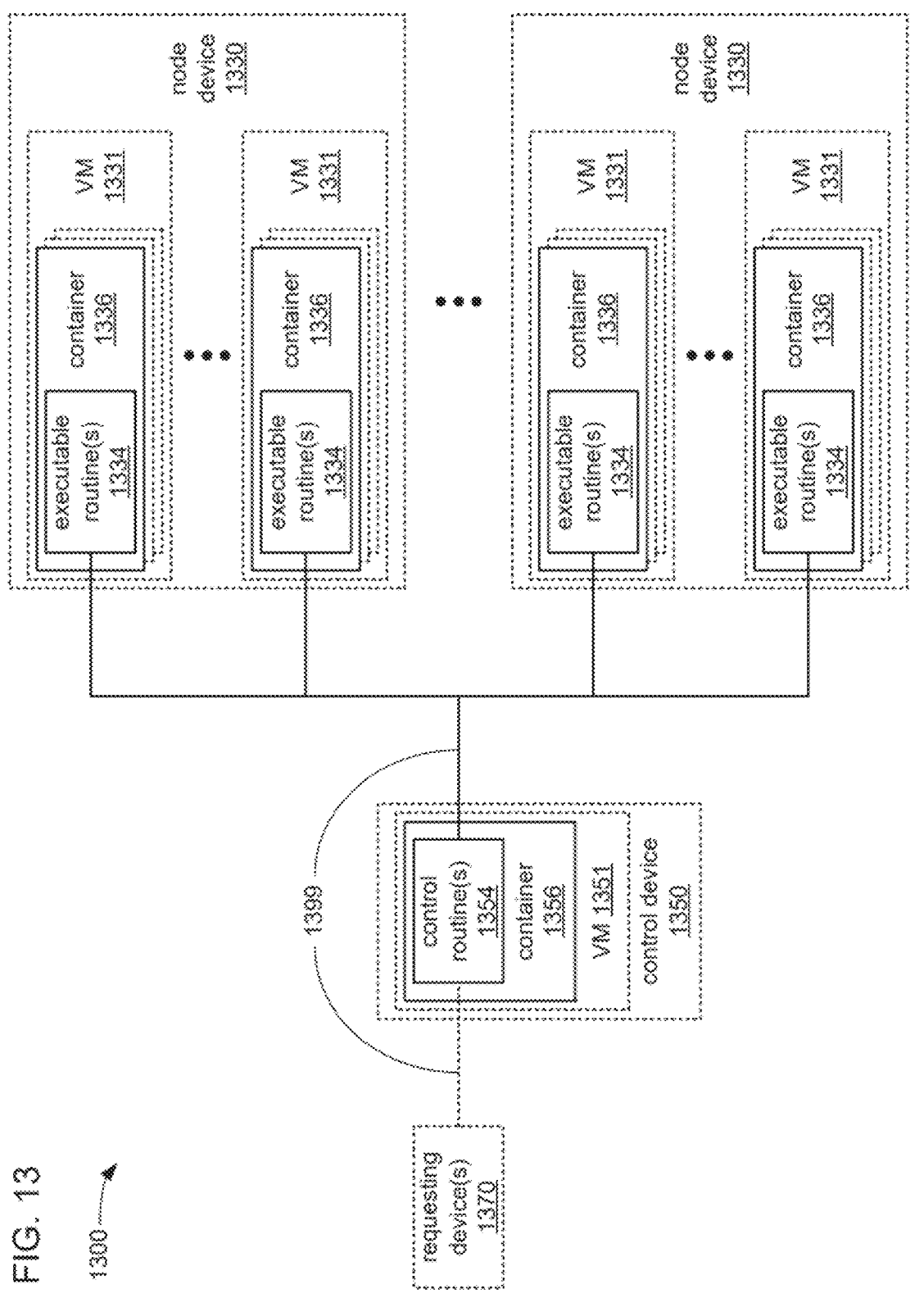
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to affect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the afore-described example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

The present disclosure is directed to an optimized in-place sorting technique. The in-place sorting technique is a type of a sorting mechanism that rearranges input data elements within the same memory space that the input data occupies. Therefore, in-place sorting techniques do not require an additional memory to hold the sorted elements. Heapsort is an example of an in-place sorting technique. Heapsort is a comparison based in-place sorting technique that uses a binary heap data structure. In particular, in heapsort, an input array of elements is converted into a max heap-a binary tree in which the element value of each node is greater than the element values of the children of that node. This way, the root node of the binary tree has the largest element value. The element value of the root node is swapped with the last element of the max heap. Two variations of the heapsort are common: Floyd's heapsort and William's heapsort. William's heapsort is described in greater detail in Williams, J. W. J. (1964), "*Algorithm* 232 —*Heapsort*," Communications of the ACM. 7(6): 347-348, the entirety of which is incorporated by reference herein. Floyd's heapsort is described in greater detail in Floyd, Robert W. (1964), "*Algorithm* 245 —*Treesort* 3," Communications of the ACM. 7(12):701, the entirety of which is incorporated by reference herein.

In contrast to in-place sorting which does not require an additional memory to sort the input data elements, out-of-place sorting techniques use an additional memory to store the sorted output data elements. Tournament sort is an example of an out-of-place sorting element. Tournament sorting is a comparison-based sorting technique in which pairs of data elements compete as "players" in multiple rounds of a "tournament." The "winner" of each pair moves to the next round of the tournament. In the next round, pairs of data elements are formed from the players that have advanced and the process repeats until a winner is found. The winner is moved to the additional memory to keep track of the sorted output data elements.

To compare various sorting techniques, a complexity comparison may be used. The complexity comparison may be used to compare, for example, a number of comparisons made to sort a given number of input data elements, the number of swaps required to sort the given number of input data elements, and computing resource requirements (e.g., need for additional memory). The complexity comparison may be indicative of the performance, efficiency, and scalability of a sorting technique. The greater the number of comparisons needed, the longer the sorting technique takes to complete, and therefore lower the efficiency. Similarly, the greater the number of swaps, the longer the sorting technique takes to complete, and therefore lower the efficiency. Thus, the number of comparisons and the number of swaps may limit the applicability and scalability of a particular sorting technique. Further, for sorting techniques, such as tournament sort, that require additional memory to sort, the greater the number of input data elements, the greater the size of additional memory needed. For example, if there are N input data elements to sort, at least an N amount of additional memory is needed. Further, the greater the size of each data element, the greater the size of the additional memory needed. Table 1 below compares the number of comparisons, number of swaps, additional memory, and in-sorting or out-of-place sorting of heapsort and tournament sort:

TABLE 1

| | Number of total comparisons in sorting N elements | Number of total swaps in sorting N elements | Additional memory needed (in bytes) | In-place Sorting? |
|---|---|---|---|---|
| Floyd's heapsort | N + 2N log₂ N | N + 2N log₂ N | 0 | Yes |
| William's heapsort | N log₂ N + 2N log₂ N | N log₂ N + 2N log₂ N | 0 | Yes |
| Tournament sort | N + N log₂ N | Move to new array | N*size of each element | No |

In Table 1 above, N is the number of input data elements to be sorted. Each input data element may be of a certain byte size. Thus, for comparison, for ten million input data elements (e.g., when N=10,000,000) to be sorted, Table 2 below provides an example of the number of comparisons and the number of swaps needed for sorting those elements based on the Equations provided in Table 1:

TABLE 2

| | Number of total comparisons in sorting 10 million elements | Number of total swaps in sorting 10 million elements | Additional Memory (in bytes) |
|---|---|---|---|
| Floyd's heapsort | ~475,069,933 | ~475,069,933 | 0 |
| William's heapsort | ~697,604,900 | ~697,604,900 | 0 |
| Tournament sort | ~242,534,967 | Move to new array of same size as the input array | 10,000,000* size of each element bytes |

Thus, as seen from Table 2, both types of heapsorts require at least double the number of comparisons and at least double the number of swaps than the tournament sort. Both heapsort and tournament sort may be performed in a plurality of iterations or tournaments. In each iteration or tournament, multiple swap operations and/or comparison operations may be executed. The greater the number of input data elements, the greater the number of iterations or tournaments, and the greater the number of comparisons and/or swaps needed in each iteration or tournament. Moreover, the greater the number of comparisons and swaps needed, the slower the sorting process (e.g., because each swap and comparison takes a given amount of time). Further, the greater the number of comparisons and swaps, the greater the burden on computing resources (e.g., because the computing resources need to be consumed for longer, more processing power is needed, etc.). Thus, because the tournament sort requires no swaps and fewer number of comparisons than both the heapsorts, the tournament sort may be faster than, and consume fewer computing resources, than the heapsorts. However, the tournament sort may require a large amount of additional memory, which the heapsorts do not require. Therefore, heapsorts and tournament sorts both have advantages and disadvantages.

The present disclosure provides a novel sorting technique that combines the advantages provided by the heapsorts and the tournament sort. In particular, the proposed approach provides a novel in-place sorting technique that also consumes a small amount of additional memory. The amount of additional memory consumed in the proposed approach may be significantly less than the amount of additional memory consumed in tournament sort. The proposed approach may be much faster than conventional in-place heapsort techniques. The proposed approach provides an in-place sorting of a one-dimensional array of N elements. The proposed approach iteratively finds the winner (also referred to herein as a champion) from the unsorted input data elements using a single-elimination tournament and swaps the champion with the next unsorted element, until all unsorted elements have been sorted.

To provide these advantages, the proposed disclosure provides a novel data structure, referred to herein as a Linked-Array Tournament Tree or LATT. The LATT efficiently keeps track of the players and winners in each tournament during the sorting process. The LATT is stored in the small amount of additional memory that is needed in the proposed approach. For an input array of length N, the proposed approach requires N pairwise comparisons to initialize the LATT and then requires (2N–M) log₂ N pairwise comparisons to update the LATT for turning all N elements into a sorted order, where M is the number of elements that are already at their sorted positions in the input array (e.g., do not need to be sorted). The proposed approach, unlike the tournament sort, does not use a separate array to store the sorted elements. Thus, the proposed approach does not need an additional memory of size N. Rather, the proposed approach needs a small amount of additional memory (e.g., less than N) to store the LATT. The LATT does not store any of the elements being sorted. Rather, the LATT stores an index value associated with each of the elements. The index values consume very little memory in the LATT. Therefore, storing the LATT does not require much additional memory. The input data elements are sorted in the same input data array. Therefore, the proposed approach is an in-place sorting technique. Because the proposed approach uses a LATT, the proposed approach is also referred to herein as a LATT sort.

Table 3 below provides equations for the number of comparisons and swaps needed in each round of the proposed approach:

TABLE 3

| | Number of total comparisons for sorting N elements | Number of total swaps for sorting N elements | Additional Memory (in bytes) | In-place Sorting? |
|---|---|---|---|---|
| LATT sort | $N + (2N - M) \log_2 N$ | N | N*size of (integer) | Yes |

In Table 3 above, sizeof (integer) is a fixed value, N is the number of input data elements to be sorted and M is the number of input data elements that are already in their sorted positions (e.g., do not need to be sorted). To compare the LATT sort with the Floyd and Williams' heapsorts and the tournament sort for sorting ten million elements, Table 4 provides the number of comparisons and swaps relative to Table 2 (the elements from Table 2 are also reproduced for ease of reference, assuming each element occupies 1024 times of the memory of an integer):

TABLE 4

| | Number of total comparisons for sorting 10 million elements | Number of total swaps for sorting 10 million elements | Additional Memory (in byes) |
|---|---|---|---|
| LATT sort | ~475,069,933 (iteration 1) ~475,069,910 (iteration 2) ~475,069,886 (iteration 3) . . . | 10,000,000 | 9765 |
| Floyd's heapsort | ~475,069,933 | ~475,069,933 | 0 |
| William's heapsort | ~697,604,900 | ~697,604,900 | 0 |
| Tournament sort | ~242,534,967 | Move to new array of same size as the input array | 10,000,000* size of each element |

Thus, as seen from Table 4 above, LATT sort requires considerably less additional memory than the tournament sort, as well as fewer comparisons and swaps than heapsort, thereby sorting the input data elements faster and consuming fewer computing resources. As discussed in more detail below, the number of comparisons in each round are reduced even further due to use of techniques that detect whether a comparison is needed or not before making the comparison. Furthermore, in heapsort, depending upon whether sorting in an ascending or descending order is desired, comparison metrics may change. However, with the proposed approach, no difference in technique is needed whether sorting in the ascending or descending order is desired.

The present disclosure cannot be practically performed in the human mind. Nor can it be practically performed using pen and paper. Real-world applications may have millions of input data elements to be sorted. A human mind is incapable of practically sorting all the input data elements accurately in a reasonable amount of time. The concepts of the present disclosure are not directed to any observations, evaluations, judgments, or opinions that a human mind can practically perform. Given the number of comparisons and swaps needed in each round, a computing unit is needed to perform the sorting. Further, the present disclosure does not recite a mathematical concept but is rather based on or involves mathematical concepts. In other words, the present disclosure is not directed to mathematical relationships, any specific mathematical formulas or equations, or any particular mathematical calculations. Rather, the present disclosure is directed to systems and methods that use an optimized sorting technique in a non-conventional manner for sorting input data elements by requiring fewer comparisons and swaps than conventional heapsort techniques and consuming significantly less additional memory than conventional tournament sort techniques. By using a novel data structure to efficiently keep track of the winners in each round, the proposed approach provides a particular solution (e.g., the LATT sort) that solves a particular problem (e.g., the technical problem of excessive consumption of computing resources, slower computations, etc.).

Figure 14:
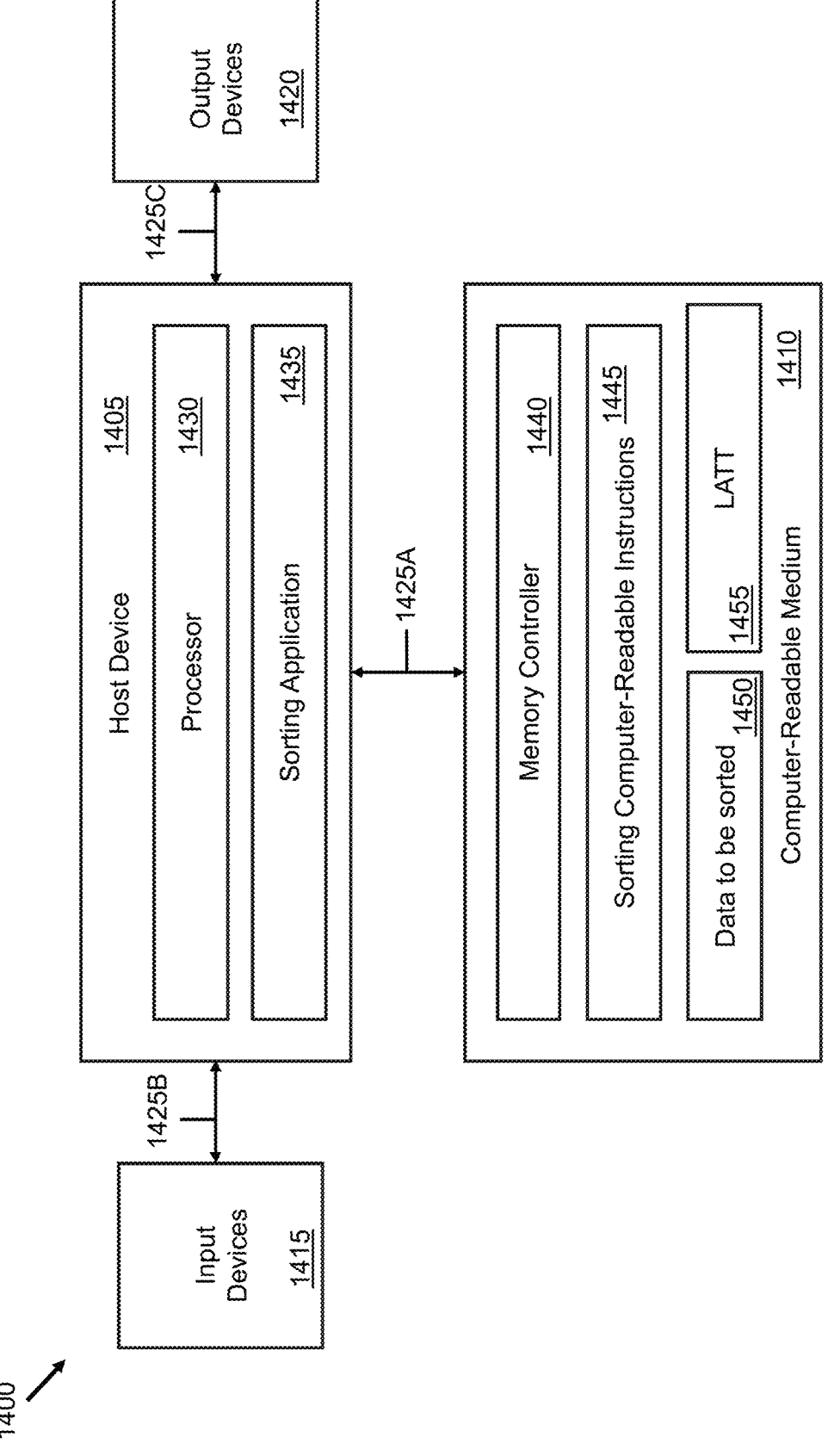
FIG. 14 illustrates a block diagram of an example sorting system, according to embodiments of the present technology.

Turning now to FIG. 14, a block diagram of an example sorting system 1400 is shown, in accordance with some embodiments of the present disclosure. The sorting system 1400 may be part of, or otherwise associated with, the computing environment 114. The sorting system 1400 includes a host device 1405 associated with a computer-readable medium 1410. The host device 1405 may be configured to receive input from one or more input devices 1415 and provide output to one or more output devices 1420. The host device 1405 may be configured to communicate with the computer-readable medium 1410, the input devices 1415, and the output devices 1420 via appropriate communication interfaces, buses, or channels 1425A, 1425B, and 1425C, respectively. The sorting system 1400 may be implemented in a variety of computing devices such as computers (e.g., desktop, laptop, etc.), servers, tablets, personal digital assistants, mobile devices, wearable computing devices such as smart watches, other handheld or portable devices, or any other computing units suitable for performing operations described herein using the host device 1405.

Further, some or all of the features described in the present disclosure may be implemented on a client device, an on-premise server device, a cloud/distributed computing environment, or a combination thereof. Additionally, unless otherwise indicated, functions described herein as being performed by a computing device (e.g., the Sorting system 1400) may be implemented by multiple computing devices in a distributed environment, and vice versa.

The input devices 1415 may include any of a variety of input technologies such as a keyboard, stylus, touch screen, mouse, track ball, keypad, microphone, voice recognition, motion recognition, remote controllers, input ports, one or more buttons, dials, joysticks, point of sale/service devices, card readers, chip readers, and any other input peripheral that is associated with the host device 1405 and that allows an external source, such as a user, to enter information (e.g., data) into the host device and send instructions to the host device 1405. Similarly, the output devices 1420 may include a variety of output technologies such as external memories, printers, speakers, displays, microphones, light emitting diodes, headphones, plotters, speech generating devices, video devices, and any other output peripherals that are configured to receive information (e.g., data) from the host device 1405. The "data" that is either input into the host device 1405 and/or output from the host device may include any of a variety of textual data, numerical data, alphanumerical data, graphical data, video data, sound data, position data, combinations thereof, or other types of analog and/or digital data that is suitable for processing using the Sorting system 1400.

The host device 1405 may include a processor 1430 that may be configured to execute instructions for running one or more applications associated with the host device 1405. In some embodiments, the instructions and data needed to run the one or more applications may be stored within the computer-readable medium 1410. The host device 1405 may also be configured to store the results of running the one or more applications within the computer-readable medium 1410. One such application on the host device 1405 may be a sorting application 1435. The sorting application 1435 may be used to sort an array of data elements in an ascending or descending order. The sorting application 1435 may facilitate implementation of a novel data structure to implement an in-sorting technique.

The sorting application 1435 may be executed by the processor 1430. The instructions to execute the sorting application 1435 may be stored within the computer-readable medium 1410. To facilitate communication between the host device 1405 and the computer-readable medium 1410, the computer-readable medium may include or be associated with a memory controller 1440. Although the memory controller 1440 is shown as being part of the computer-readable medium 1410, in some embodiments, the memory controller may instead be part of the host device 1405 or another element of the sorting system 1400 and operatively associated with the computer-readable medium 1410. The memory controller 1440 may be configured as a logical block or circuitry that receives instructions from the host device 1405 and performs operations in accordance with those instructions. For example, to execute the sorting application 1435, the host device 1405 may send a request to the memory controller 1440. The memory controller 1440 may read the instructions associated with the sorting application 1435. For example, the memory controller 1440 may read sorting computer-readable instructions 1445 stored within the computer-readable medium 1410 and send those instructions back to the host device 1405. In some embodiments, those instructions may be temporarily stored within a memory on the host device 1405. The processor 1430 may then execute those instructions by performing one or more operations called for by those instructions.

The computer-readable medium 1410 may include one or more memory circuits. The memory circuits may be any of a variety of memory types, including a variety of volatile memories, non-volatile memories, or a combination thereof. For example, in some embodiments, one or more of the memory circuits or portions thereof may include NAND flash memory cores. In other embodiments, one or more of the memory circuits or portions thereof may include NOR flash memory cores, Static Random Access Memory (SRAM) cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use within the computer-readable medium 1410. In some embodiments, one or more of the memory circuits or portions thereof may be configured as other types of storage class memory ("SCM"). Generally speaking, the memory circuits may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, cloud memory, or any combination of primary and/or secondary memory that is suitable for performing the operations described herein.

The computer-readable medium 1410 may also be configured to store data 1450. The data 1450 may include the input data elements that are to be sorted. The data 1450 may also include the output data elements that have been sorted. The data 1450 may further include any other data or information that is needed by the sorting application 1435 to perform the in-sorting operations described herein. The computer-readable medium 1410 may also be configured to store a LATT 1455. The LATT 1455 may be used by the sorting application 1435 to perform the in-sorting operations described herein.

It is to be understood that only some components of the sorting system 1400 are shown and described in FIG. 14. However, the sorting system 1400 may include other components such as various batteries and power sources, networking interfaces, routers, switches, external memory systems, controllers, etc. Generally speaking, the sorting system 1400 may include any of a variety of hardware, software, and/or firmware components that are needed or considered desirable in performing the functions described herein. Similarly, the host device 1405, the input devices 1415, the output devices 1420, and the computer-readable medium 1410, including the memory controller 1440, may include hardware, software, and/or firmware components that are considered necessary or desirable in performing the functions described herein.

Figure 15:
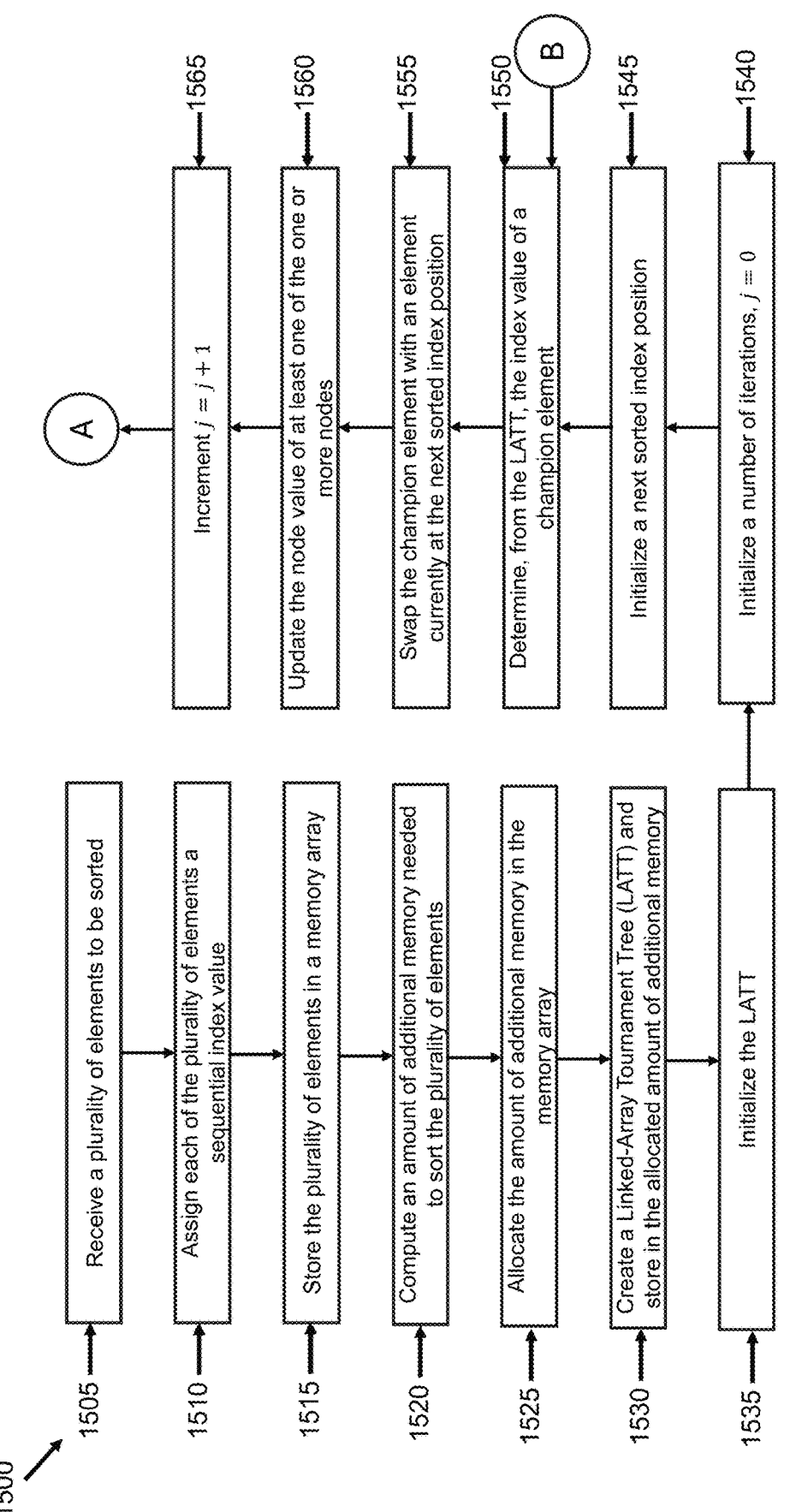
FIG. 15 illustrates a flowchart outlining example operations of the sorting system of FIG. 14 for implementing an in-place sorting approach, according to embodiments of the present technology.
Figure 15:
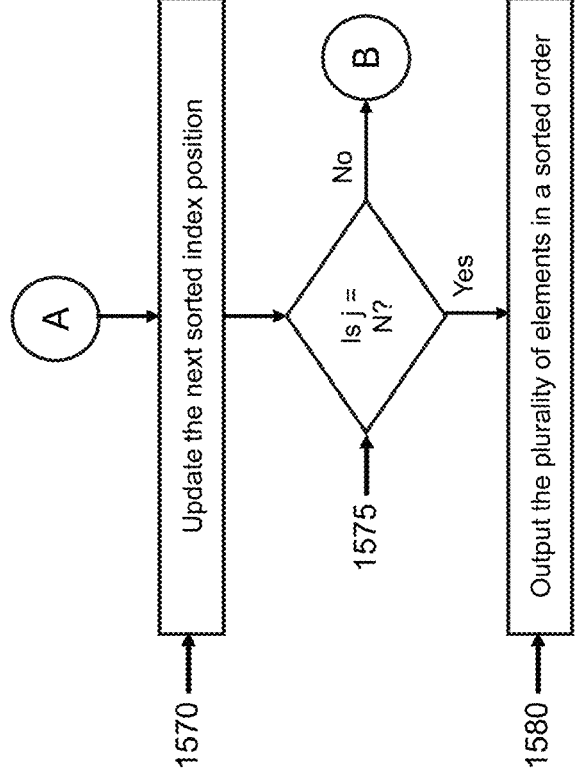

Referring now to FIG. 15, an example flowchart outlining operations of a process 1500 is shown, in accordance with some embodiments of the present disclosure. The process 1500 may be executed by one or more processors (e.g., the processor 1430) executing computer-readable instructions (e.g., the sorting computer-readable instructions 1445) associated with the sorting application 1435. The process 1500 may be used for performing in-place sorting of a plurality of data elements. The process 1500 may include other or additional operations in other embodiments. FIG. 15 is discussed in conjunction with FIGS. 16A-16L, which provides an example of the proposed approach.

Figure 16A:
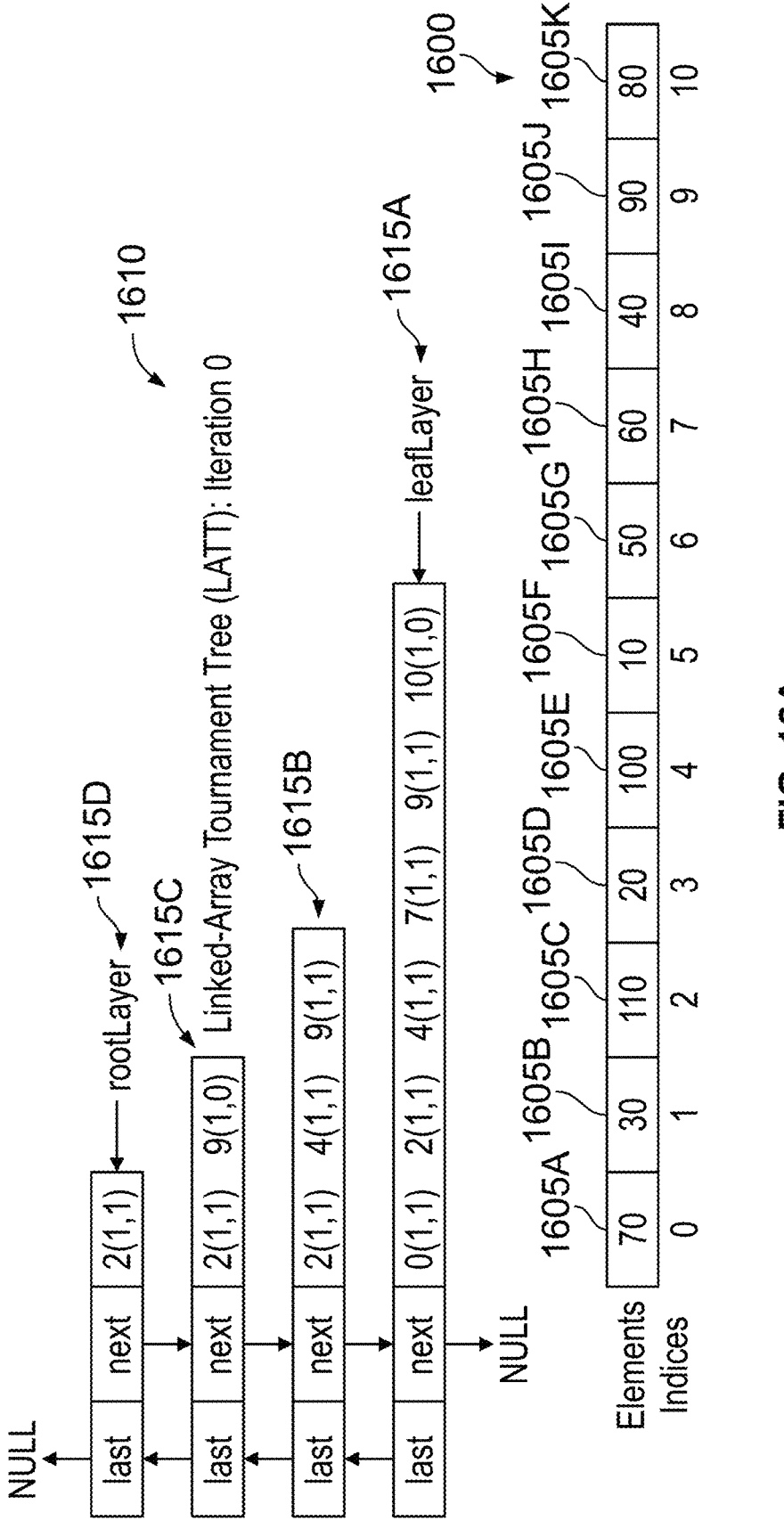
FIG. 16A illustrates a block diagram showing initialization of a Linked-Array Tournament Tree (LATT) in an example involving in-place sorting of eleven data elements using the operations of FIG. 15, according to embodiments of the present technology.

At operation 1505, the processor receives a plurality of elements $\{D_0, D_1, \ldots, D_{N-1}\}$ arranged in a data array to be sorted. The plurality of elements may include N elements. The data array may be a one-dimensional array (e.g., $1 \times N$) that includes the plurality of elements $\{D_0, D_1, \ldots, D_{N-1}\}$ to be sorted. In some embodiments, the plurality of elements may be numbers. In other embodiments, the plurality of elements may be alphabet or alphanumerical, and/or may include special characters. An example data array 1600 is shown in FIG. 16A. The data array 1600 includes 11 elements 1605A-1605K to be sorted. The number of elements in the data array 1600 is only an example. The number of elements in the data array 1600 may vary to include greater than or less than 11 elements. Further, the values of the elements 1605A-1605K are examples, and are not intended to limit the scope of the disclosure in any way.

At operation 1510, the processor assigns each of the plurality of elements {$D_0$, $D_1$, . . . , $D_{N-1}$} an index value. The index value may be an integer number. The index value of each element of the plurality of elements indicates the element's position in the data array. In some embodiments, the index values may be consecutive integer numbers starting from zero. For example, in some embodiments, the elements {$D_0$, $D_1$, . . . , $D_{N-1}$} in the data array may have index values {0, 1, . . . , N–1}. For example, in the example of FIGS. 16A-16L, the element 1605A is assigned an index value of 0, the element 1605B is assigned an index value of 1, the element 1605C is assigned an index value of 2, the element 1605D is assigned an index value of 3, the element 1605E is assigned an index value of 4, the element 1605F is assigned an index value of 5, the element 1605G is assigned an index value of 6, the element 1605H is assigned an index value of 7, the element 1605I is assigned an index value of 8, the element 1605J is assigned an index value of 9, and the element 1605K is assigned an index value of 10. Each index value may be associated with a particular location in a data array. For example, for N number of the plurality of elements, the data array may include N locations, and each location may have one of the plurality of elements stored therein and an index value associated therewith. Thus, the index value of a location may be associated with the element that is stored in that location. As discussed below, the elements may be moved around in the data array during the sorting process. However, the index values are not moved around. Thus, during the sorting process, the index value associated with a particular element may change.

At operation 1515, the processor stores the data array having the plurality of elements in a memory array. For example, the processor may store the data array 1600 in a memory array. In some embodiments, the data array 1600 may represent the data to be sorted 1450 that is stored within the computer-readable medium 1410. Thus, the data array 1600 may be stored within the computer-readable medium 1410. In some embodiments, the data array 1600 may be stored in another memory and associated with the processor for sorting the elements 1605A-1605K. The processor may also associate the elements 1605A-1605K in the data array 1600 with the corresponding index value assigned at the operation 1510. In some embodiments, the index value of each element may be intended to refer to, distinguish, and/or identify locations of the data array and/or to refer to, distinguish, and/or identify one element from another. The index value is not stored in the memory array.

At operation 1520, the processor computes an amount of additional memory needed to sort the plurality of elements. For example, the processor may compute the amount of additional memory needed to sort the elements 1605A-1605K. In some embodiments, the processor may compute the amount of additional memory using N*sizeof(integer), where sizeof (integer) is the size in bytes of an integer. In some embodiments, the sizeof (integer) may be dependent upon an expected maximum possible number of elements to be sorted. For example, in some embodiments, if a maximum of $10^{18}$ elements are expected to be sorted, the sizeof (integer) may be set to 8 bytes for any number of elements under one trillion. In some embodiments, a maximum of 4 bytes may be set for the sizeof (integer). In other embodiments, other values of the sizeof (integer) may be used. Further, in some embodiments, an additional 2 bits may be added for an indicator (e.g., indicator for the presence of left child (or opponent) and right child (or opponent) in a tournament, discussed below). Thus, the sizeof (integer) is a small sized value that does not depend on the nature of the array of elements to be sorted. The amount of additional memory needed with the proposed approach is significantly less than the amount of memory needed for storing the plurality of elements. Thus, if there are N elements, the amount of additional memory is fixed at N*sizeof(integer) regardless of the amount of memory needed for storing the plurality of elements.

At operation 1525, the processor allocates the amount of additional memory in the memory array based on the computation of the operation 1520. The amount of additional memory may be allocated from the computer-readable medium 1410. For example, the amount of additional memory may correspond to the memory in the computer-readable medium 1410 in which the LATT 1455 is stored. In some embodiments, the processor may allocate the amount of additional memory from the same memory array in which the data array is stored. In other embodiments, the processor allocate the amount of additional memory from a different memory array.

At operation 1530, the processor creates a Linked-Array Tournament Tree (LATT) and stores the created LATT in the amount of additional memory allocated at the operation 1525. For example, the processor creates a LATT 1610 for the data array 1600. The LATT is a data structure that keeps track of the players and winners in a tournament during sorting of the plurality of elements (e.g., the elements 1605A-1605K). The sorting process may be performed in a plurality of iterations. Each iteration may involve playing a tournament. A tournament may include a plurality of round of games. Each round of games may include a plurality of games. Each game may be played between two players: a left opponent and a right opponent. In each game, a winner is selected from the left opponent and the right opponent. The left opponent and the right opponent may be selected from the plurality of elements (e.g., the elements 1605A-1605K). In each round of games, an element of the plurality of elements may participate in only one game. For example, in a first round of games, each of the plurality of elements participates in one game of the plurality of games. The winner of each game advances to a second round of games. The second round of games occurs between the winners of the first round of games. Therefore, only a subset of the plurality of elements participates in the second round of games. The winners of the second round of games advance to a third round of games and compete again, and so on, until one champion is found. This is the champion of a tournament. The LATT may be used to keep track of the winners of each of the plurality of round of games in a tournament. After each tournament, the LATT may be updated.

A structure of the LATT may be defined as follows:

```
typedef struct LATT_NODE {
    unsigned int hasLeftChild : 1; // 1 = yes, 0 = no
    unsigned int hasRightChild : 1; // 1 = yes, 0 = no
    unsigned int index : 30; //index into the array of elements to be sorted
} lattNode_S;
typedef struct LATT_LAYER lattLayer_S;
struct LATT_LAYER {
    int nNodes; // length of the array of information nodes
    lattNode_S *nodes; // array of information nodes
    lattLayer_S *last; // which is one layer closer to the root layer
    lattLayer_S *next; // which is one layer closer to the layer of leaves
};
typedef struct LATT_TREE {
    int nLayers; // number of layers
    lattLayer_S *rootLayer; // root layer
```

-continued

```
lattLayer_S *leafLayer; // layer of leaves
int nElements; // length of the element array to be sorted
} lattTree_S;
```

Thus, the LATT, defined by lattTree_S, is a multi-layered structure having a plurality of layers. A number of the plurality of layers may be specified by nLayers. Each layer of the plurality of layers may be configured to track the winners of one round of games in a tournament. Each layer of the plurality of layers may be defined by lattLayer_S and may include an array of information nodes (also referred to herein as simply nodes). The length of the array of nodes (e.g., number of nodes) in each layer of the plurality of layers may be defined by nNodes. Each layer of the plurality of layers may include two links: a last link and a next link, pointing to adjacent layers. Each information node, as defined by lattNode_S, has three fields sharing the memory of a single integer: the binary fields hasLeftChild (left child value) and hasRightChild (right child value) to indicate the presence or absence of the left opponent and the right opponent that have produced the winner indexed by the index value. For example, if a game has a left opponent, the left child value may be 1. If a game does not have a left opponent, then the left child value is 0. Similarly, if a game has a right opponent, the right child value may be 1. If a game does not have a right opponent, then the right child value is 0. The LATT has two special layers: the layer pointed by rootLayer holds the information of final round of games and the layer pointed by leafLayer holds the information of the first round of games. Accordingly, the LATT 1610 includes a plurality of layers, and each of the plurality of layers includes one or more nodes. Each of the one or more nodes includes a node value defined by an index value, the left child value, and the right child value.

To create the LATT, the processor computes a number of the plurality of layers in the LATT, computes a number of the one or more nodes in each of the plurality of layers, creates a data structure with the computed number of the plurality of layers, with each layer of the plurality of layers having the computed number of the one or more nodes for that layer, links each of the plurality of layers with an adjacent layer of the plurality of layers, and stores the data structure in the allocated amount of additional memory.

The processor may compute the number of the plurality of layers by computing $\log_2 N$ and rounding up to the next integer value, where N is the number of the elements 1605A-1605K. Thus, the processor may compute the number of the plurality of layers by computing $\lceil \log_2 N \rceil$. The plurality of layers of the LATT may include $\{l_1, l_2, \ldots l_h\}$ layers, where $h = \lceil \log_2 N \rceil$, $l_1$ is a leaf layer, $l_h$ is a root layer, and $\{l_2, \ldots, l_{h-1}\}$ are one or more additional layers between the leaf layer and the root layer. In the example shown in FIGS. 16A-16L having 11 elements (N=11) in the data array 1600, the LATT 1610 may include $\lceil \log_2 11 \rceil$ or 4 layers, including a leaf layer 1615A, a first additional layer 1615B, a second additional layer 1615C, and a root layer 1615D. The leaf layer 1615A may be considered a lowest or bottommost layer, the root layer 1615D may be considered the highest or topmost layer, and the first additional layer 1615A and the second additional layer 1615B may be between the leaf layer and the root layer. The leaf layer 1615A may track the winners of a first round of games, the first additional layer 1615B may track the winners of a second round of games, the second additional layer 1615C may track the winners of a third round of games, and the root layer 1615D may be configured to track the winners of a fourth round of games. The root layer 1615D may be configured to store the winner of a tournament. The winner of a tournament is also referred to herein as a champion.

Each of the plurality of layers may be linked with an adjacent layer of the plurality of layers. Thus, in some embodiments, each layer of the plurality of layers may include two links: a last link and a next link. The last link connects a layer to the next higher layer and the next link connects a layer to the next lower layer. For example, the last link of the first additional layer 1615B links the first additional layer to the second additional layer 1615C and the next link of the first additional layer links the first additional layer to the leaf layer 1615A. The last link of the second additional layer 1615C links the second additional layer to the root layer 1615D and the next link of the second additional layer links the second additional layer to the first additional layer. The last link of the root layer 1615D is NULL because there is no other layers above the root layer. The next link of the root layer 1615D links the root layer to the second additional layer 1615C. The last link of the leaf layer 1615A links the leaf layer to the first additional layer 1615B and the next link of the leaf layer is NULL because there is no layer lower than the leaf layer. Thus, each layer of the plurality of layers of the LATT are linked to each other. In particular, each layer $l_x$ where x={$\lceil \log_2 N \rceil$, ($\lceil \log_2 N \rceil$-1), ($\lceil \log_2 N \rceil$-2), . . . , 2}, is linked to a next adjacent layer $l_{x-1}$. This linking may be used to keep track of the order of the layers and the round of games.

Further, as indicated above, in addition to the next link and the last link, each layer of the plurality of layers includes one or more nodes. The processor may compute the number of nodes in each of the plurality of layers by computing $$n_h = \left\lceil \frac{n_{h-1}}{2} \right\rceil,$$

where $n_h$ is the number of nodes in the $h^{th}$ layer of the plurality of layers, and h=1, 2, . . . $\lceil \log_2 N \rceil$. Thus, the leaf layer 1615A (where h=1) may have $n_0/2$ or N/2 number of nodes, rounded up to the next integer value. For example, for 11 elements, the leaf layer 1615A may include 11/2 or six nodes (e.g., 5.5 rounded up to the next integer number). The first additional layer 1615B may include $n_1/2$ or 3 nodes (e.g., 6/2 nodes, where 6 is the number of nodes in the leaf layer 1615A). The second additional layer 1615C may include $n_2/2$ or 2 nodes (e.g., 3/2 nodes rounded up to the next integer number, where 3 is the number of nodes in the first additional layer 1615B). The root layer 1615D may include $n_3/2$ or 1 node (e.g., 2/2 nodes, where 2 is the number of nodes in the second additional layer 1615C). Thus, the leaf layer 1615A has the greatest number of nodes, the root layer 1615D has a single node, and the first additional layer 1610A and the second additional layer 1610B each have more nodes than the root layer and fewer nodes than the leaf layer. Each layer closer to the root layer 1615D has fewer nodes than the next adjacent layer that is closer to the leaf layer 1615A.

Further, each node of each layer of the plurality of layers includes a node value. The node value for each node is the index value associated with a winner of a pairwise comparison between the plurality of elements. Thus, the node value tracks the winner of one game of the plurality of games. For example, if a game is played between the elements 1605A and 1605B, and the element 1605B won, the node value of a corresponding node in a particular layer is the index value currently associated with the element 1605B (e.g., 1). The node value of each node may further include a one bit left child value indicating presence of a left opponent in the pairwise comparison and a one bit right child value indicating presence of a right opponent in the pairwise comparison. In some embodiments, the left child value and the right child value may be included in parenthesis after the index value. In the example above of the game between the elements 1605A and 1605B, since both the left opponent (e.g., the element 1605A) and the right opponent (e.g., the element 1605B) are competing, the left child value is one and the right child value is also one. Thus, the node value for the above game may look like 0(1,1).

As discussed in more detail below, in some cases, a game between a pair of players may either not have a left opponent or a right opponent, or there may be both right and left opponents, but one of them may not be competing. As an example, if a game is between the elements 1605A (left opponent) and 1605B (right opponent), but the element 1605A is not competing (e.g., due to being in a sorted position already), the left child value in the node value may be 0. In such a situation, because the element 1605B (e.g., the right opponent) effectively has no competitor, the element 1605B may declare itself the winner. Thus, the node value may be 1(0, 1), where 0 indicates that the game was played with no left opponent (e.g., because the left opponent did not compete). As another example, because the elements 1605A-1605K include an odd number of elements (e.g., 11 elements), when these elements are divided into pairs for competing in the plurality of games, the last element 1605K does not have a partner to form a pair with. Thus, the tournament with the element 1605K has only one opponent—the element 1605K. If the element 1605K is the left opponent, then the tournament has no right opponent, and the right child value of the node value is 0. Alternatively, if the element 1605K is the right opponent, then the tournament does not have a left opponent, and the left child value in the node value is 0.

Thus, at the operation 1530, the processor creates the LATT and stores the LATT in the amount of additional memory allocated at the operation 1525. The LATT includes a plurality of layers linked to each other. Each layer of the plurality of layers includes one or more nodes, each node having a node value (which may not be populated yet).

At operation 1535, the processor initializes the LATT by populating the node value of each node of each of the plurality of layers. For example, when the LATT 1610 is first created, the structure of the LATT may be defined and stored in the amount of additional memory. However, the node values of the nodes may be empty. By initializing the LATT 1610, the processor computes the node value of each node in the LATT and populates the node value of each node with the computed node value. As indicated above, the node value for each node includes the index value of a winner of a pairwise comparison between the plurality of elements, the one bit left child value, and the one bit right child value. Initialization of the LATT 1610 may be considered an Iteration 0 in the sorting process. The initialization of the LATT 1610 is shown in FIG. 16A.

Referring to FIG. 16A in conjunction with FIG. 15, in some embodiments, the LATT 1610 may be initialized one layer at a time starting from the bottommost layer or the leaf layer 1615A. In other words, the nodes values of the nodes in the leaf layer 1615A may be determined and populated first. Using the node values of the nodes in the leaf layer 1615A, the node values of the nodes in the first additional layer 1615B may be computed and populated. Then, the nodes values of the nodes in the second additional layer 1615C may be computed and populated based on the node values of the nodes in the first additional layer 1615B. Finally, the node value of the node in the root layer 1615D may be computed and populated based on the node values of the nodes in the second additional layer 1615C. Thus, the node values are computed and populated starting from the bottom-most layer (e.g., the leaf layer) to the topmost layer (e.g., the root layer).

To initialize the LATT 1610, the processor divides the elements 1605A-1605K in the data array 1600 into a plurality of element pairs. For example, the processor may divide the elements 1605A-1605K into the plurality of element pairs as follows: first pair having the elements 1605A and 1605B, second pair having the elements 1605C and 1605D, third pair having the elements 1605E and 1605F, fourth pair having the elements 1605G and 1605H, fifth pair having the elements 1605I and 1605J, and sixth pair having the element 1605K. Thus, each element of the elements 1605A-1605K is included in only one of the element pairs. Although the element pairs in the example above include consecutive elements, in other embodiments, the element pairs need not include consecutive elements. In some embodiments, to sort N elements stored at non-consecutive or any arbitrary locations, the memory addresses associated with the plurality of elements may be stored in a one-dimensional array (e.g., of consecutive memory), and this one-dimensional array of memory addresses may be used to create the element pairs using element=content of address-array [index]. Further, the number of pairs may be equal to N/2 rounded up to the next integer value, which is equal to the number of nodes in the leaf layer 1615A.

Responsive to dividing the elements 1605A-1605K into the plurality of element pairs (e.g., the first pair through the sixth pair), each element pair plays a game. To play the games, the processor compares (e.g., in parallel) the element values of each element in an element pair to determine a winner in that element pair. For example, in some embodiments, to determine the winner of the first pair, the processor may compare the element values (e.g., 70 and 30) of the elements 1605A and 1605B in the first pair. Similarly, to determine the winner of the second pair, the processor may compare the element values (e.g., 110 and 20) of the elements 1605C and 1605D in the second pair, to determine the winner of the third pair, the processor may compare the element values (e.g., 100 and 10) of the elements 1605E and 1605F in the third pair, to determine the winner of the fourth pair, the processor may compare the element values (e.g., 50 and 60) of the elements 1605G and 1605H in the fourth pair, to determine the winner of the fifth pair, the processor may compare the element values (e.g., 40 and 90) of the elements 1605I and 1605J in the fifth pair, and to determine the winner of the sixth pair, the processor may compare the element value (e.g., 80) of the element 1605K with itself.

In some embodiments, the winner may be based on a maximum value. Thus, in each pair, the element having the higher element value may be declared the winner. For example, in the game of the first pair, the element 1605A may be declared the winner because 70 is greater than 30. In the game of the second pair, the element 1605C may be declared the winner because 110 is greater than 20. In the game of the third pair, the element 1605E may be declared the winner because 100 is greater than 10. In the game of the fourth pair, the element 1605H may be declared the winner because 60 is greater than 50. In the game of the fifth pair, the element 1605J may be declared the winner because 90 is greater than 40. In the game of the sixth pair, the element

1605K may be declared the winner because the element has no right opponent to compete with. In other embodiments, the winner may be based on the lowest value.

Responsive to determining the winner of each pairwise comparison, the processor determines the current index value of each of the winners. For example, the processor may determine the index values of the elements 1605A, 1605C, 1605E, 1605H, 1605J, and 1605K, each of which was declared a winner in the pairwise comparison. The processor may populate the node value of each of the N/2 nodes in the leaf layer 1615A with the index value of one of the winners. Further, the processor may populate the left child value and the right child value of each node value.

The number of element pairs is equal to the number of nodes in the leaf layer 1615A (e.g., six). Thus, the node value of each of the six nodes in the leaf layer 1615A is populated with the results of one of the six pairs. For example, to track the winner of the first pair, the processor may populate the node value of a first node as 0(1,1), where 0 is the index value of the element 1605A that won the game in the first pair and where (1,1) indicates that the game included both a left opponent (e.g., the element 1605A) and a right opponent (e.g., the element 1605B). Similarly, the processor may populate the node value of a second node in the leaf layer 1615A as 2(1,1) to indicate that the element 1605C having the index value of 2 won the game of the second pair and that the game included both left and right opponents. The processor may populate the node value of a third node in the leaf layer 1615A as 4(1,1) to indicate that the element 1605E having the index value of 4 won the game of the third pair and that the game included both left and right opponents. The processor may populate the node value of a fourth node in the leaf layer 1615A as 7(1,1) to indicate that the element 1605H having the index value of 7 won the game of the fourth pair and that the game included both left and right opponents. The processor may populate the node value of a fifth node in the leaf layer 1615A as 9(1, 1) to indicate that the element 1605J having the index value of 9 won the game of the fifth pair and that the game included both left and right opponents. The processor may populate the node value of a sixth node in the leaf layer 1615A as 10(1,0) to indicate that the element 1605K having the index value of 10 won the game of the sixth pair and that the game included only the left opponent and no right opponent.

Upon populating the node values of the nodes in the leaf layer 1615A, the processor may compute and populate the node values of the nodes in the first additional layer 1615B and the second additional layer 1615C. The processor may compute and populate the node value of each node in layer $l_x$ based on the next adjacent layer $l_{x-1}$ by dividing the nodes in the next adjacent layer $l_{x-1}$ into node pairs, determining the element values corresponding to the index values in each of the node pairs, comparing the element values in each of the node pairs to determine the winner in each of the node pairs, and populating the node value of each of the one or more nodes in layer $l_x$ with the index value of one of the winners of the node pairs.

For example, to compute and populate the node values of the nodes in the first additional layer 1615B, the processor creates node pairs from the nodes in the next adjacent layer (e.g., the leaf layer 1615A). Thus, the processor divides the 6 nodes in the leaf layer 1615A into 3 node pairs: first node pair including first and second nodes (e.g., having the node values 0(1,1) and 2(1,1)), second node pair having third and fourth nodes (e.g., having the node values 4(1,1) and 7(1,1)), and third node pair having fifth and sixth nodes (e.g., having the node values 9(1,1) and 10(1,0)). Thus, each node is only included in one node pair. Any two nodes may form a node pair, so long as each node is part of only node pair. Responsive to forming the node pairs, the processor may compare the element values of the elements whose index values are indicated in the node pair. For example, the processor may compare the element values (70 and 110) of the elements 1605A and 1605C whose index values are indicated in the first node pair made up of the nodes having node values 0(1,1) and 2(1,1) of the leaf layer 1615A. The processor may compare the element values (100 and 60) of the elements 1605E and 1605H whose index values are indicated in the second node pair made up of the nodes having node values 4(1,1) and 7(1, 1) of the leaf layer 1615A. The processor may compare the element values (90 and 80) of the elements 1605J and 1605K whose index values are indicated in the third node pair made up of the nodes having node values 9(1,1) and 10(1,0) of the leaf layer 1615A.

The processor may then determine the winner of each node pair. For example, the processor may determine which element value in each node pair is higher and determine the index value of the winner. For example, in the first node pair, the processor may determine that the element 1605C is the winner because 110 is greater than 70. In the second node pair, the processor may determine that the element 1605E is the winner because 100 is greater than 60. In the third node pair, the processor may determine that the element 1605J is the winner because 90 is greater than 80. The processor may determine the index values of the winning elements 1605C, 1605F, and 1605J. The processor may populate the node values of the nodes in the first additional layer 1615B with the index values of these winning elements. Thus, the processor populates the node value of a first node in the first additional layer 1615B as 2(1,1) where 2 is the index value of the element 1605C that won in the first node pair and (1,1) indicates that the game included both left and right opponents. The processor populates the node value of a second node in the first additional layer 1615B as 4(1,1) where 4 is the index value of the element 1605E that won in the second node pair and (1,1) indicates that the game included both left and right opponents. The processor populates the node value of a third node in the first additional layer 1615B as 9(1,1) where 9 is the index value of the element 1605J that won in the third node pair and (1,1) indicates that the game included both left and right opponents.

The processor may now use the node values of the nodes in the first additional layer 1615B to compute and populate the node values of the nodes in the second additional layer 1615C. Therefore, the processor divides the first node, second node, and third node of the first additional layer 1615B into node pairs. The first node having node value 2(1,1) and second node having node value 4(1,1) may form a first node pair and the third node having node value 9(1, 1) may form a second node pair. The second node pair only has one opponent. Similar to the first additional layer 1615B, the processor then determines which element value in each node pair is higher and determines the index value of the winner. Thus, the processor may compare the element values (110 and 100) of the elements 1605C and 1605E corresponding to the index values of the nodes in the first node pair to determine which element value is greater. The processor may determine that the element 1605C is the winner of the first node pair because 110 is greater than 100. The second node pair does not have an opponent. Thus, the element 1605J corresponding to the index value of the element in the second node pair may be declared the winner. The processor may then populate the node values of the nodes in the second additional layer based on the index values of the winners. For example, the processor populates the node value of a first node in the second additional layer 1615C as 2(1,1) where 2 is the index value of the element 1605C that won in the first node pair and (1,1) indicates that the game included both left and right opponents. The processor also populates the node value of a second node in the second additional layer 1615C as 9(1,0) where 9 is the index value of the element 1605J that won in the second node pair and (1,0) indicates that the game included only the left opponent.

Using the node values of the nodes in the second additional layer 1615C, the processor computes and populates the node value of the node in the root layer 1615D. Because the second additional layer 1615C only includes two nodes, those nodes form a single node pair. The processor compares the element values of the elements whose index values are indicated in the nodes of the second additional layer 1615C. Thus, the processor compares 110 and 90, which correspond to the elements 1605C and 1605J, respectively, having the index values 2 and 9, respectively, in the node values of the second additional layer 1615C. The processor determines that the node 1605C is the winner because 110 is greater than 90 and populates the node value of the node in the root layer 1615D as 2(1,1). The initialized LATT 1610 is shown in FIG. 16A.

At operation 1540, the processor initializes a number of iterations, j=0. In each iteration, one element of the plurality of elements may be sorted. Thus, for N elements, N iterations may be executed after the initialization (iteration 0) of the LATT.

At operation 1545, the processor initializes a next sorted index position. The next sorted index position is an index value where the next sorted element in the data array (e.g., the data array 1600) is to be located. In some embodiments, the processor may receive an indicator indicative of sorting the plurality of elements starting from a left side or a right side of the data array. If the indicator is to sort from the left side, the plurality of elements are sorted from left to right. If the indicator is to sort from the right side, the plurality of elements are sorted from right to left. The sorting may be in either ascending or descending order, depending on whether a maximum or minimum value is used to determine the winner in pairwise comparisons. For example, if the indicator is to sort from left side and sorting in descending order is desired, the winner may be selected based on a maximum value in the pairwise comparisons. Likewise, if the indicator is to sort from left side and sorting in ascending order is desired, the winner may be selected based on a minimum value in the pairwise comparisons. If the indicator is to sort from the right side and sorting in descending order is desired, the winner may be selected based on a minimum value in the pairwise comparisons. If the indicator is to sort from the right side and sorting in ascending order is desired, the winner may be selected based on a maximum value in the pairwise comparisons.

Based on the indicator, the next sorted index position may be initialized. For example, responsive to determining that the indicator is to sort the elements 1605A-1605K starting from the left side, the processor may initialize the next sorted index position as the index value (e.g., 0) of a first element of the plurality of elements. Or, responsive to determining that the indicator is to sort the plurality of elements starting from the right side, the processor may initialize the next sorted index position as the index value (e.g., 10) of a last element of the plurality of elements. The example of FIGS. 16A-16L is based on sorting in a descending order from the left side. Thus, the processor receives an indicator to sort the plurality of elements 1605A-1605K from the left side. Responsive to receiving the indicator, the processor may initialize the next sorted index position at the operation 1545 to the index value (e.g., 0) of the element 1605A. If the example had been to sort from the right side, the processor would have initialized the next sorted index position at the operation 1545 to the index value (e.g., 10) of the element 1605K. Thus, in the first iteration (e.g., when j=0), in the example of FIGS. 16A-16L, the next sorted index position is the index value of the element 1605A.

At operation 1550, the processor determines, from the LATT, the index value of a champion element of the plurality of elements from all the winners of the pairwise comparisons. In other words, the processor determines the champion of a tournament. The index value of the champion element is referred to herein as a champion position. The index value of the champion element corresponds to the node value in the root layer 1615D. In the example of FIGS. 16A-16L, in the first iteration (e.g., iteration 1), the processor determines the index value of the root layer 1615D as initialized at iteration 0. Therefore, the processor may determine that the index value of the champion element is 2 (e.g., because the node value of the node in the root layer 1615D is 2(1, 1)). The champion element is the element that has the highest value of all the plurality of elements 1605A-1605K that are competing. In iteration 1, all N elements are competing (e.g., because none of the elements have been sorted yet). Thus, the champion element has the highest element value in all of the N elements. The index value 2 is associated with the element 1605C. Thus, the processor determines that the element 1605C is the champion element.

Figure 16B:
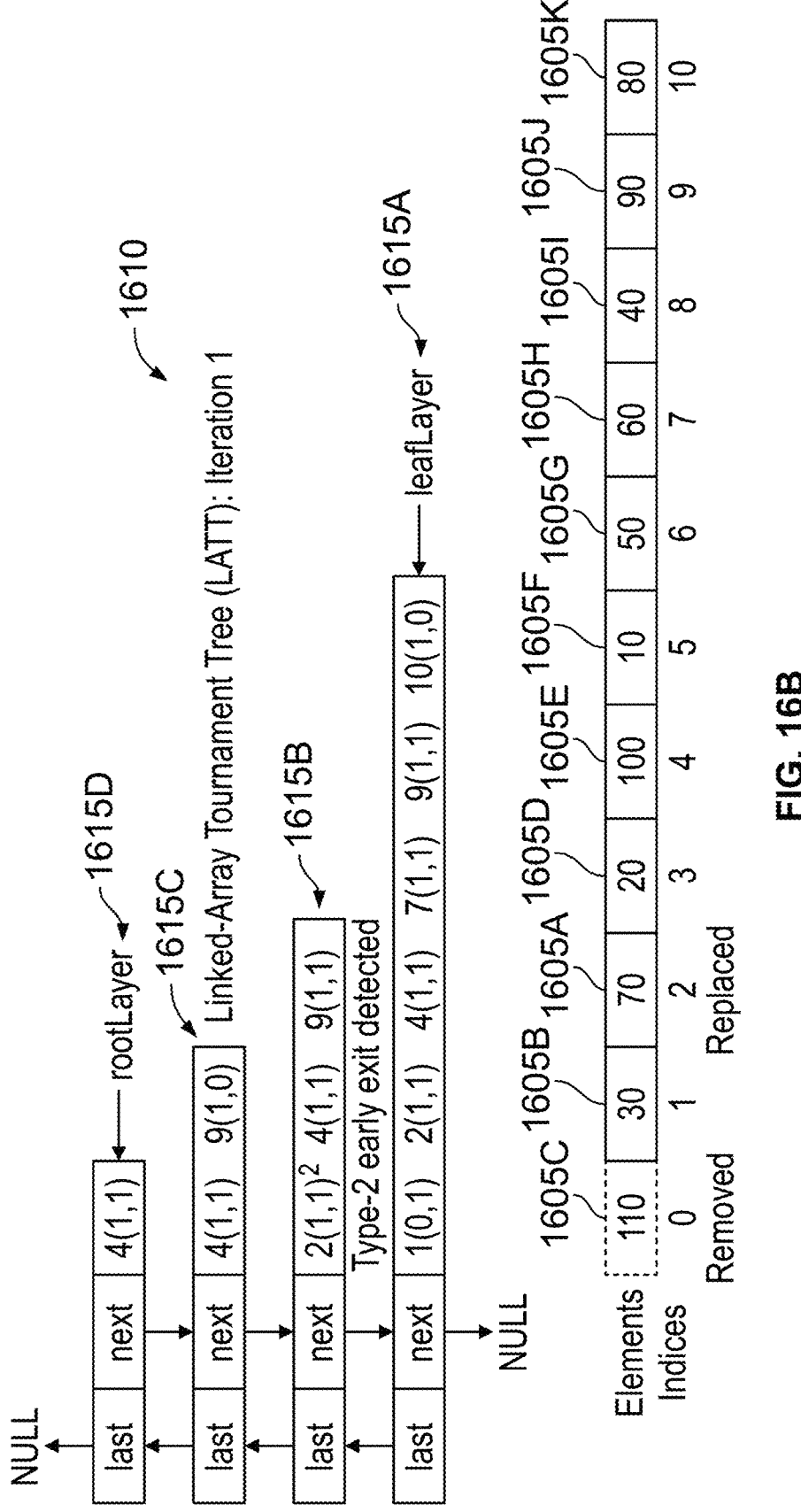
FIG. 16B illustrates a block diagram showing a first iteration of updating the LATT after the initialization of FIG. 16A, according to embodiments of the present technology.

At operation 1555, the processor swaps the champion element (e.g., the element 1605C) with the element 1605A currently located at the next sorted index position 0 in the data array 1600. After swapping, the champion element is in a sorted position in the data array 1600. The index values are not swapped. Only the element values at those index values are swapped. Thus, after the swap, the element 1605C is associated with the index value 0 and the element 1605A is associated with the index value of 2, as shown in FIG. 16B. After swapping, the element 1605C is in a sorted position in the data array 1600.

At operation 1560, after swapping the champion element with the element at the next sorted index position, the processor updates the node value of at least one of the one or more nodes in the LATT to obtain an updated LATT. Updating the LATT includes performing one or more additional pairwise comparisons between the plurality of elements. Updating the LATT includes performing a remove operation to remove the champion element from the LATT and performing a replace operation to update the winners in the LATT along the path from the champion position. Because the champion element is now already in a sorted position within the data array, the champion element need not participate in any further tournaments.

For example, the remove operation involves updating the LATT 1610 to remove the element 1605C (e.g., the champion element) from the LATT. The remove operation involves two elements: the champion element now located at the next sorted index position 0 and the replaced element (e.g., the element 1605A) now located at the champion position 2. To remove the champion element (e.g., the element 1605C) from the LATT, the processor updates the left child value or the right child value of each node in which the replaced element (e.g., the element 1605A) competed in the previous iteration. In particular, the processor may flip the value of the left child value or the right child value from 1 to 0 associated with the champion element in each node in which the replaced element competed.

To remove the champion element from the LATT, the processor may designate the champion element in the data array after swapping as a child node, determine a parent node of the child node in the leaf layer, and update the node value of the parent node by removing the champion element as an opponent. For example, to remove the champion element 1605C from the LATT 1610, the processor may designate the champion element 1605C as a child node. The processor locates the parent node of this child node in the leaf layer 1615A of the LATT 1610. Thus, the parent node of the child node is one of the 6 nodes in the leaf layer 1615A. In some embodiments, the processor may locate the parent node of a child node by dividing the index value currently associated with the child node by 2 and considering the whole number or integer part of the result (while discarding the portion after the decimal point). For example, in the data array 1600, after swapping, the champion element (e.g., the element 1605C) becomes associated with index value 0. Thus, the parent node of the champion element (e.g., the element 1605C) may be computed as 0/2 or 0. Therefore, the parent node of the champion element is node 0 (e.g., the first node having the node value 0(1,1) in FIG. 16A) in the leaf layer 1615A. Similarly, the parent nodes of each of the other elements in the data array 1600 may be determined. Two elements share the same parent node. For example, the element 1605B, which is associated with index value 1, may have a parent node determined by ½ or 0.5. Taking only the integer part of 0.5, the parent node of the element 1605B is also node 0 (e.g., the first node having the node value 0(1,1) in FIG. 16A).

Thus, the processor determines the parent node of the champion element in the leaf layer 1615A. The processor also determines if the champion element will be the left opponent or the right opponent in a game in the next iteration. For example, in a game involving the first element pair having the elements 1605C and 1605B in FIG. 16B, the processor may determine that the champion element (e.g., the element 1605C) will be the left opponent. Because the champion element is not going to compete any longer, the processor updates the left child value of the parent node to indicate that the left opponent is not going to participate anymore. Accordingly, the processor may change the node value of the parent node. For example, in iteration 0, the parent node (e.g., the first node having the node value 0(1,1)) of the champion element has the node value 0(1,1) indicating presence of both the left opponent and the right opponent. Because the champion element is not competing, the processor flips the left child value to 0. Further, without the left opponent, the right opponent automatically declares or promotes itself the winner. Thus, in the first element pair, the element 1605B automatically wins. Accordingly, the parent node's node value is updated to reflect the new winner. Thus, the node value of the parent node is changed from 0(1.1) (shown in FIG. 16A) to 1(0,1) shown in FIG. 16B. The node value 1(0,1) indicates that the element (e.g., the element 1605B) associated with the index value 1 is the winner and that the game only included a right opponent. In some embodiments, the winner may be updated in the replace operation and only the left child value may be updated in the remove operation.

After updating the node value of the parent node to remove the champion element as the opponent, the processor may check if that parent node's node value has the other opponent present or not. For example, in iteration 2 after a second element is swapped into a sorted position (e.g., see FIG. 16C), both the elements 1605C and 1605E have to be removed from the LATT. Thus, the node value of the parent node of the elements 1605C and 1605E becomes 1(0, 0) since the first element pair includes the nodes 1605C and 1605E, neither of whom are to compete. Thus, both the right opponent and the left opponent are removed from the game and the node value of the parent node of the elements 1605C and 1605E is changed to 1(0, 0) (the winner does not matter). Because neither element is competing in the first game, neither element will compete in any other game of the tournament either. Thus, the processor may update the node values of any other impacted node in the LATT 1610.

Figure 16C:
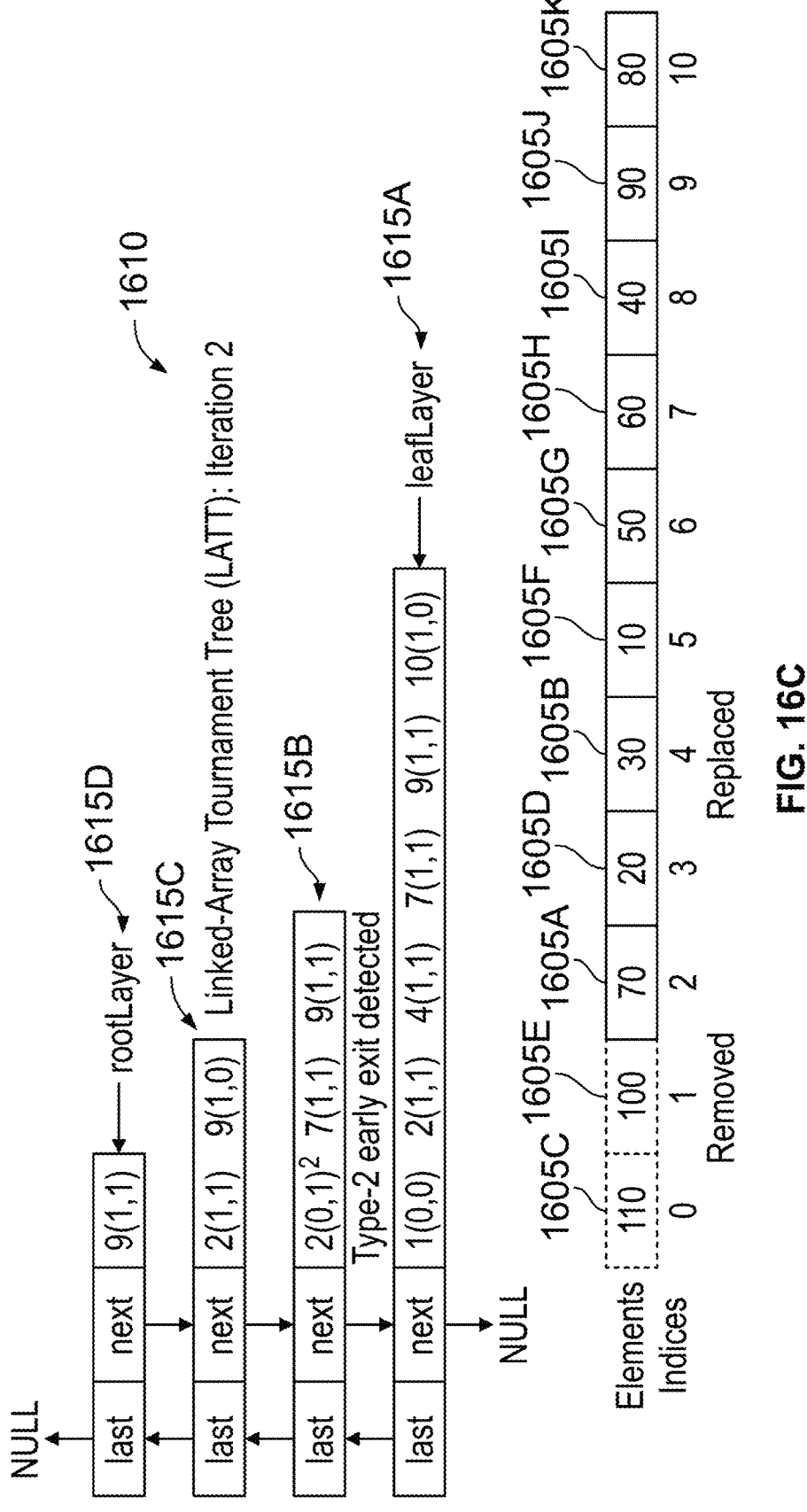
FIG. 16C illustrates a block diagram showing a second iteration of updating the LATT, according to embodiments of the present technology.

To do so, the processor may designate the parent node whose node value was just updated (e.g., the parent node of the elements 1605C and 1605E) as a child node and find the parent of that child node in the last higher layer. For example, the processor may determine the parent node in the first additional layer 1615B of the node having the node value 1(0, 0) in the leaf layer 1615A of FIG. 16C. Upon finding the parent node, the processor may update the node value of that parent node to reflect no left opponent. For example, the node value 2(1, 1) in FIG. 16B of the node in the first additional layer 1615B may be changed to 2(0, 1), as shown in FIG. 16C. Thus, if the node value of a child node has neither a left opponent nor a right opponent, the node value of the parent node of that child node may be updated to reflect no left opponent or right opponent (depending on whether the child node is the left opponent or the right opponent). The processor may similarly update the node values of all ancestors of the champion element in the LATT 1610.

In updating the LATT 1610 to remove the champion element, the processor may not need to update all ancestors of the position occupied by the champion element after the swapping. To minimize the number of pairwise comparisons (and therefore complete the sorting faster and reduce the burden on computing resources), the processor may determine if any of the below described two conditions are satisfied. If any of the below described two conditions are satisfied, the processor exits the remove operation and proceeds to the replace operation of updating the LATT 1610. When any of the two conditions are satisfied, no further comparisons or node updates are required in the remove operation.

The first condition occurs when an $$n^{th}_{parent}(\text{next sorted index position}) = n^{th}_{parent}(\text{champion position}),$$

where n=0, 1, 2, . . . , $\lceil \log_2 N \rceil$ and $$n^{th}_{parent}$$

is the parent node of a node in the $n^{th}$ layer of the LATT 1610, and the $0^{th}$ layer is the input array. The $$0^{th}_{parent}(.)$$

is self, the $$1^{th}_{parent}(.)$$

is the parent, the $$2^{nd}_{parent}(.)$$

is the grandparent, and so on. The first condition occurs at layers of the LATT 1610. In other words, the first condition occurs when an element of the plurality of elements located at the next sorted index position (namely, the position occupied by the champion element after the swapping) and the champion element (namely, the position occupied by the champion element before the swapping) have the same parent node in any layer of the plurality of layers of the LATT. In other words, if two elements share the same parent node (indicating those elements competed with each other in a game) at some layer (indicating the round of games the elements competed in), then additional comparisons amongst those elements or node updates are not needed after the $n^{th}$ layer.

The second condition occurs when, before the swap in an iteration, the $$element\left[n^{th}_{parent}(\text{next sorted index position})\right]$$

has lost in a $(n+1)^{th}$ round of games of a previous iteration, where n is the layer number of the plurality of layers in the LATT 1610. In this case, the comparisons and node updates are needed up to only the $n^{th}$ layer and no comparisons or node updates are needed after the $n^{th}$ layer. The leaf layer 1615A is the first layer, the first additional layer 1615B is the second layer, and so on. The node values of the nodes in the leaf layer 1615A are populated based on a first round of games, the node values of the nodes in the first additional layer 1615B are populated based on a second round of games, the node values of the nodes in the second additional layer 1615C are based on a third round of games, and the node value of the node in the root layer 1615D is based on a fourth game. In iteration 0, before the swap in iteration 1, the element 1605A is located at the next sorted index position. Thus, 70 is the element(next sorted index position). The parent node (e.g., $$1^{th}_{parent}$$

of element 70 in the first layer) is the node having the node value 0(1,1) in the leaf layer 1615A of FIG. 16A. Thus, the $(n+1)^{th}$ round of games is the second round of games (e.g., because n=1). In the second round of games, the element 70 lost (e.g., to the element 110). Thus, the second condition is satisfied. The first condition is referred to herein as type 1 exit and the second condition is referred to herein as type 2 exit. Once either a type 1 exit or a type 2 exit condition has been satisfied, the processor may exit the remove operation of updating the LATT 1610 and proceed to the replace operation of updating the LATT. Thus, the processor may check for satisfaction of the first exit or the second exit and responsive to satisfaction of either the first exit or the second exit, exit the remove operation and perform the replace operation.

After updating the LATT 1610 to remove the champion element, the processor still needs to update the remaining node values in the LATT to reflect the movement of the element that was swapped with the champion element. For example, in iteration 1, the processor needs to update the LATT 1610 to account for the movement of the element 1605A to the index value position 2. This updating of the LATT 1610 is the replace operation and requires updating $$n^{th}_{parent}(\text{champion position}),$$

for n=1, 2, . . . , $\lceil \log_2 (N) \rceil$, where the champion position is the position occupied by the champion before the swapping. In other words, the replace operation is a full bottom-up update of the winner indices in the nodes of the LATT starting from the position occupied by the champion before the swapping. There are no early exits in the replace operation.

Upon updating the node values of one or more nodes in the LATT 1610, at operation 1565, the processor increments j=j+1 to the next iteration. At operation 1570, the processor updates the next sorted index position. For example, the processor may update the next sorted index position=next sorted index position+1 responsive to determining that the indicator received at the operation 1545 was to sort the plurality of elements starting from the left side. Alternatively, the processor may update the next sorted index position=next sorted index position−1 responsive to determining that the indicator received at the operation 1545 was to sort the plurality of elements starting from the right side. Thus, in the example of FIGS. 16A-16L in which sorting is from a left side, in iteration 1 the next sorted index position corresponded to the index value of the element 1605A (e.g., index value 0) and this next sorted index position is updated to the next sorted index position (e.g., calculated as index value 0+1=index value 1) corresponding to the element 1605B for iteration 2. Thus, the index value corresponding to the element 1605B is where the next sorted element will be in iteration 2.

At operation 1575, the processor determines if j=N. As discussed above, in each iteration (after iteration 0), one element is sorted. Thus, to sort N elements, N iterations are needed. If at the operation 1575, the processor determines that j is not equal to N, the process 1500 loops back to the operation 1550. Otherwise, if at the operation 1575, the processor determines that j is equal to N, then at operation 1580, the processor outputs the data array 1600 having the plurality of elements 1605A-1605K in a sorted order.

Figure 16D:
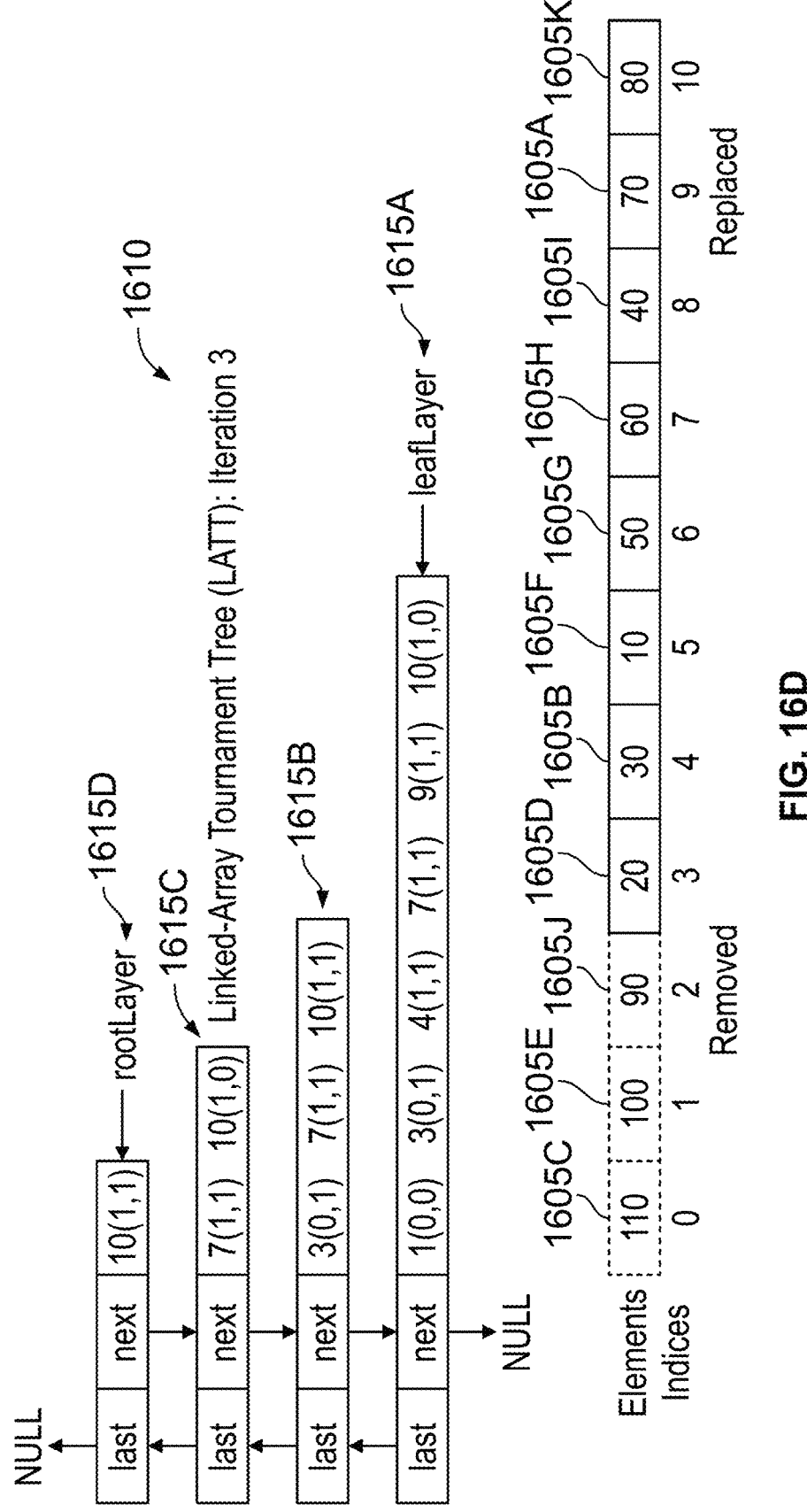
FIG. 16D illustrates a block diagram showing a third iteration of updating the LATT, according to embodiments of the present technology.
Figure 16E:
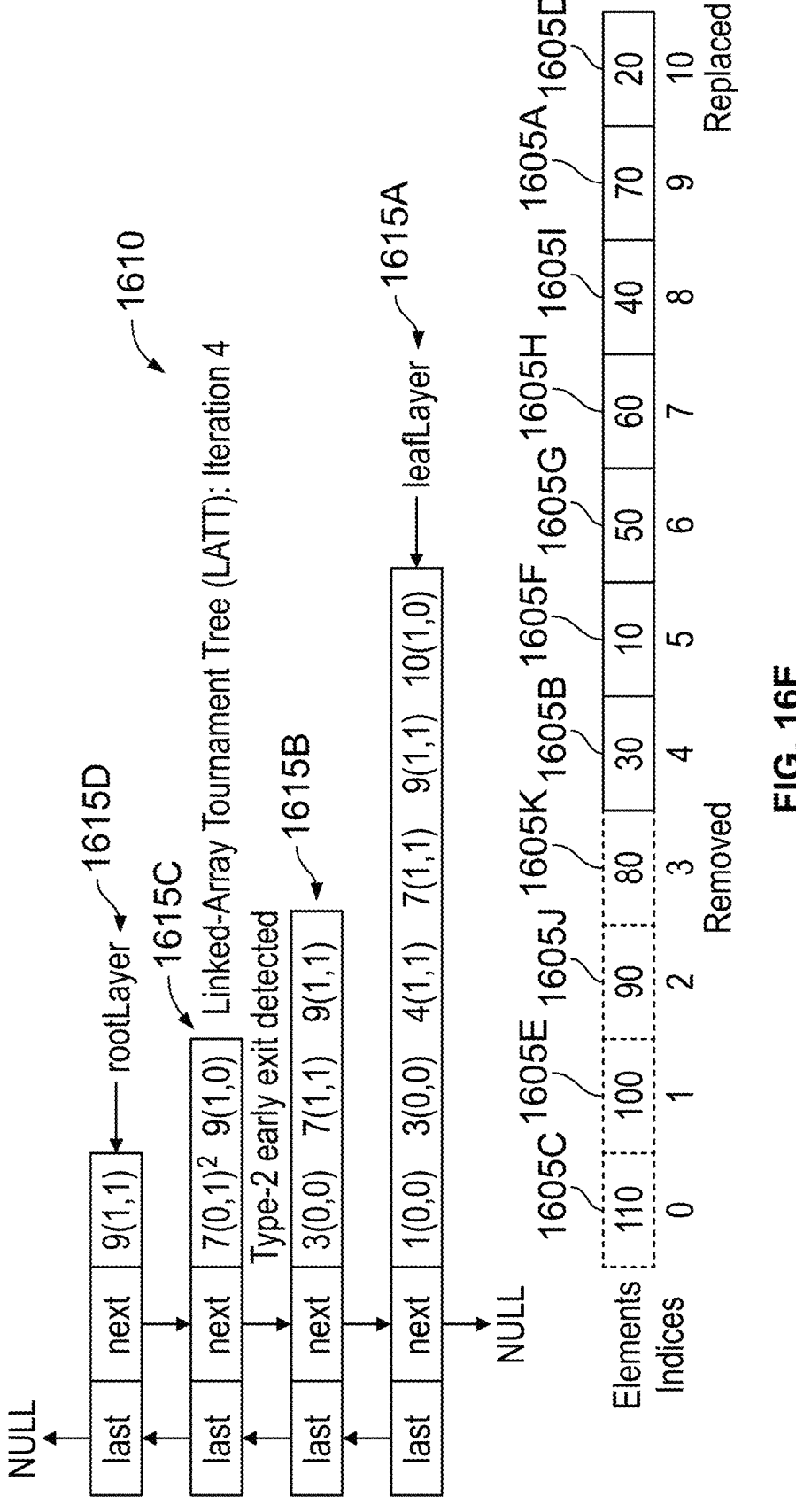
FIG. 16E illustrates a block diagram showing a fourth iteration of updating the LATT, according to embodiments of the present technology.
Figure 16F:
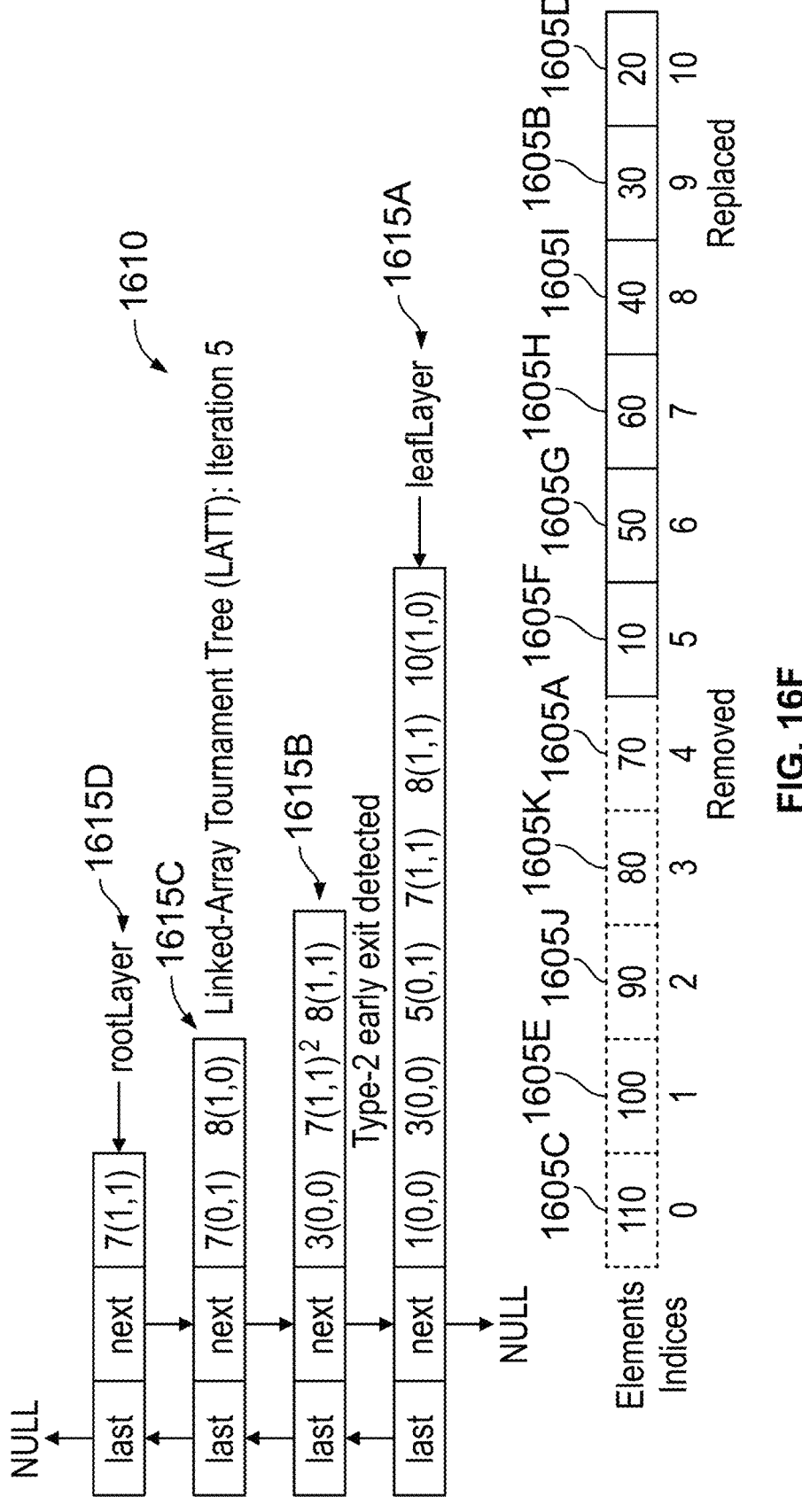
FIG. 16F illustrates a block diagram showing a fifth iteration of updating the LATT, according to embodiments of the present technology.
Figure 16G:
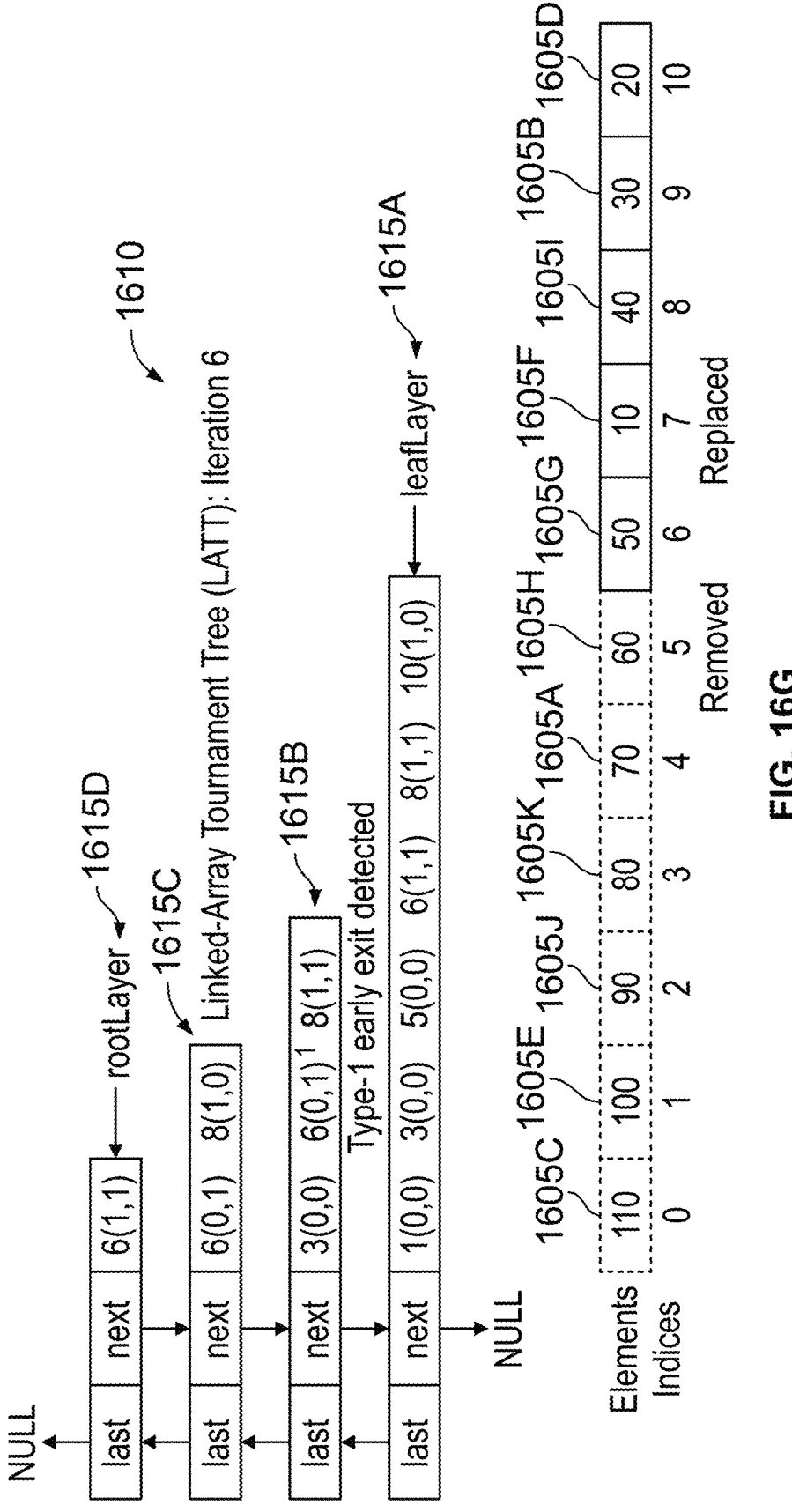
FIG. 16G illustrates a block diagram showing a sixth iteration of updating the LATT, according to embodiments of the present technology.
Figure 16H:
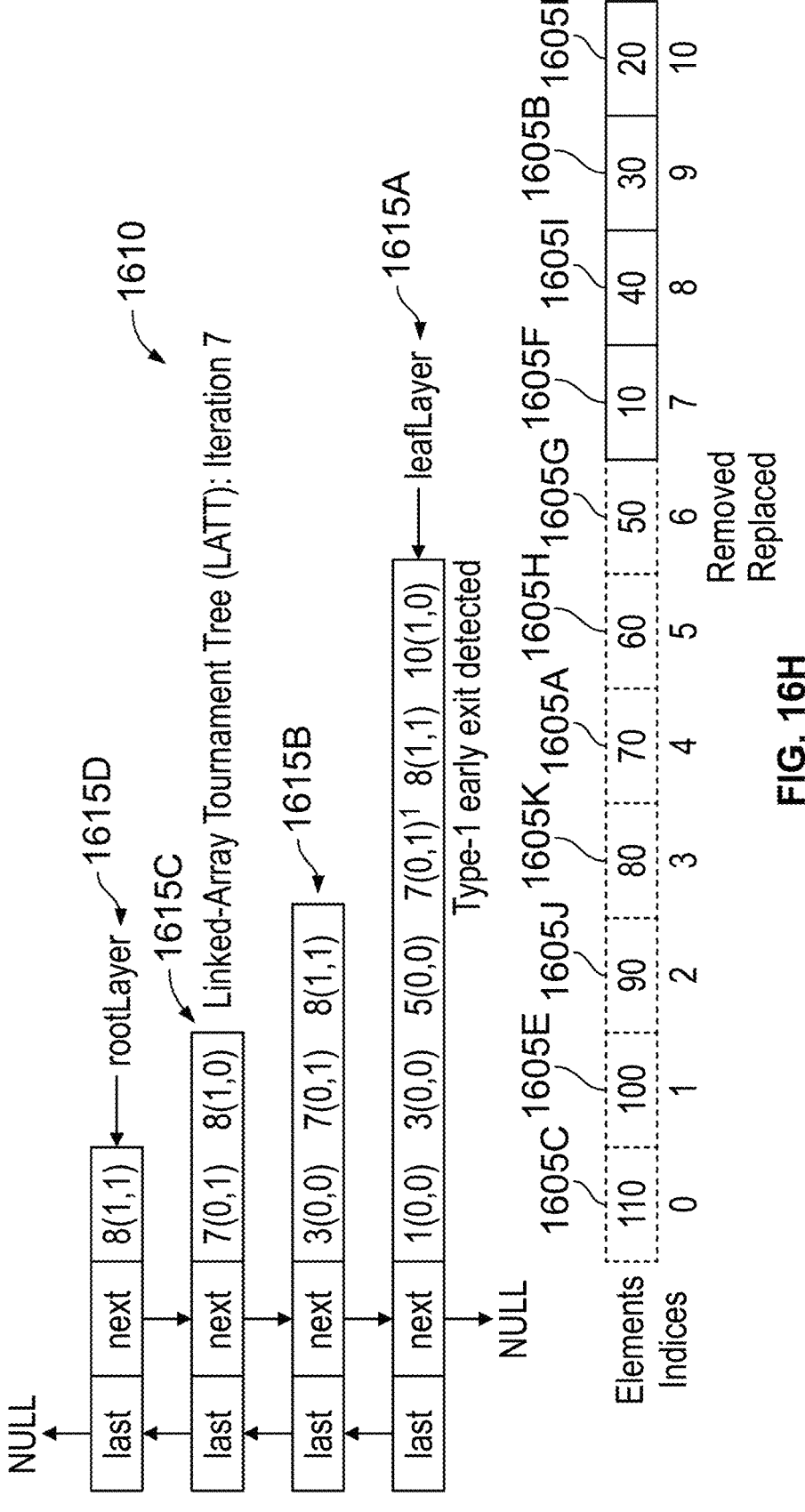
FIG. 16H illustrates a block diagram showing a seventh iteration of updating the LATT, according to embodiments of the present technology.
Figure 16I:
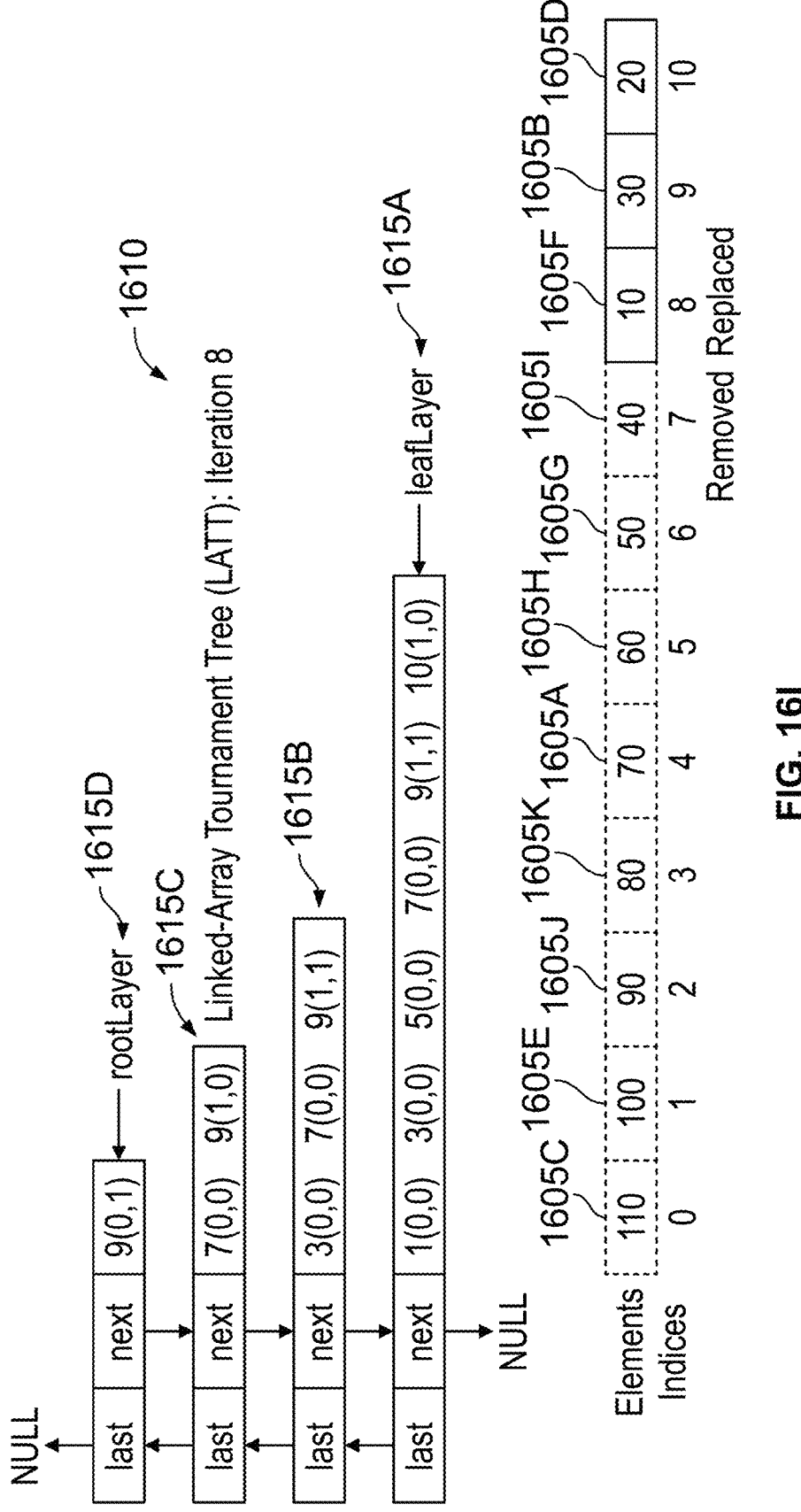
FIG. 16I illustrates a block diagram showing an eighth iteration of updating the LATT, according to embodiments of the present technology.
Figure 16J:
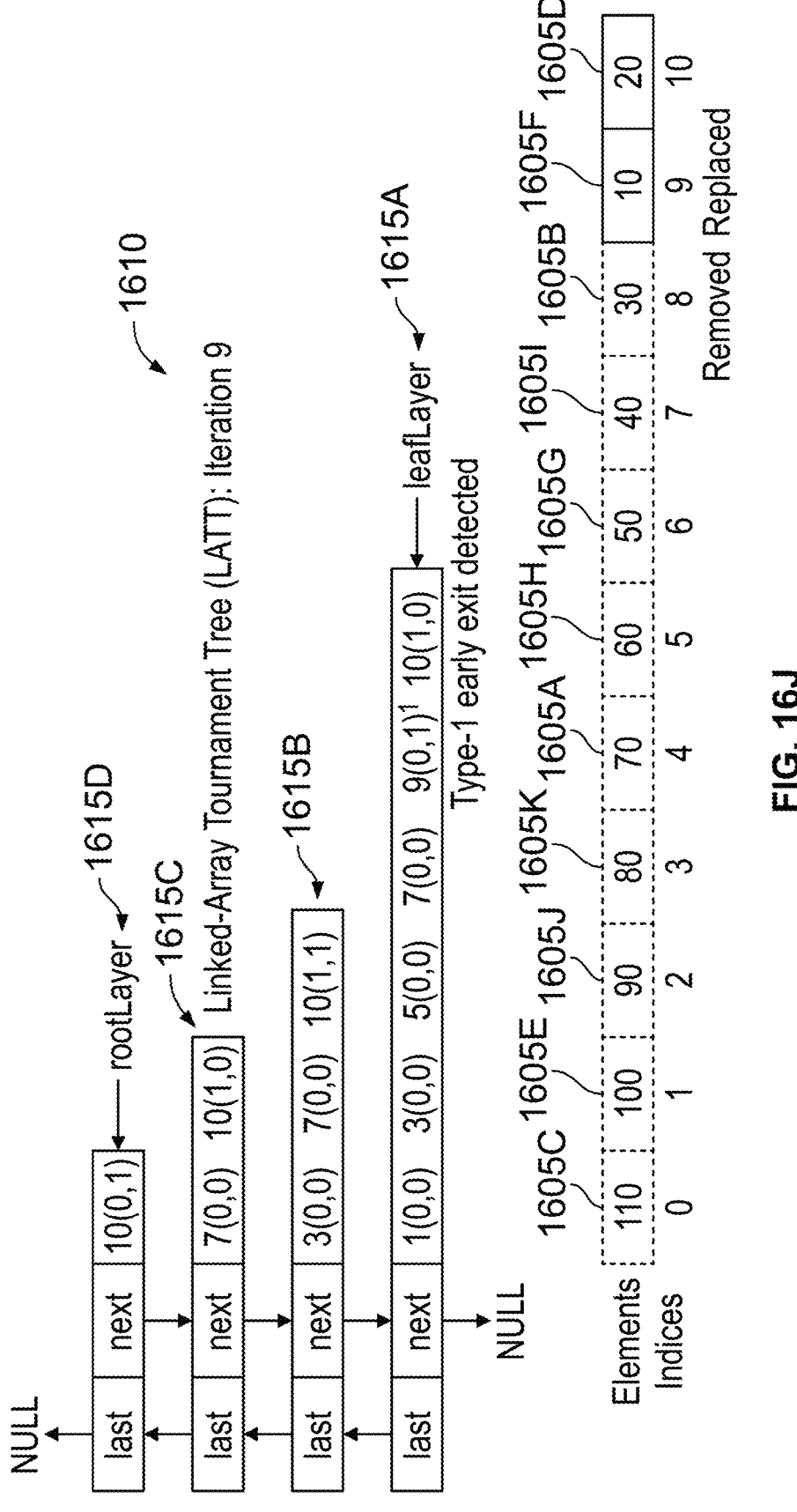
FIG. 16J illustrates a block diagram showing a ninth iteration of updating the LATT, according to embodiments of the present technology.
Figure 16K:
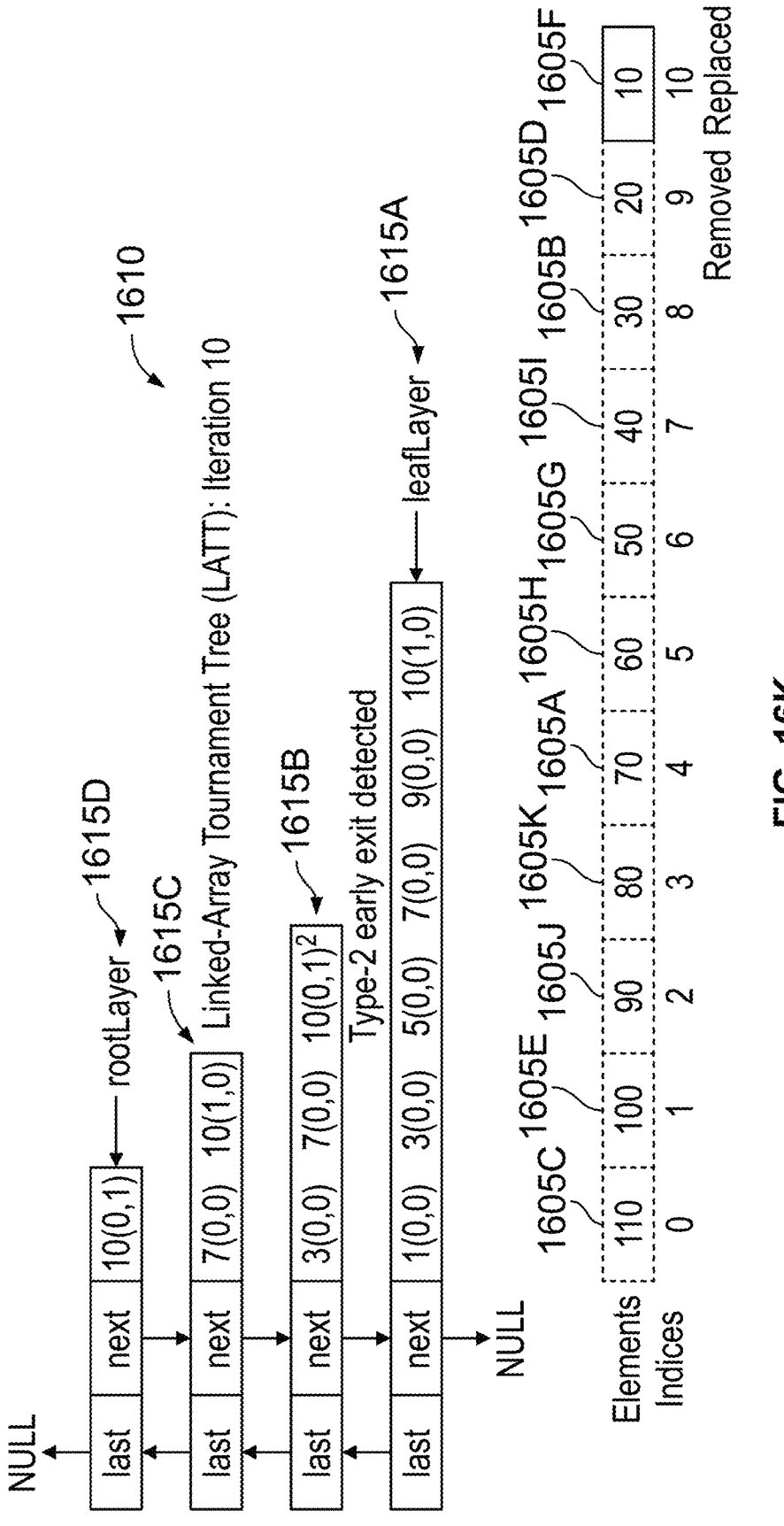
FIG. 16K illustrates a block diagram showing a tenth iteration of updating the LATT, according to embodiments of the present technology.
Figure 16L:
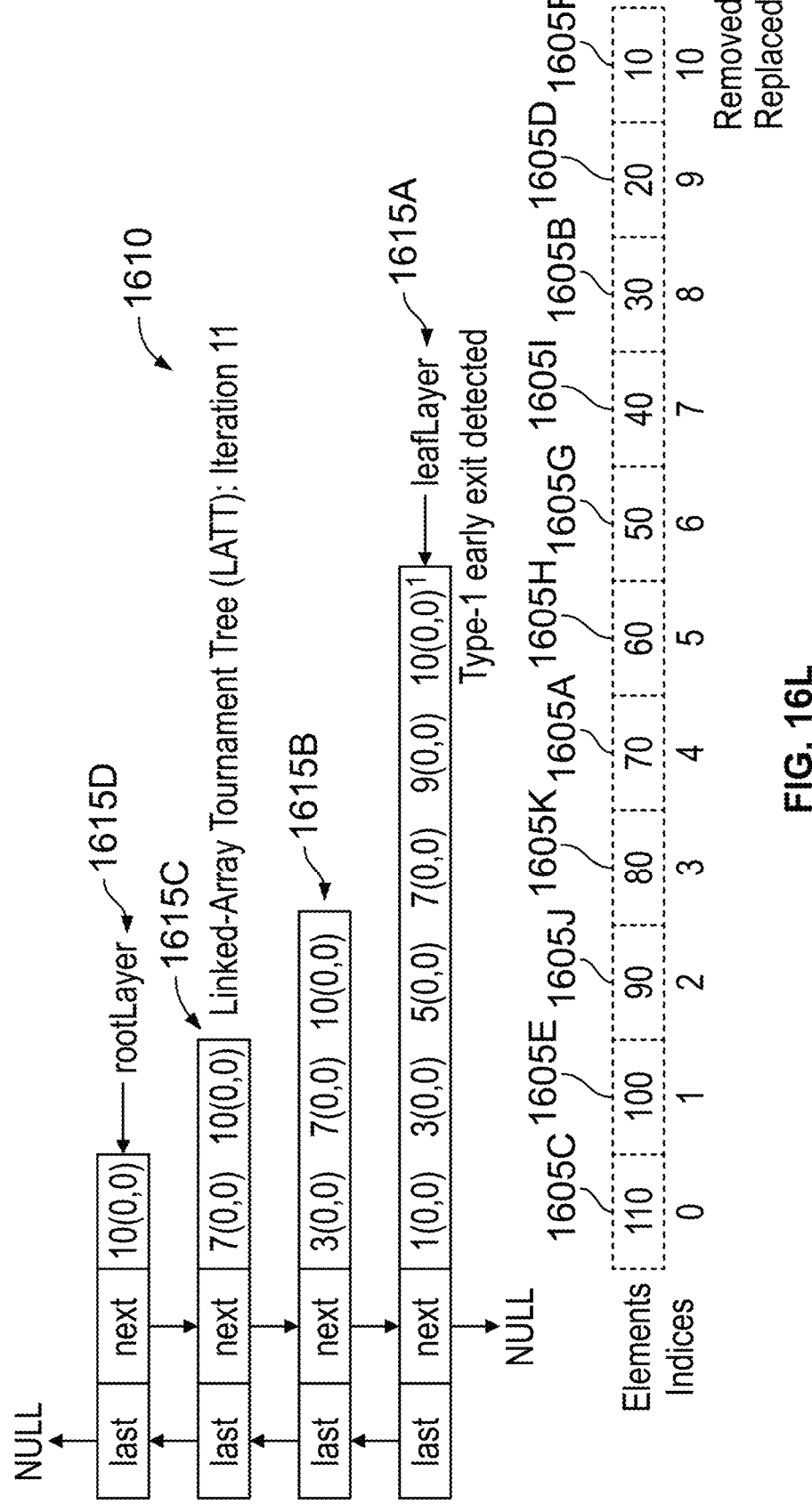
FIG. 16L illustrates a block diagram showing an eleventh iteration of updating the LATT, according to embodiments of the present technology.

Thus, FIG. 16B shows the LATT 1610 and the data array 1600 at the end of iteration 1, as discussed above. FIG. 16C shows the LATT 1610 and the data array 1600 at the end of iteration 2, FIG. 16D shows the LATT 1610 and the data array 1600 at the end of iteration 3, FIG. 16E shows the LATT 1610 and the data array 1600 at the end of iteration 4, FIG. 16F shows the LATT 1610 and the data array 1600 at the end of iteration 5, FIG. 16G shows the LATT 1610 and the data array 1600 at the end of iteration 6, FIG. 16H shows the LATT 1610 and the data array 1600 at the end of iteration 7, FIG. 16I shows the LATT 1610 and the data array 1600 at the end of iteration 8, FIG. 16J shows the LATT 1610 and the data array 1600 at the end of iteration 9, FIG. 16K shows the LATT 1610 and the data array 1600 at the end of iteration 10, and FIG. 16L shows the LATT 1610 and the data array 1600 at the end of iteration 11. The operations 1550-1575 of the process 1500 in each iteration after iteration 0 are explained in more detail below.

Iteration 1: Iteration 1 begins with the LATT 1610 and the data array 1600 of FIG. 16A. The next sorted index position corresponds to the index value 0 associated with the element 1605A (70). The champion element determined from the root layers 1615D of the LATT 1610 in FIG. 16A is the element 1605C (110). The champion position is the index value 2. The elements 110 and 70 are swapped such that after swapping, 110 is at the next sorted index position and 70 is at the champion position, as shown in FIG. 16B. The first node having the node value 0(1,1) in the leaf layer 1615A of FIG. 16A is updated to 1(0,1) to remove the element 110 from future sorting. The first condition is satisfied in the first additional layer 1615B since the next sorted index position (index value 0) and the champion position (index value 2) have the same ancestor node 2(1,1) in layer 1615B. In addition, the second condition is also satisfied in the first additional layer 1615B because before the swap, 70 lost in a second round of games of iteration 0. Thus, both type 2 exit and type 1 exit are detected at the same node having the node value 2(1,1) of the first additional layer 1615B. Upon detecting the type 2 and type 1 exits, no further ancestor node values need to be updated. In the replace operation, the index values of the winners starting from the champion position (e.g., index value 2) all the way to the node in the root layer 1615D are updated in the LATT 1610. Thus, the elements 1605A and 1605D are compared to update the node value 2(1,1) to 2(1, 1) in the leaf layer 1615A. The elements 1605A and 1605B are compared to update the node value of 2(1,1) to 2(1,1) in the first additional layer 1615B. The elements 1605A and 1605E are compared to update the node value of 2(1,1) to 4(1,1) in the second additional layer 1615C. The elements 1605E and 1605J are compared to update the node value of 2(1,1) to 4(1,1) in the root layer 1615D.

Iteration 2: Iteration 2 begins with the LATT 1610 and the data array 1600 of FIG. 16B. The next sorted index position corresponds to the index value 1 associated with the element 1605B (30). The champion element determined from the root layers 1615D of the LATT 1610 in FIG. 16B is the element 1605E (100). The champion position is the index value 4. The elements 30 and 100 are swapped such that after swapping, 100 is at the next sorted index position and 30 is at the champion position, as shown in FIG. 16C. The first node having the node value 1(0,1) in the leaf layer 1615A of FIG. 16B is updated to 1(0,0) to remove both the elements 110 and 100 from future sorting. Further, because neither the left opponent nor the right opponent are to compete in future games, the node value 2(1,1) of the node in the first additional layer 1615B is updated to 2(0,1). The first condition is satisfied in the second additional layer 1615C since the next sorted index position (index value 1) and the champion position (index value 4) have the same ancestor node 2(1,1) in layer 1615C. But the second condition is satisfied at a lower layer 1615B because before the swap, the element 1605B lost in a second round of games of iteration 1. Thus, a type 2 exit is detected the earliest at the node having the node value 2(1,1) of the first additional layer 1615B. Upon detecting the type 2 exit, no further ancestor node values need to be updated. In the replace operation, the index values of the winners starting from the champion position (e.g., index value 4) all the way to the node in the root layer 1615D are updated in the LATT 1610. Thus, the elements 1605B and 1605F are compared to update the node value 4(1,1) to 4(1,1) in the leaf layer 1615A. The elements 1605B and 1605H are compared to update the node value of 4(1,1) to 7(1,1) in the first additional layer 1615B. The elements 1605A and 1605H are compared to update the node value of 4(1,1) to 2(1,1) in the second additional layer 1615C. The elements 1605C and 1605J are compared to update the node value of 4(1,1) to 9(1,1) in the root layer 1615D.

Iteration 3: Iteration 3 begins with the LATT 1610 and the data array 1600 of FIG. 16C. The next sorted index position corresponds to the index value 2 associated with the element 1605A (70). The champion element determined from the root layers 1615D of the LATT 1610 in FIG. 16C is the element 1605J (90). The champion position is the index value 9. The elements 70 and 90 are swapped such that after swapping, 90 is at the next sorted index position and 70 is at the champion position, as shown in FIG. 16D. The second node having the node value 2(1, 1) in the leaf layer 1615A of FIG. 16C is updated to 3(0,1) to remove the element 90 from future sorting and to declare the element 1605D as the winner. Further, because in the second round of games, between the nodes having node values 1(0,0) and 3(0, 1), only the node with node value 3(0, 1) will compete, the node value 2(0,1) of the node in the first additional layer 1615B is updated to 3(0, 1). The first condition is not satisfied since the next sorted index position (index value 2) and the champion position (index value 9) do not have a same ancestor node in any non-root layer of the LATT 1610. The second condition is not satisfied because the element 1605A did not lose in any non-final round of games played against its opponents in iteration 2. Thus, neither type 1 exit nor type 2 exit is detected in iteration 3 and thus all ancestor nodes of 1505J need be updated. In the replace operation, the index values of the winners starting from the champion position (e.g., index value 9) all the way to the node in the root layer 1615D are updated in the LATT 1610. Thus, the elements 1605I and 1605A are compared to update the node value of 9(1,1) to 9(1,1) in the leaf layer 1615A. The elements 1605A and 1605K are compared to update the node value of 9(1,1) to 10(1,1) in the first additional layer 1615B. The elements 1605K is promoted with no opponent to update the node value of 9(1,0) to 10(1,0) in the second additional layer 1615C. The elements 1605H and 1605K are compared to update the node value of 9(1,1) to 10(1,1) in the root layer 1615D.

Iteration 4: Iteration 4 begins with the LATT 1610 and the data array 1600 of FIG. 16D. The next sorted index position corresponds to the index value 3 associated with the element 1605D (20). The champion element determined from the root layers 1615D of the LATT 1610 in FIG. 16D is the element 1605K (80). The champion position is the index value 10. The elements 20 and 80 are swapped such that after swapping, 80 is at the next sorted index position and 20 is at the champion position, as shown in FIG. 16E. The second node having the node value 3(0, 1) in the leaf layer 1615A of FIG. 16D is updated to 3(0,0) to remove the element 80 from future sorting. Further, because neither the left opponent nor the right opponent are to compete in future games, the node value 3(0,1) of the node in the first additional layer 1615B is updated to 3(0,0). Additionally, because in the third round of games, between the nodes having node values 3(0,0) and 7(1, 1), only the node with node value 7(1,1) will compete, the node value 7(1,1) of the node in the second additional layer 1615C is updated to 7(0, 1). The first condition is not satisfied since the next sorted index position (index value 3) and the champion position (index value 10) do not have a same ancestor node in any non-root layer of the LATT 1610. The second condition is satisfied at layer 1615C because before the swap, the element 1605D lost in a third round of games of iteration 3. Thus, type 2 exit is detected in iteration 4 and no further ancestor node values need to be updated for the remove operation above layer 1615C. In the replace operation, the index values of the winners starting from the champion position (e.g., index value 10) all the way to the node in the root layer 1615D are updated in the LATT 1610. Thus, the element 1605D is promoted with no opponent to update the node value of 10(1,0) to 10(1,0) in the leaf layer 1615A. The elements 1605A and 1605D are compared to update the node value of 10(1,1) to 9(1,1) in the first additional layer 1615B. The element 1605A is promoted with no opponent to update the node value of 10(1,0) to 9(1,0) in the second additional layer 1615C. The elements 1605H and 1605A are compared to update the node value of 10(1,1) to 9(1, 1) in the root layer 1615D.

Iteration 5: Iteration 5 begins with the LATT 1610 and the data array 1600 of FIG. 16E. The next sorted index position corresponds to the index value 4 associated with the element 1605B (30). The champion element determined from the root layers 1615D of the LATT 1610 in FIG. 16E is the element 1605A (70). The champion position is the index value 9. The elements 30 and 70 are swapped such that after swapping, 70 is at the next sorted index position and 30 is at the champion position, as shown in FIG. 16F. The third node having the node value 4(1, 1) in the leaf layer 1615A of FIG. 16E is updated to 5(0,1) to remove the element 70 from future sorting. The first condition is not satisfied since the next sorted index position (index value 4) and the champion position (index value 9) do not have a same ancestor node in any non-root layer of the LATT 1610. The second condition is satisfied in layer 1615B because before the swap, the element 1605B lost in a second round of games of iteration 4. Thus, type 2 exit is detected in iteration 5 and no further ancestor node values need to be updated for the remove operation above layer 1615B. In the replace operation, the index values of the winners starting from the champion position (e.g., index value 9) all the way to the node in the root layer 1615D are updated in the LATT 1610. Thus, the elements 1605I and 1605B are compared to update the node value of 9(1,1) to 8(1,1) in the leaf layer 1615A. The elements 1605I and 1605D are compared to update the node value of 9(1,1) to 8(1,1) in the first additional layer 1615B. The elements 1605I is promoted with no opponent to update the node value of 9(1,0) to 8(1,0) in the second additional layer 1615C. The elements 1605H and 1605I are compared to update the node value of 9(1,1) to 7(1,1) in the root layer 1615D.

Iteration 6: Iteration 6 begins with the LATT 1610 and the data array 1600 of FIG. 16F. The next sorted index position corresponds to the index value 5 associated with the element 1605F (10). The champion element determined from the root layers 1615D of the LATT 1610 in FIG. 16F is the element 1605H (60). The champion position is the index value 7. The elements 10 and 60 are swapped such that after swapping, 60 is at the next sorted index position and 10 is at the champion position, as shown in FIG. 16G. The third node having the node value 5(0, 1) in the leaf layer 1615A of FIG. 16F is updated to 5(0,0) to remove the element 60 from future sorting. Further, because neither the left opponent nor the right opponent are to compete in future games, the node value 7(1,1) of the node in the first additional layer 1615B is updated to 6(0,1) (e.g., to remove the left opponent and also declare the element associated with index value 6 to be the winner). Additionally, because in the third round of games, between the nodes having node values 3(0,0) and 6(0, 1), only the node with node value 6(0,1) will compete, the node value 7(0,1) of the node in the second additional layer 1615C is updated to 6(0, 1). The first condition is satisfied in layer 1615B since the next sorted index position (index value 5) and the champion position (index value 7)

have a same ancestor node (e.g., the node with the node value 6(0, 1)) in the first additional layer 1615B of the LATT 1610, as shown in FIG. 16G. The second condition is also satisfied in layer 1615B because before the swap, the element 1605F lost in a second round of games of iteration 5. Thus, both type 1 and type 2 exit are detected in the same layer 1615B in iteration 6. Hence, no further ancestor node values need to be updated for the remove operation above layer 1615B. When the conditions are satisfied at different layers, the remove operation exits from the lower layer. In other words, the remove operation exists upon the first satisfaction of any early exit condition. In the replace operation, the index values of the winners starting from champion position (e.g., index value 7) all the way to the node in the root layer 1615D are updated in the LATT 1610. Thus, the elements 1605G and 1605F are compared to update the node value of 7(1,1) to 6(1,1) in the leaf layer 1615A. The element 1605G is promoted with no opponent to update the node value of 7(1,1) to 6(0,1) in the first additional layer 1615B. The element 1605G is promoted with no opponent to update the node value of 7(0,1) to 6(0,1) in the second additional layer 1615C. The elements 1605G and 1605I are compared to update the node value of 7(1,1) to 6(1,1) in the root layer 1615D.

Iteration 7: Iteration 7 begins with the LATT 1610 and the data array 1600 of FIG. 16G. The next sorted index position corresponds to the index value 6 associated with the element 1605G (50). The champion element determined from the root layers 1615D of the LATT 1610 in FIG. 16G is the element 1605G (50). The champion position is the index value 6. Because the champion element is already at the next sorted index position, no swapping is needed. The fourth node having the node value 6(1,1) in the leaf layer 1615A of FIG. 16G is updated to 7(0, 1) to remove the element 50 from future sorting. The first condition is satisfied in layer 1615A since the next sorted index position (index value 6) is equal to the champion position (index value 6). Hence, the remove operation has early exit from layer 1615A. In the replace operation, the index values of the winners starting from the champion position (e.g., index value 6) all the way to the node in the root layer 1615D are updated in the LATT 1610. Thus, the element 1605F is promoted with no opponent to update the node value of 6(1,1) to 7(0,1) in the leaf layer 1615A. The element 1605F is promoted with no opponent to update the node value of 6(0,1) to 7(0,1) in the first additional layer 1615B. The element 1605F is promoted with no opponent to update the node value of 6(0,1) to 7(0,1) in the second additional layer 1615C. The elements 1605F and 1605I are compared to update the node value of 6(1,1) to 8(1,1) in the root layer 1615D.

Iteration 8: Iteration 8 begins with the LATT 1610 and the data array 1600 of FIG. 16H. The next sorted index position corresponds to the index value 7 associated with the element 1605F (10). The champion element determined from the root layers 1615D of the LATT 1610 in FIG. 16H is the element 1605I (40). The champion position is the index value 8. The elements 10 and 40 are swapped such that after swapping, 40 is at the next sorted index position and 10 is at the champion position, as shown in FIG. 16I. The fourth node having the node value 7(0,1) in the leaf layer 1615A of FIG. 16H is updated to 7(0,0) to remove the element 40 from future sorting. Further, because neither the left opponent nor the right opponent are to compete in future games, the node value 7(0,1) of the node in the first additional layer 1615B of FIG. 16H is updated to 7(0,0). Additionally, because in the third round of games, between the nodes having node values 3(0,0) and 7(0,0), neither node will compete, the node value 7(0,1) of the node in the second additional layer 1615C is updated to 7(0,0). Moreover, because the node with node value 7(0,0) in the second additional layer 1615C will not compete in the fourth game, the node value 8(1, 1) of the node in root layer 1615D may be updated to 9(1, 0). The first condition is not satisfied since the next sorted index position (index value 7) and the champion position (index value 8) do not have a same ancestor node in any non-root layer of the LATT 1610. The second condition is not satisfied because before the swap, 10 did not lose in any non-final round of games of iteration 7. Thus, neither type 1 exit nor type 2 exit is detected in iteration 8 and thus all ancestor nodes of 1505F need be updated. In the replace operation, the index values of the winners starting from the champion position (e.g., index value 8) all the way to the node in the root layer 1615D are updated in the LATT 1610. Thus, the elements 1605F and 1605B are compared to update the node value of 8(1,1) to 9(1,1) in the leaf layer 1615A. The elements 1605B and 1605D are compared to update the node value of 8(1,1) to 9(1,1) in the first additional layer 1615B. The element 1605B is promoted with no opponent to update the node value of 8(1,0) to 9(1,0) in the second additional layer 1615C. The element 1605B is promoted with no opponent to update the node value of 8(1,1) to 9(0,1) in the root layer 1615D.

Iteration 9: Iteration 9 begins with the LATT 1610 and the data array 1600 of FIG. 16I. The next sorted index position corresponds to the index value 8 associated with the element 1605F (10). The champion element determined from the root layers 1615D of the LATT 1610 in FIG. 16I is the element 1605B (30). The champion position is the index value 9. The elements 10 and 30 are swapped such that after swapping, 30 is at the next sorted index position and 10 is at the champion position, as shown in FIG. 16J. The fifth node having node value 9(1,1) in the leaf layer 1615A of FIG. 16I is updated to 9(0,1) to remove the element 30 from future sorting. The first condition is satisfied at the lowest layer since the next sorted index position (index value 8) and the champion position (index value 9) have the same ancestor node 9(0,1) in the leaf layer 1615A. Hence, the remove operation exits from the leaf layer. In the replace operation, the index values of the winners starting from the champion position (e.g., index value 9) all the way to the node in the root layer 1615D are updated in the LATT 1610. Thus, the element 1605F is promoted with no opponent to update the node value of 9(1,1) to 9(0,1) in the leaf layer 1615A. The elements 1605F and 1605D are updated from the node value of 9(1,1) to 10(1,1) in the first additional layer 1615B. The element 1605D is promoted with no opponent to update the node value of 9(1,0) to 10(1,0) in the second additional layer 1615C. The element 1605D is promoted with no opponent to update the node value of 9(0,1) to 10(0,1) in the root layer 1615D.

Iteration 10: Iteration 10 begins with the LATT 1610 and the data array 1600 of FIG. 16J. The next sorted index position corresponds to the index value 9 associated with the element 1605F (10). The champion element determined from the root layers 1615D of the LATT 1610 in FIG. 16J is the element 1605D (20). The champion position is the index value 10. The elements 10 and 20 are swapped such that after swapping, 20 is at the next sorted index position and 10 is at the champion position, as shown in FIG. 16K. The fifth node having the node value 9(0,1) in the leaf layer 1615A of FIG. 16J is updated to 9(0,0) to remove the element 20 from future sorting. Further, because neither the left opponent nor the right opponent are to compete in future games, the node value 10(1,1) of the node in the first additional layer 1615B of FIG. 16J is updated to 10(0,1). The first condition is satisfied in layer 1615B since the next sorted index position (index value 9) and the champion position (index value 10) have the same ancestor node 10(0,1) in layer 1615B. The second condition is also satisfied because before the swap, the element 1605F lost in a second round of games of iteration 9. Because the type 1 exit and the type 2 exit are detected in layer 1615B, the remove operation is exited from the layer 1615B. In the replace operation, the index values of the winners starting from the champion position (e.g., index value 10) all the way to the node in the root layer 1615D are updated in the LATT 1610. Thus, the element 1605F is promoted with no opponent to update the node value of 10(1,0) to 10(1,0) in the leaf layer 1615A. The element 1605F is promoted with no opponent to update the node value of 10(1,1) to 10(0,1) in the first additional layer 1615B. The element 1605F is promoted with no opponent to update the node value of 10(1,0) to 10(1,0) in the second additional layer 1615C. The element 1605F is promoted with no opponent to update the node value of 10(0,1) to 10(0,1) in the root layer 1615D.

Iteration 11: Iteration 11 begins with the LATT 1610 and the data array 1600 of FIG. 16K. The next sorted index position corresponds to the index value 10 associated with the element 1605F (10). The champion element determined from the root layers 1615D of the LATT 1610 in FIG. 16K is the element 1605F (10). The champion position is the index value 10. Because the champion element is already at the next sorted index position, no swapping is needed. The sixth node having the node value 10(1,0) in the leaf layer 1615A of FIG. 16K is updated to 10(0,0) to remove the element 10 from future sorting. The first condition is satisfied since the next sorted index position (index value 10) is equal to the champion position (index value 10). Once the first condition is satisfied at the lowest layer (leaf layer), the second condition need not be tested. Thus, a type 1 exit is detected in iteration 11. Because iteration 11 is the last iteration, the replace operation need not be performed. The data array 1600 after iteration 11 may be the output of the operation 1580.

Thus, in each iteration, the number of pairwise comparisons are reduced. In general, the replace operation may require ⌈log₂ N⌉ number of pairwise comparisons. However, the number of pairwise comparisons may be far less for the remove operation. For example, if any of the two exit conditions are satisfied in the leaf layer, the remove operation requires zero pairwise comparisons. The total number of pairwise comparisons (in the replace operation+remove operation) in the entire process 1500 may be as given in Table 5:

TABLE 5

| Number of total pairwise comparisons for sorting N elements | Case | Sorted on left side? |
|---|---|---|
| N + N log₂ N | Input array is sorted | Yes or No |
| N + N log₂ N | Input array is sorted in reverse order | Yes or No |
| N + N log₂ N | Input array is rotated to the right by 1 position | Yes |
| N + N log₂ N | Input array is rotated to the left by 1 position | No |
| N + 2N log₂ N | Input array is rotated to the right by 1 position | No |
| N + 2N log₂ N | Input array is rotated to the left by 1 position | Yes |

TABLE 5-continued

| Number of total pairwise comparisons for sorting N elements | Case | Sorted on left side? |
| --- | --- | --- |
| $N + (2N - M) \log_2 N$ | Input array has M elements at their sorted positions | Yes or No |
| $N + 2N \log_2 N$ | Worse case | Yes or No |

Figure 17:
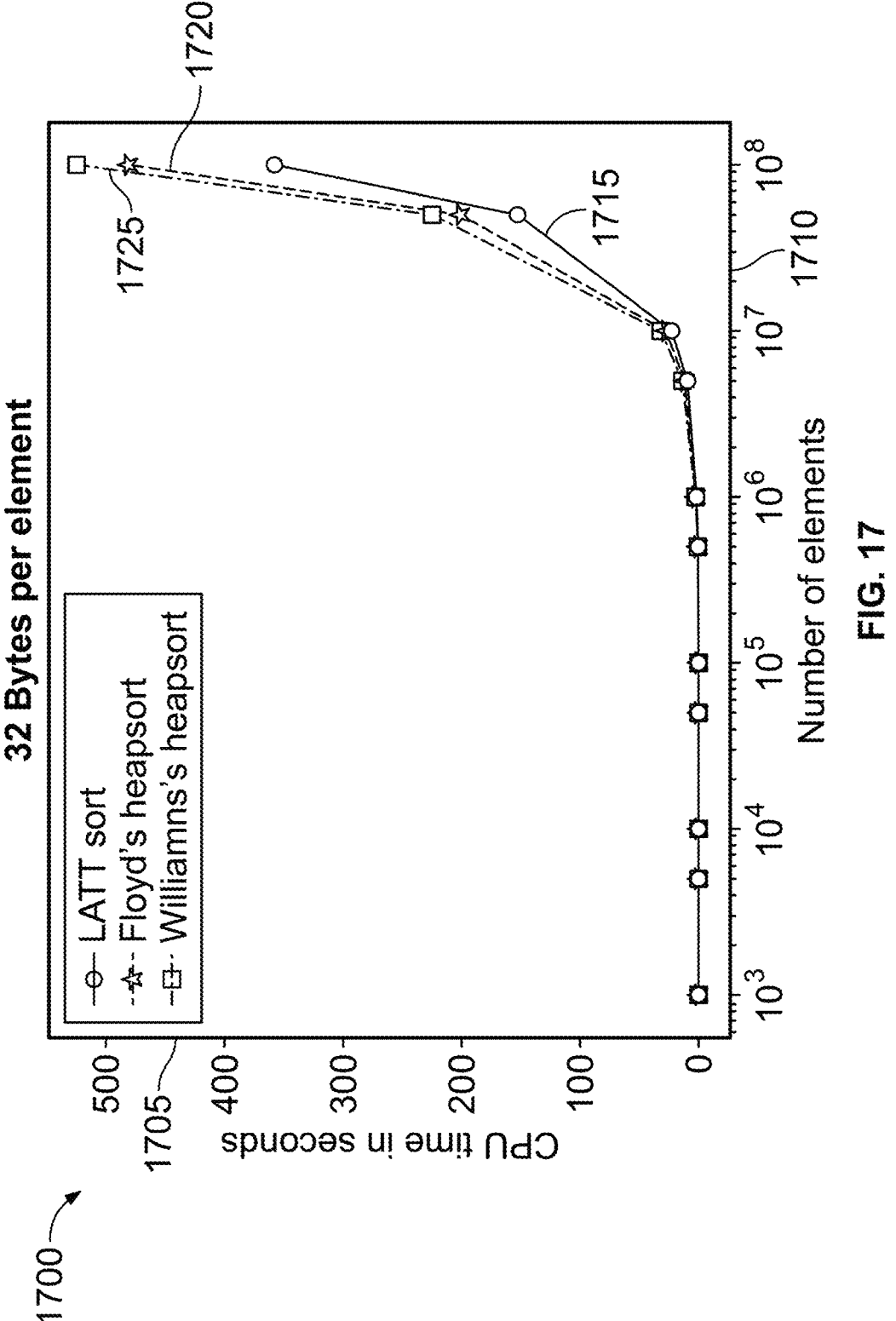
FIG. 17 illustrates a first example graph comparing the proposed approach with conventional approaches, according to embodiments of the present technology.
Figure 18:
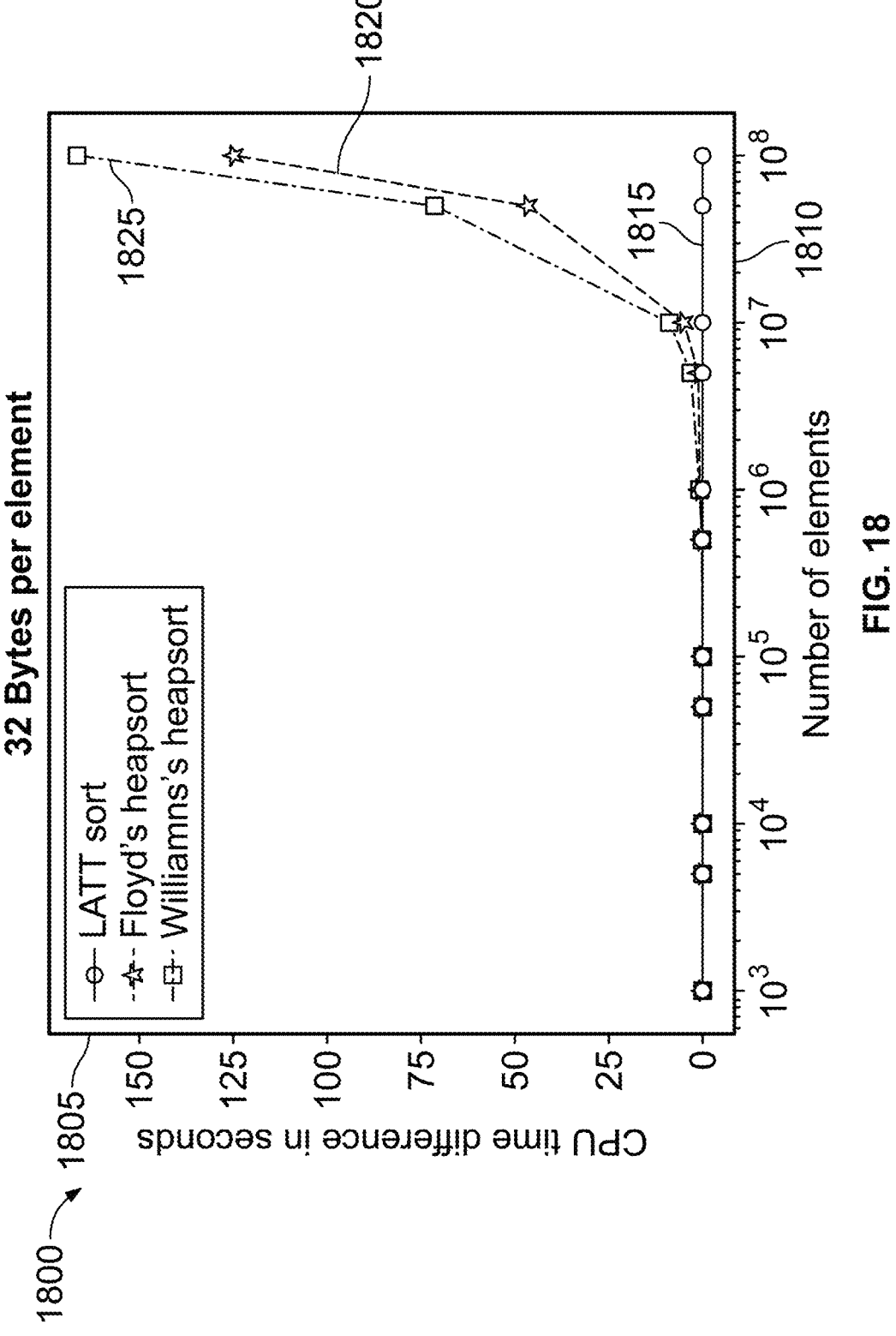
FIG. 18 illustrates a second example graph comparing the proposed approach with conventional approaches, according to embodiments of the present technology.
Figure 19:
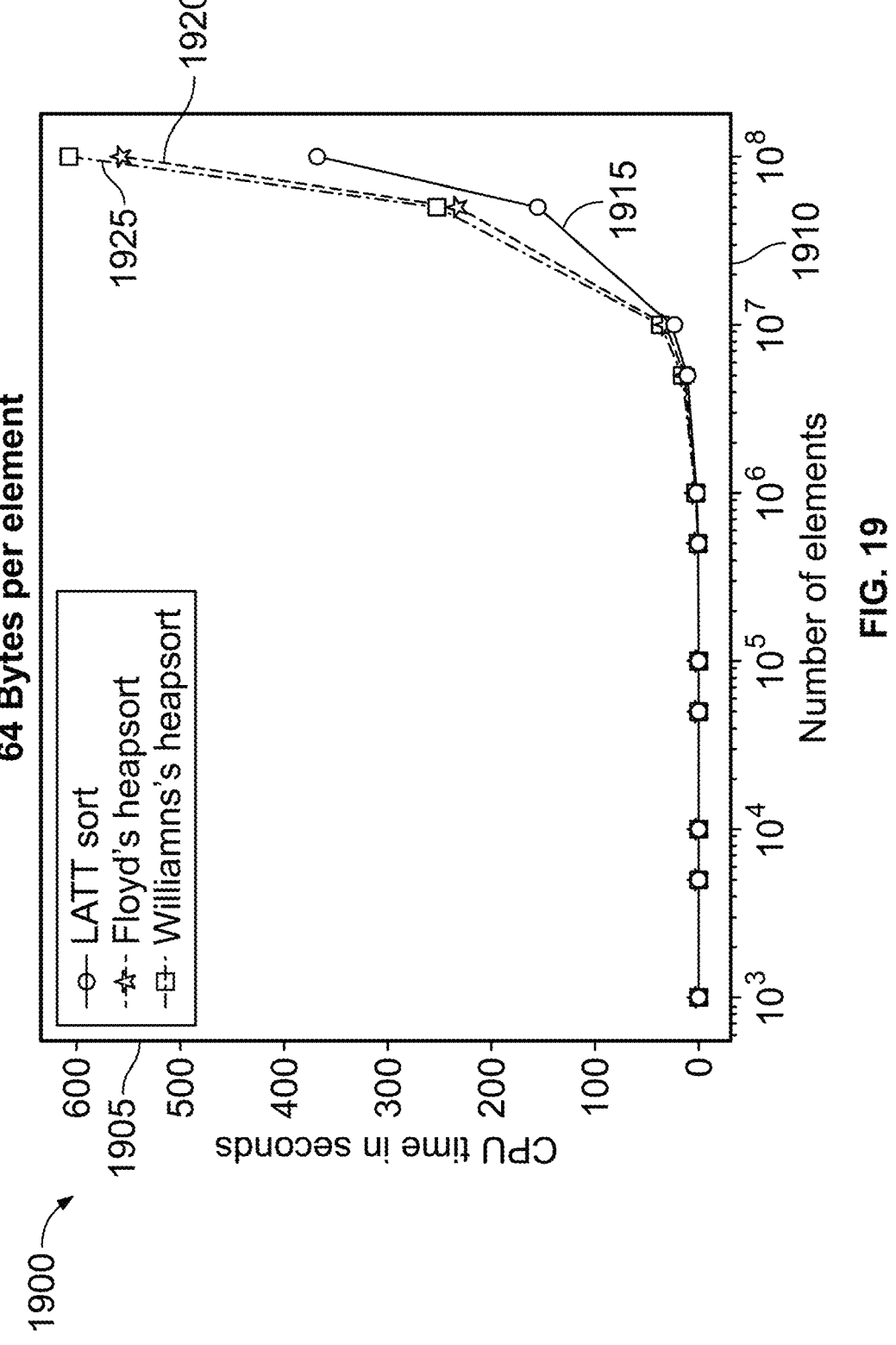
FIG. 19 illustrates a third example graph comparing the proposed approach with conventional approaches, according to embodiments of the present technology.
Figure 20:
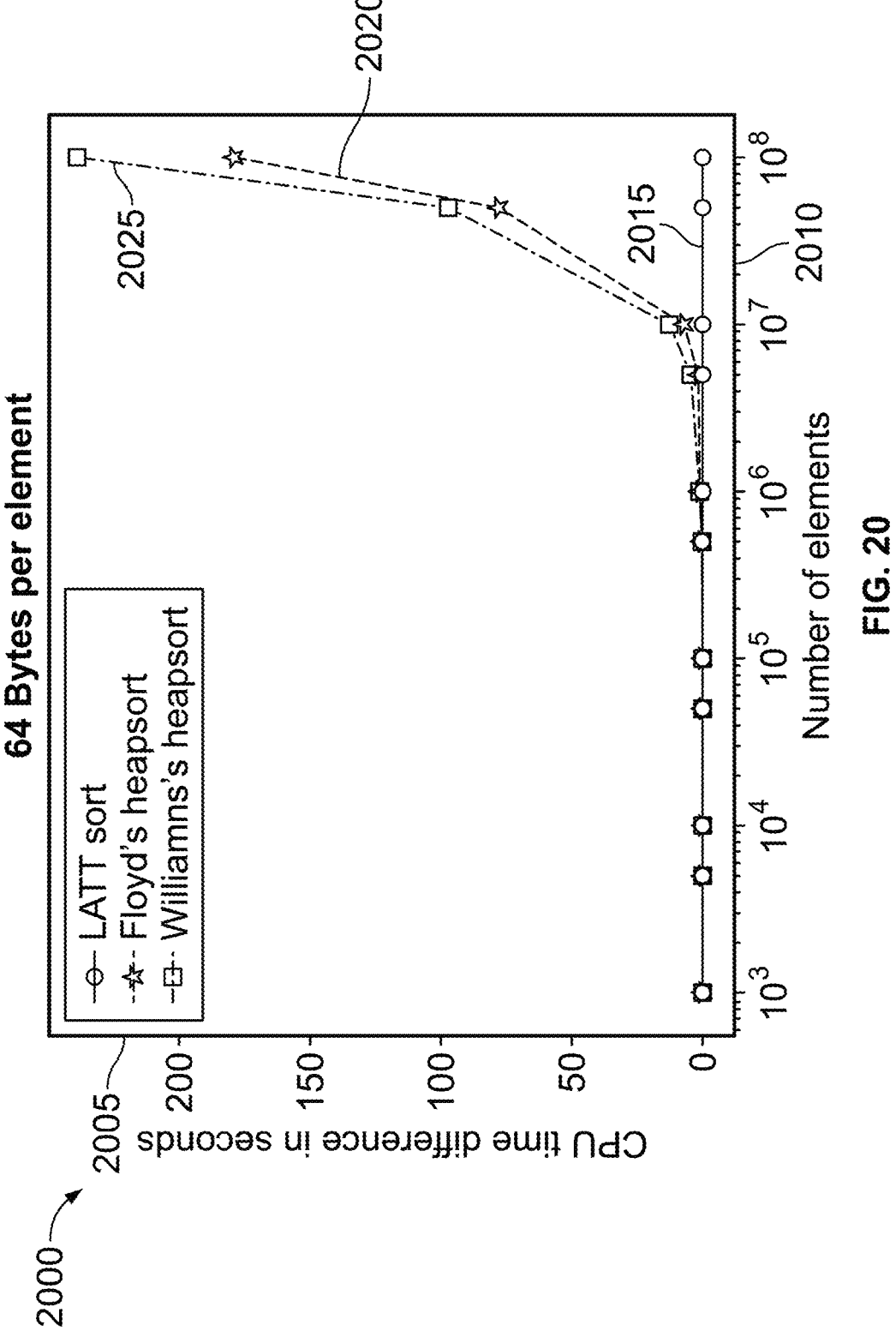
FIG. 20 illustrates a fourth example graph comparing the proposed approach with conventional approaches, according to embodiments of the present technology.
Figure 21:
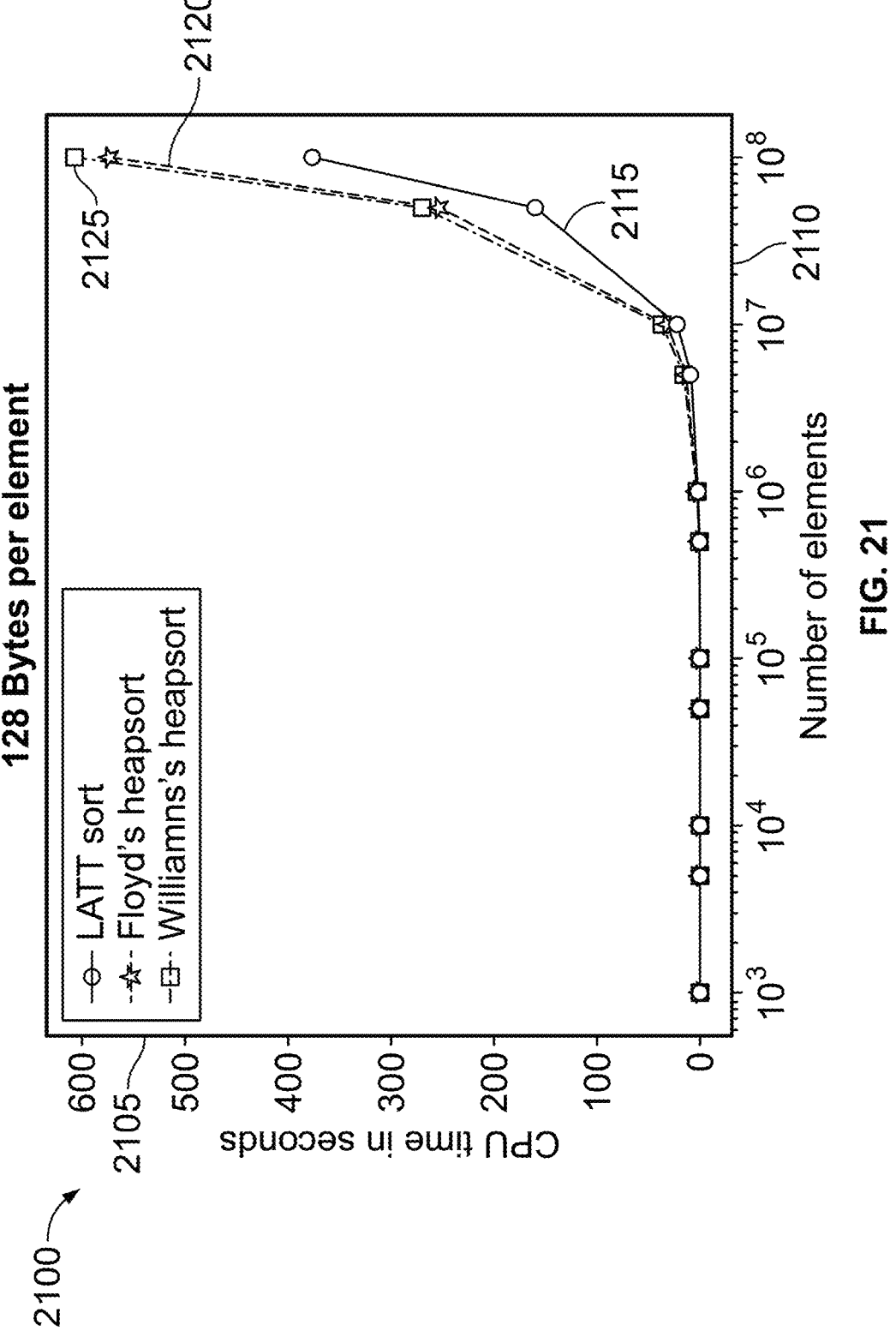
FIG. 21 illustrates a fifth example graph comparing the proposed approach with conventional approaches, according to embodiments of the present technology.
Figure 22:
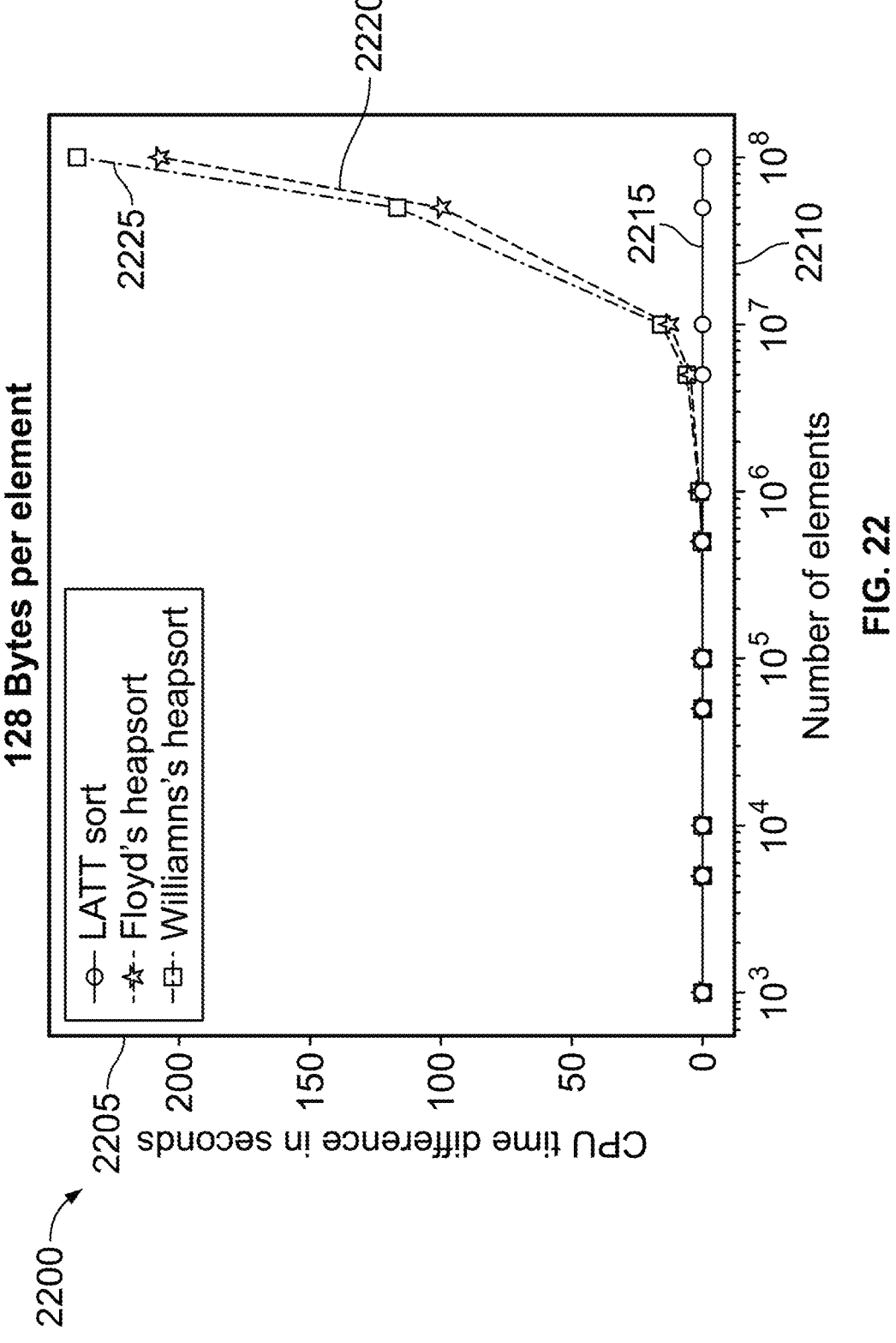
FIG. 22 illustrates a sixth example graph comparing the proposed approach with conventional approaches, according to embodiments of the present technology.

Turning to FIGS. 17-22, example graphs are shown, in accordance with some embodiments of the present disclosure. The graphs compare the CPU time needed to sort a given number of elements using William's heapsort, Floyd's heapsort, and the proposed approach (LATT sort). CPU time is the amount of time that a central processing unit (CPU) is used for processing instructions for performing a particular operation (e.g., sorting). By comparing the CPU time of William's heapsort, Floyd's heapsort, and the proposed approach, CPU time may be used to indicate which approach is faster (e.g., which approach sorts a given number of elements faster). FIGS. 17 and 18 compare the CPU time in William's heapsort, Floyd's heapsort, and the proposed approach for a varying number of elements where each element has a size of 32 bytes. FIGS. 19 and 20 compare the CPU time in William's heapsort, Floyd's heapsort, and the proposed approach for a varying number of elements where each element has a size of 64 bytes. FIGS. 21 and 22 compare the CPU time in William's heapsort, Floyd's heapsort, and the proposed approach for a varying number of elements where each element has a size of 128 bytes. In all these cases, each node of LATT has a size of 4 bytes.

Referring in particular to FIG. 17, an example graph 1700 plots CPU time in seconds on Y-axis 1705 against a number of elements on X-Axis 1710, in accordance with some embodiments of the present disclosure. The CPU time measures the time to sort a given number of elements. Each element on the X-Axis 1710 is 32 byes in size. The graph 1700 includes a first plot 1715 for the proposed approach (LATT sort), a second plot 1720 for Floyd's heapsort, and a third plot 1725 for William's heapsort. As shown in the graph 1700, as the number of elements increases, the first plot 1715 shows that the proposed approach consumes less CPU time than both Floyd's heapsort and William's heapsort.

Referring in particular to FIG. 18, an example graph 1800 plots CPU time difference in seconds on Y-axis 1805 against a number of elements on X-Axis 1810, in accordance with some embodiments of the present disclosure. The CPU time difference measures a difference in CPU time between the proposed approach (LATT sort) and Floyd's heapsort or William's heapsort for sorting a given number of elements. Each element on the X-Axis 1810 is 32 byes in size. The graph 1800 includes a first plot 1815 that measures a CPU time difference between the proposed approach (LATT sort) itself (thus, the first plot has zero CPU time difference), a second plot 1820 that measures a CPU time difference between Floyd's heapsort and LATT sort, and a third plot 1825 that measures a CPU time difference between William's heapsort and LATT sort. As shown in the graph 1800, as the number of elements increases, the proposed approach becomes significantly faster than both Floyd's heapsort and William's heapsort.

Referring to FIG. 19, an example graph 1900 plots CPU time in seconds on Y-axis 1905 against a number of elements on X-Axis 1910, in accordance with some embodiments of the present disclosure. The CPU time measures the time to sort a given number of elements. Each element on the X-Axis 1910 is 64 byes in size. The graph 1900 includes a first plot 1915 for the proposed approach (LATT sort), a second plot 1920 for Floyd's heapsort, and a third plot 1925 for William's heapsort. As shown in the graph 1900, as the number of elements increases, the first plot 1915 shows that the proposed approach consumes less CPU time than both Floyd's heapsort and William's heapsort.

Referring in particular to FIG. 20, an example graph 2000 plots CPU time difference in seconds on Y-axis 2005 against a number of elements on X-Axis 2010, in accordance with some embodiments of the present disclosure. The CPU time difference measures a difference in CPU time between the proposed approach (LATT sort) and Floyd's heapsort or William's heapsort for sorting a given number of elements. Each element on the X-Axis 2010 is 64 byes in size. The graph 2000 includes a first plot 2015 that measures a CPU time difference between the proposed approach (LATT sort) itself (thus, the first plot has zero CPU time difference), a second plot 2020 that measures a CPU time difference between Floyd's heapsort and LATT sort, and a third plot 2025 that measures a CPU time difference between William's heapsort and LATT sort. As shown in the graph 2000, as the number of elements increases, the proposed approach becomes significantly faster than both Floyd's heapsort and William's heapsort.

Referring to FIG. 21, an example graph 2100 plots CPU time in seconds on Y-axis 2105 against a number of elements on X-Axis 2110, in accordance with some embodiments of the present disclosure. The CPU time measures the time to sort a given number of elements. Each element on the X-Axis 2110 is 128 byes in size. The graph 2100 includes a first plot 2115 for the proposed approach (LATT sort), a second plot 2120 for Floyd's heapsort, and a third plot 2125 for William's heapsort. As shown in the graph 2100, as the number of elements increases, the first plot 2115 shows that the proposed approach consumes less CPU time than both Floyd's heapsort and William's heapsort. Further, when comparing the first plots 1715, 1915, and 2115, it may be seen that even as the size of each element increases, the CPU time for the proposed approach does not significantly increase. In contrast, as the size of each element increases, the CPU time for both Floyd's heapsort and William's heapsort significantly increases, as shown in the second plots 1720, 1920, 2120, and 1725, 1925, and 2125, respectively.

Referring in particular to FIG. 22, an example graph 2200 plots CPU time difference in seconds on Y-axis 2205 against a number of elements on X-Axis 2210, in accordance with some embodiments of the present disclosure. The CPU time difference measures a difference in CPU time between the proposed approach (LATT sort) and Floyd's heapsort or William's heapsort for sorting a given number of elements. Each element on the X-Axis 2210 is 128 byes in size. The graph 2200 includes a first plot 2215 that measures a CPU time difference between the proposed approach (LATT sort) itself (thus, the first plot has zero CPU time difference), a second plot 2220 that measures a CPU time difference between Floyd's heapsort and LATT sort, and a third plot 2225 that measures a CPU time difference between William's heapsort and LATT sort. As shown in the graph 2200, as the number of elements increases, the proposed approach becomes significantly faster than both Floyd's heapsort and William's heapsort.

The herein described subject matter illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents. The word "illustrative" is used herein to mean serving as an example, instance, or illustration. Any aspect or design described herein as "illustrative" is not necessarily to be construed as preferred or advantageous over other aspects or designs.

What is claimed is:

1. A non-transitory computer-readable medium storing computer-readable instructions that, when executed by one or more processors of a computing system comprising a main memory, an internal memory, and a memory controller, cause the computing system to perform operations for reducing auxiliary memory overhead and processor internal memory inefficiency during sorting of large datasets, the operations comprising:

storing, in the main memory, a plurality of unsorted data elements, each data element of the plurality of unsorted data elements associated with a respective index value, the plurality of unsorted data elements comprising N data elements;

detecting, by the one or more processors, a memory-constrained sorting condition in which an available auxiliary memory capacity of the computing system is less than N;

computing, by the one or more processors, based on the detected memory-constrained sorting condition, an auxiliary memory quantity to be used for sorting that is dynamically adjusted according to an internal utilization parameter of the computing system;

allocating, by the memory controller, a contiguous auxiliary memory region within the main memory corresponding to the computed auxiliary memory quantity;

constructing, within the contiguous auxiliary memory region, a linked-array hierarchical assessment structure (LAHAS), the LAHAS comprising a plurality of interconnected layers of nodes, each node of the plurality of interconnected layers of nodes associated with an index value of a corresponding data element of the plurality of unsorted data elements stored in the main memory;

initializing, by the one or more processors, the LAHAS by performing processor-executed pairwise assessment operations between data elements of the plurality of unsorted data elements and populating each node of the plurality of interconnected layers of nodes with an identifier of an assessment result data element determined from the pairwise assessment operations;

executing, by the one or more processors, within the main memory, a multi-stage assessment sequence, each stage of the multi-stage assessment sequence comprising:

performing, by the one or more processors, parallel pairwise assessment operations at one or more nodes of the plurality of interconnected layers of nodes of the LAHAS to generate updated assessment result data elements;

identifying, by the one or more processors, from the updated assessment result data elements, a terminal assessment result data element representing an extreme value relative to a predetermined assessment criterion; and replacing, by the one or more processors, within the main memory, a memory position of the terminal assessment result data element with a memory position of an unsorted data element of the plurality of unsorted data elements to store the terminal assessment result data element in a sorted location in the main memory without invoking external memory transfers;

updating, by the one or more processors, after completion of each stage of the multi-stage assessment sequence, node values of the plurality of interconnected layers of nodes of the LAHAS to maintain consistency between the index values and corresponding memory locations of the data elements stored in the main memory; and outputting, by the one or more processors, from the main memory, the plurality of data elements in a sorted order, wherein execution of the multi-stage assessment sequences and the updates to the node values of the plurality of interconnected layers of nodes of the LAHAS collectively reduce sorting time, recursion depth, and auxiliary memory consumption relative to conventional heapsort implementations, thereby improving processor internal memory efficiency and computational throughput of the computing system.

2. The non-transitory computer-readable medium of claim 1, wherein the LAHAS comprises a linked-array tournament tree (LATT) data structure.

3. A non-transitory computer-readable medium storing instructions that, when executed by one or more processors of a computing system, cause the computing system to perform operations comprising:

receiving, by a memory controller, a plurality of elements to be sorted, the plurality of elements comprising N elements stored in a first portion of a computer memory;

computing, by the one or more processors, a required amount of auxiliary memory less than N based on characteristics of the plurality of elements and available internal memory;

allocating, within the computer memory, a second portion corresponding to the computed amount of auxiliary memory, the second portion being contiguous with the first portion of the computer memory;

constructing, within the second portion of the computer memory, a linked-array tournament tree (LATT) data structure comprising a plurality of layers of nodes, each node storing an index corresponding to an element of the plurality of elements;

initializing, by the one or more processors, the LATT data structure by populating each node of each layer with a node value determined from an executed pairwise comparison between respective elements of the plurality of elements;

executing, by the one or more processors, a plurality of tournament rounds within the computer memory, each round comprising:

determining, for each of a plurality of games executed in the computer memory, a winning element based on the pairwise comparison between at least two elements;

determining, across the plurality of games, a champion element as a winning element for the round; and swapping, within the first portion of the computer memory, the champion element with an unsorted element to store the champion element in a sorted position;

updating, after each tournament round, at least one node value of the LATT data structure based on the champion element to maintain consistency between the layers of the LATT data structure and the memory locations of the plurality of elements; and outputting, from the first portion of the computer memory, the plurality of elements in a sorted order without requiring transfer of the plurality of elements to an external storage medium.

4. The non-transitory computer-readable medium of claim 3, wherein to create the LATT, the computer-readable instructions further cause the one or more processors to:

compute a number of the plurality of layers in the LATT;

compute a number of the one or more nodes in each of the plurality of layers;

create the LATT data structure with the computed number of the plurality of layers, with each layer of the plurality of layers having the computed number of the one or more nodes for that layer;

link each of the plurality of layers with an adjacent layer of the plurality of layers; and store the LATT data structure in the allocated amount of auxiliary computer memory.

5. The non-transitory computer-readable medium of claim 4, wherein the computer readable instructions further cause the one or more processors to compute the number of the plurality of layers by computing $[\log_2 N]$.

6. The non-transitory computer-readable medium of claim 4, wherein the computer readable instructions further cause the one or more processors to compute the number of the one or more nodes in each of the plurality of layers by computing $$n_h = \left\lceil \frac{n_h - 1}{2} \right\rceil$$

where $n_h$ is a number of nodes in an $h^{th}$ layer of the plurality of layers, and $h=1, 2, \ldots [\log_2 N]$ and $h_0=N$.

7. The non-transitory computer-readable medium of claim 4, wherein the computer readable instructions further cause the one or more processors to compute the amount of auxiliary computer memory by computing N* sizeof (integer), where sizeof (integer) is the number of bytes of an integer.

8. The non-transitory computer-readable medium of claim 3, wherein the plurality of layers comprises $\{l_1, l_2, \ldots, l_h\}$ layers, where $h= [\log_2 N]$, wherein $l_1$ is a leaf layer, $l_h$ is a root layer, and $\{l_2, \ldots, l_{h-1}\}$ are a plurality of additional layers between the leaf layer and the root layer, wherein the leaf layer has [N/2] nodes, the root layer has one node, and each of the plurality of additional layers has greater than one and less than [N/2] nodes determined based on a number of nodes in a next lower layer of the plurality of layers, and wherein each layer $1_x$ where $x=\{[\log_2 N], ([\log_2 N]-1), ([\log_2 N]-2, \ldots, 2\}$, is linked to a next adjacent layer $1_x-1$.

9. The non-transitory computer-readable medium of claim 8, wherein the plurality of elements comprises $\{D_0, D_1, \ldots, D_{N-1}\}$, and wherein to initialize the LATT, the computer-readable instructions further cause the one or more processors to:

divide the plurality of elements $\{D_0, D_1, \ldots, D_{N-1}\}$ into a plurality of element pairs $\{D_i, D_{min(i+1,N-1)}\}$, where $i=0,2,4,\ldots,2*[(N-1)/2]$;

compare element values of each element pair of the plurality of element pairs to determine the winner in each of the plurality of element pairs;

determine the index value of each of the winners;

populate the node value of each of the [N/2] nodes in the leaf layer with the index value of one of the winners; and populate the node value of each of the one or more nodes in the layer $1_x$ based on the next adjacent layer $1_{x-1}$ by:

dividing the one or more nodes in the next adjacent layer $1_{x-1}$ into node pairs;

determining the element values corresponding to the index values in each of the node pairs;

comparing the element values in each of the node pairs to determine the winner in each of the node pairs; and populating the node value of each of the one or more nodes in the layer $1_x$ with the index value of one of the winners of the node pairs.

10. The non-transitory computer-readable medium of claim 8, wherein the index value of the champion element corresponds to the node value in the root layer.

11. The non-transitory computer-readable medium of claim 8, wherein to update the value of at least one of the one or more nodes, the computer-readable instructions further cause the one or more processors to:

perform a remove operation to remove the champion element from the LATT; and perform a replace operation to update the winners in the LATT.

12. The non-transitory computer-readable medium of claim 11, wherein to perform the remove operation, the computer-readable instructions further cause the one or more processors to:

designate the champion element after swapping as a child node;

determine a parent node of the child node in the leaf layer; and update the node value of the parent node by removing the champion element as an opponent.

13. The non-transitory computer-readable medium of claim 12, wherein to update the node value of the parent node, the computer-readable instructions further cause the one or more processors to:

determine based on the node value of the parent node that the parent node has neither a left opponent nor a right opponent; and responsive to determining that the parent node has neither the left opponent nor the right opponent, update the node value of an ancestor node of the child node.

14. The non-transitory computer-readable medium of claim 11, wherein to perform the remove operation, the computer-readable instructions further cause the one or more processors to:

check for satisfaction of a first exit or a second exit; and responsive to satisfaction of either the first exit or the second exit, exit the remove operation and perform the replace operation.

15. The non-transitory computer-readable medium of claim 14, wherein the first exit occurs when a next sorted index position and a champion position have a same ancestor node in a non-root layer, and wherein the champion position is the index value associated with the champion element.

16. The non-transitory computer-readable medium of claim 14, wherein the second exit occurs when, before the swap, an $$\text{element}\left[n_{parent}^{th} \text{ (next sorted index position)}\right]$$

has lost in a $(n+1)^{th}$ round of games of a previous iteration, where $$0_{parent}^{th}\text{(position)}$$

is the position self.

17. The non-transitory computer-readable medium of claim 3, wherein the node value of each of the one or more nodes further includes a one bit left child value indicating presence of a left opponent in the pairwise comparison and a one bit right child value indicating presence of a right opponent in the pairwise comparison.

18. The non-transitory computer-readable medium of claim 3, wherein the computer readable instructions further cause the one or more processors to:

initialize a next sorted index position in the first portion of the computer memory;

receive an indicator indicative of sorting the plurality of elements starting from a left side or a right side; and responsive to determining that the indicator is to sort the plurality of elements starting from the left side, initialize the next sorted index position as the index value of a first element of the plurality of elements; or responsive to determining that the indicator is to sort the plurality of elements starting from the right side, initialize the next sorted index position as the index value of a last element of the plurality of elements.

19. The non-transitory computer-readable medium of claim 18, wherein the computer readable instructions further cause the one or more processors to:

update the next sorted index position=next sorted index position+1 responsive to determining that the indicator is to sort the plurality of elements starting from the left side; or update the next sorted index position=next sorted index position-1 responsive to determining that the indicator is to sort the plurality of elements starting from the right side.

20. The non-transitory computer-readable medium of claim 3, wherein the plurality of tournament rounds comprises N tournament rounds.

21. A computing system, comprising:

a main memory having computer-readable instructions stored thereon;

an internal memory;

a memory controller; and one or more processors that execute the computer-readable instructions to perform operations for reducing auxiliary memory overhead and processor internal memory inefficiency during sorting of large datasets, wherein the one or more processors executing the computer-readable instructions to perform the operations comprises the one or more processors executing the computer-readable instructions to:

storing, in the main memory, a plurality of unsorted data elements, each data element of the plurality of unsorted data elements associated with a respective index value, the plurality of unsorted data elements comprising N data elements;

detecting, by the one or more processors, a memory-constrained sorting condition in which an available auxiliary memory capacity of the computing system is less than N;

computing, by the one or more processors, based on the detected memory-constrained sorting condition, an auxiliary memory quantity to be used for sorting that is dynamically adjusted according to an internal utilization parameter of the computing system;

allocating, by the memory controller, a contiguous auxiliary memory region within the main memory corresponding to the computed auxiliary memory quantity;

constructing, within the contiguous auxiliary memory region, a linked-array hierarchical assessment structure (LAHAS), the LAHAS comprising a plurality of interconnected layers of nodes, each node of the plurality of interconnected layers of nodes associated with an index value of a corresponding data element of the plurality of unsorted data elements stored in the main memory;

initializing, by the one or more processors, the LAHAS by performing processor-executed pairwise assessment operations between data elements of the plurality of unsorted data elements and populating each node of the plurality of interconnected layers of nodes with an identifier of an assessment result data element determined from the pairwise assessment operations;

executing, by the one or more processors, within the main memory, a multi-stage assessment sequence, each stage of the multi-stage assessment sequence comprising:

performing, by the one or more processors, parallel pairwise assessment operations at one or more nodes of the plurality of interconnected layers of nodes of the LAHAS to generate updated assessment result data elements;

identifying, by the one or more processors, from the updated assessment result data elements, a terminal assessment result data element representing an extreme value relative to a predetermined assessment criterion; and replacing, by the one or more processors, within the main memory, a memory position of the terminal assessment result data element with a memory position of an unsorted data element of the plurality of unsorted data elements to store the terminal assessment result data element in a sorted location in the main memory without invoking external memory transfers;

updating, by the one or more processors, after completion of each stage of the multi-stage assessment sequence, node values of the plurality of interconnected layers of nodes of the LAHAS to maintain consistency between the index values and corresponding memory locations of the data elements stored in the main memory; and outputting, by the one or more processors, from the main memory, the plurality of data elements in a sorted order, wherein execution of the multi-stage assessment sequences and the updates to the node values of the plurality of interconnected layers of nodes of the LAHAS collectively reduce sorting time, recursion depth, and auxiliary memory consumption relative to conventional heapsort implementations, thereby improving processor internal memory efficiency and computational throughput of the computing system.

22. The system of claim 21, wherein the LAHAS comprises a linked-array tournament tree (LATT) data structure.

23. A system, comprising:

a memory having computer-readable instructions stored thereon;

a memory controller; and one or more processors that execute the computer-readable instructions to:

receiving, by the memory controller, a plurality of elements to be sorted, the plurality of elements comprising N elements stored in a first portion of a computer memory;

computing, by the one or more processors, a required amount of auxiliary memory less than N based on characteristics of the plurality of elements and available internal memory;

allocating, within the computer memory, a second portion corresponding to the computed amount of auxiliary memory, the second portion being contiguous with the first portion of the computer memory;

constructing, within the second portion of the computer memory, a linked-array tournament tree (LATT) data structure comprising a plurality of layers of nodes, each node storing an index corresponding to an element of the plurality of elements;

initializing, by the one or more processors, the LATT data structure by populating each node of each layer with a node value determined from an executed pairwise comparison between respective elements of the plurality of elements;

executing, by the one or more processors, a plurality of tournament rounds within the computer memory, each round comprising:

determining, for each of a plurality of games executed in the computer memory, a winning element based on the pairwise comparison between at least two elements;

determining, across the plurality of games, a champion element as a winning element for the round; and swapping, within the first portion of the computer memory, the champion element with an unsorted element to store the champion element in a sorted position;

updating, after each tournament round, at least one node value of the LATT data structure based on the champion element to maintain consistency between the layers of the LATT data structure and the memory locations of the plurality of elements; and outputting, from the first portion of the computer memory, the plurality of elements in a sorted order without requiring transfer of the plurality of elements to an external storage medium.

24. The system of claim 23, wherein to create the LATT, the computer-readable instructions further cause the one or more processors to:

compute a number of the plurality of layers in the LATT by computing $[\log_2 N]$;

compute a number of the one or more nodes in each of the plurality of layers by computing $$n_h = \left\lceil \frac{n_h - 1}{2} \right\rceil$$

where $n_h$ is a number of nodes in an $h^{th}$ layer of the plurality of layers, and $h=1, 2, \ldots [\log_2 N]$ and $h_0=N$;

create the LATT data structure with the computed number of the plurality of layers, with each layer of the plurality of layers having the computed number of the one or more nodes for that layer;

link each of the plurality of layers with an adjacent layer of the plurality of layers; and store the LATT data structure in the allocated amount of auxiliary memory.

25. The system of claim 23, wherein the plurality of layers comprises $\{l_1, l_2, \ldots, l_n\}$ layers, where $h= [\log_2 N]$, wherein $l_1$ is a leaf layer, $l_h$ is a root layer, and $\{l_2, \ldots, l_{h-1}\}$ are a plurality of additional layers between the leaf layer and the root layer, wherein the leaf layer has [N/2] nodes, the root layer has one node, and each of the plurality of additional layers has greater than one and less than [N/2] nodes determined based on a number of nodes in a next lower layer of the plurality of layers, and wherein each layer $l_x$ where $x=\{[\log_2 N], ([\log_2 N]-1), ([\log_2 N]-2, \ldots, 2\}$, is linked to a next adjacent layer $l_x-1$.

26. The system of claim 25, wherein to initialize the LATT, the computer-readable instructions further cause the one or more processors to:

divide the plurality of elements $\{D_0, D_1, \ldots, D_{N-1}\}$ into a plurality of element pairs $\{Di, D_{min(i+1,N-1)}\}$, where $i=0,2,4, \ldots, 2*[(N-1)/2]$;

compare element values of each element pair of the plurality of element pairs to determine the winner in each of the plurality of element pairs;

determine the index value of each of the winners;

populate the node value of each of the [N/2] nodes in the leaf layer with the index value of one of the winners; and populate the node value of each of the one or more nodes in the layer $l_x$ based on the next adjacent layer $l_{x-1}$ by:

dividing the one or more nodes in the next adjacent layer $l_{x-1}$ into node pairs;

determining the element values corresponding to the index values in each of the node pairs;

comparing the element values in each of the node pairs to determine the winner in each of the node pairs; and populating the node value of each of the one or more nodes in the layer $l_x$ with the index value of one of the winners of the node pairs.

27. The system of claim 25, wherein to update the value of at least one of the one or more nodes, the computer-readable instructions further cause the one or more processors to:

perform a remove operation to remove the champion element from the LATT by:

designating the champion element after swapping as a child node;

determining a parent node in the leaf layer of the child node;

updating the node value of the parent node to remove the champion element as an opponent; and checking for satisfaction of a first exit or a second exit;

responsive to satisfaction of either the first exit or the second exit, exit the remove operation and perform a replace operation to update the LATT.

28. The system of claim 27, wherein the first exit occurs when a next sorted index position and a champion position have a same ancestor node in a non-root layer, and wherein the champion position is the index value associated with the champion element.

29. The system of claim 27, wherein the second exit occurs when, before the swap, an element $$[n_{parent}^{th} \text{ (next sorted index position)}]$$

has lost in a $(n+1)^{th}$ round of games of a previous iteration, where $$0_{parent}^{th} \text{ (position)}$$

is the position self.

30. The system of claim 23, wherein the node value of each of the one or more nodes further includes a one bit left child value indicating presence of a left opponent in the pairwise comparison and a one bit right child value indicating presence of a right opponent in the pairwise comparison.

31. The system of claim 23, wherein the computer-readable instructions further cause the one or more processors to:

initialize a next sorted index position in the first portion of the computer memory;

receive an indicator indicative of sorting the plurality of elements starting from a left side or a right side; and responsive to determining that the indicator is to sort the plurality of elements starting from the left side, initialize the next sorted index position as the index value of a first element of the plurality of elements; or responsive to determining that the indicator is to sort the plurality of elements starting from the right side, initialize the next sorted index position as the index value of a last element of the plurality of elements.

32. The system of claim 31, wherein the computer-readable instructions further cause the one or more processors to:

update the next sorted index position=next sorted index position+1 responsive to determining that the indicator is to sort the plurality of elements starting from the left side; or update the next sorted index position=next sorted index position −1 responsive to determining that the indicator is to sort the plurality of elements starting from the right side.

33. A method for reducing auxiliary memory overhead and processor internal memory inefficiency during sorting of large datasets, the method comprising:

storing, in a main memory of a computing system, a plurality of unsorted data elements, each data element of the plurality of unsorted data elements associated with a respective index value, the plurality of unsorted data elements comprising N data elements;

detecting, by one or more processors, a memory-constrained sorting condition in which an available auxiliary memory capacity of the computing system is less than N;

computing, by the one or more processors, based on the detected memory-constrained sorting condition, an auxiliary memory quantity to be used for sorting that is dynamically adjusted according to an internal utilization parameter of the computing system;

allocating, by a memory controller of the computing system, a contiguous auxiliary memory region within the main memory corresponding to the computed auxiliary memory quantity;

constructing, within the contiguous auxiliary memory region, a linked-array hierarchical assessment structure (LAHAS), the LAHAS comprising a plurality of interconnected layers of nodes, each node of the plurality of interconnected layers of nodes associated with an index value of a corresponding data element of the plurality of unsorted data elements stored in the main memory;

initializing, by the one or more processors, the LAHAS by performing processor-executed pairwise assessment operations between data elements of the plurality of unsorted data elements and populating each node of the plurality of interconnected layers of nodes with an identifier of an assessment result data element determined from the pairwise assessment operations;

executing, by the one or more processors, within the main memory, a multi-stage assessment sequence, each stage of the multi-stage assessment sequence comprising:

performing, by the one or more processors, parallel pairwise assessment operations at one or more nodes of the plurality of interconnected layers of nodes of the LAHAS to generate updated assessment result data elements;

identifying, by the one or more processors, from the updated assessment result data elements, a terminal assessment result data element representing an extreme value relative to a predetermined assessment criterion; and replacing, by the one or more processors, within the main memory, a memory position of the terminal assessment result data element with a memory position of an unsorted data element of the plurality of unsorted data elements to store the terminal assessment result data element in a sorted location in the main memory without invoking external memory transfers;

updating, by the one or more processors, after completion of each stage of the multi-stage assessment sequence, node values of the plurality of interconnected layers of nodes of the LAHAS to maintain consistency between the index values and corresponding memory locations of the data elements stored in the main memory; and outputting, by the one or more processors, from the main memory, the plurality of data elements in a sorted order, wherein execution of the multi-stage assessment sequences and the updates to the node values of the plurality of interconnected layers of nodes of the LAHAS collectively reduce sorting time, recursion depth, and auxiliary memory consumption relative to conventional heapsort implementations, thereby improving processor internal memory efficiency and computational throughput of the computing system.

34. The method of claim 33, wherein the LAHAS comprises a linked-array tournament tree (LATT) data structure.

35. A method, comprising:

receiving, by a memory controller, a plurality of elements to be sorted, the plurality of elements comprising N elements stored in a first portion of a computer memory;

computing, by one or more processors, a required amount of auxiliary memory less than N based on characteristics of the plurality of elements and available internal memory;

allocating, within the computer memory, a second portion corresponding to the computed amount of auxiliary memory, the second portion being contiguous with the first portion of the computer memory;

constructing, within the second portion of the computer memory, a linked-array tournament tree (LATT) data structure comprising a plurality of layers of nodes, each node storing an index corresponding to an element of the plurality of elements;

initializing, by the one or more processors, the LATT data structure by populating each node of each layer with a node value determined from an executed pairwise comparison between respective elements of the plurality of elements;

executing, by the one or more processors, a plurality of tournament rounds within the computer memory, each round comprising:

determining, for each of a plurality of games executed in the computer memory, a winning element based on the pairwise comparison between at least two elements;

determining, across the plurality of games, a champion element as a winning element for the round; and swapping, within the first portion of the computer memory, the champion element with an unsorted element to store the champion element in a sorted position;

updating, after each tournament round, at least one node value of the LATT data structure based on the champion element to maintain consistency between layers of the LATT data structure and the memory locations of the plurality of elements; and outputting, from the first portion of the computer memory, the plurality of elements in a sorted order without requiring transfer of the plurality of elements to an external storage medium.

36. The method of claim 35, wherein for creating the LATT, the method further comprises:

computing, by the one or more processors, a number of the plurality of layers in the LATT by computing $[\log_2 N]$;

computing, by the one or more processors, a number of the one or more nodes in each of the plurality of layers by computing $$n_h = \left\lceil \frac{n_h - 1}{2} \right\rceil$$

where $n_h$ is a number of nodes in an $h^{th}$ layer of the plurality of layers, and $h = 1, 2, \ldots [\log_2 N]$ and $h_0 = N$;

creating, by the one or more processors, the LATT data structure with the computed number of the plurality of layers, with each layer of the plurality of layers having the computed number of the one or more nodes for that layer;

linking, by the one or more processors, each of the plurality of layers with an adjacent layer of the plurality of layers; and storing, by the one or more processors, the LATT data structure in the allocated amount of auxiliary memory.

* * * * *